US012478880B2

(12) United States Patent
Vann et al.

(10) Patent No.: US 12,478,880 B2
(45) Date of Patent: Nov. 25, 2025

(54) GENERATING NON-PREDICTABLE MULTIDIMENSIONAL MAPS FROM SESSION TO SESSION

(71) Applicant: PLAYTIKA LTD., Herzliya Pituach (IL)

(72) Inventors: Jamie Vann, Chicago, IL (US); Nathan Bird, Chicago, IL (US); Steve Montague, Arlington Heights, IL (US); Kerry Morgan, Chicago, IL (US)

(73) Assignee: PLAYTIKA LTD., Herzliya Pituach (IL)

( * ) Notice: Subject to any disclaimer, the term of this patent is extended or adjusted under 35 U.S.C. 154(b) by 179 days.

(21) Appl. No.: 18/320,360

(22) Filed: May 19, 2023

(65) Prior Publication Data

US 2023/0343169 A1 Oct. 26, 2023

Related U.S. Application Data

(63) Continuation of application No. PCT/US2023/066124, filed on Apr. 24, 2023.

(Continued)

(51) Int. Cl.

*G07F 17/32* (2006.01)
*A63F 13/45* (2014.01)
*A63F 13/60* (2014.01)

(52) U.S. Cl.

CPC .............. *A63F 13/60* (2014.09); *A63F 13/45* (2014.09); *G07F 17/3211* (2013.01);

(Continued)

(58) Field of Classification Search

CPC ........ A63F 13/45; A63F 13/52; A63F 13/537; A63F 13/5378; A63F 13/60; A63F 13/69;

(Continued)

(56) References Cited

U.S. PATENT DOCUMENTS 6,123,619 A * 9/2000 Tokita .................... A63F 13/10 463/43
6,319,129 B1 * 11/2001 Igarashi .................. A63F 13/10 463/31

(Continued)

*Primary Examiner* — Milap Shah
(74) *Attorney, Agent, or Firm* — FINNEGAN, HENDERSON, FARABOW, GARRETT & DUNNER L.L.P.

(57) ABSTRACT

A system for unpredictably generating multidimensional maps includes a processor. The processor receives a first request to initiate a first session in an environment; determines a first multidimensional map parameter defining a constraint and a first multidimensional map element defining a feature of the first multidimensional map; generates the first multidimensional map based on the first multidimensional map parameter and the first multidimensional map element; institutes the first session, causing display of the first generated multidimensional map on a computing device; receives a second request to initiate a second session in the environment; determines a second multidimensional map parameter and a second multidimensional map element; generates the second multidimensional map, which is unpredictably different from the first multidimensional map, based on the second multidimensional map parameter and the second multidimensional map element; and institutes the second session, causing a display of the second generated multidimensional map on the computing device.

17 Claims, 24 Drawing Sheets

Related U.S. Application Data

(60) Provisional application No. 63/363,555, filed on Apr. 25, 2022.

(52) U.S. Cl.
CPC ...... *G07F 17/3213* (2013.01); *G07F 17/3262* (2013.01); *G07F 17/3267* (2013.01)

(58) Field of Classification Search
CPC ............... A63F 13/822; G07F 17/3211; G07F 17/3213; G07F 17/3262; G07F 17/3267; G07F 17/3272; G07F 17/3274; G07F 17/3276
See application file for complete search history.

(56) References Cited

U.S. PATENT DOCUMENTS

| | | | | |
|---|---|---|---|---|
| 6,656,051 | B2 * | 12/2003 | Ishii | A63F 13/45 463/43 |
| 7,670,225 | B2 * | 3/2010 | Nishimura | A63F 13/45 463/33 |
| 8,821,279 | B2 * | 9/2014 | Yoshikawa | A63F 13/35 463/31 |
| 9,336,618 | B1 * | 5/2016 | Fontaine | G06F 16/435 |
| 11,213,753 | B2 * | 1/2022 | Lang | A63F 13/5378 |
| 11,276,227 | B2 * | 3/2022 | Liu | A63F 13/56 |
| 2003/0058238 | A1 * | 3/2003 | Doak | A63F 13/45 709/217 |
| 2004/0143852 | A1 * | 7/2004 | Meyers | A63F 13/822 463/43 |
| 2004/0254019 | A1 * | 12/2004 | Riendeau | A63F 3/081 463/42 |
| 2007/0206023 | A1 * | 9/2007 | Street | A63F 13/10 345/582 |
| 2007/0210937 | A1 * | 9/2007 | Smith | G06Q 30/02 340/995.1 |
| 2010/0255905 | A1 * | 10/2010 | Yuan | A63F 13/45 463/31 |
| 2013/0225260 | A1 * | 8/2013 | Cudak | A63F 13/67 463/23 |
| 2016/0332074 | A1 * | 11/2016 | Marr | A63F 13/55 |
| 2017/0354894 | A1 * | 12/2017 | Suzuki | A63F 13/798 |
| 2017/0358121 | A1 * | 12/2017 | Cwik | G06T 15/04 |
| 2017/0358122 | A1 * | 12/2017 | Cwik | G06T 15/04 |
| 2019/0073833 | A1 * | 3/2019 | Altieri | A63F 13/216 |
| 2021/0146243 | A1 * | 5/2021 | Hur | A63F 13/53 |

* cited by examiner

100

1400

GENERATING NON-PREDICTABLE MULTIDIMENSIONAL MAPS FROM SESSION TO SESSION

CROSS REFERENCES TO RELATED APPLICATIONS

This application is a continuation of International Application No. PCT/US2023/066124 filed on Apr. 24, 2023, which claims the benefit of priority of U.S. Provisional Patent Application No. 63/363,555, filed on Apr. 25, 2022, the entire contents of all of which are incorporated herein by reference.

BACKGROUND

Technical Field

This disclosure generally relates to devices, systems, and methods for generating multidimensional maps and randomly generated directionality outcomes for moving on the multidimensional maps.

Background Information

Many digital games of chance are one dimensional in as much as an award can be ascertained immediately from the result of an action. For example, in an online or digital slot machine with three or more "reels," each of which has a number of symbols, an award may be directly ascertained as the result of a single spin. That is, from a combination of symbols across a "payline," the player may immediately discern a credit or reward.

Once a credit or award is ascertained, the player repeats the same process to continue playing in an attempt to obtain another credit or award. This repetitive process may continue as long as the player desires. Because the amount of interaction of the player with such a machine or online game is limited to a repetitive process, the player may eventually lose interest in the game. Therefore, there is a need to develop new and exciting reels or scenarios to increase the level of interaction of the player with the game to keep the player interested in continuing to play the game.

SUMMARY

Some embodiments consistent with the present disclosure provide devices, systems, and methods for generating ever changing scenarios to keep a player interested in continuing to play a game. Unlike conventional slot reels which display symbols or numbers corresponding to an award, some disclosed embodiments sever the outcome associated with each pull or spin of the reels from the symbols displayed on the reels. Rather the symbols displayed on the reels are movement indicators that cause a character to move on a multidimensional map, and the position of the character on the map corresponds to the outcome. The layout of the multidimensional map may be predefined, randomly generated, or a combination of both. Thus, for example, the reels of some disclosed embodiments may display one or more random directionality outcomes during a first phase of play. The random directionality outcomes may include a combination of directionality indicators that may determine the movement of the character on the multidimensional map in a succeeding second phase—instead of an award in the first phase. This may make gameplay unpredictable because any outcome in the first phase may not directly translate into a win or a loss for the player. Rather, the outcome must be applied in a second phase (or through a series of iterations of second phases) to determine success or failure. To add further unpredictability, the multidimensional map may change for each player session. To prevent players from increasing their wagers as progress towards an award becomes more certain, the multidimensional map may be regenerated when a player attempts to alter a bet. Additionally, to increase player interactivity with a main game, various sub games may be embedded within the main game resulting in initiations of sub games. The various sub games may have the potential to impact the main game with their respective outcomes.

Some disclosed embodiments may "seed" or distribute awards in a multidimensional map to further vary the potential paths that a character may take during a game. The generation of one or more multidimensional maps may be improved by dynamic and historical session feedback to further increase players' experiences with the game. In other embodiments, the first phase may include intermediate outcomes that may be different from those that provide directionality, and the second phase may involve an application other than a multidimensional map. By way of example only, the outcome of the first phase may be a combination that may be applied to a lock of a safe in the second phase.

The foregoing and following examples are provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later.

Some embodiments consistent with the present disclosure provide systems and methods for multidimensional maps. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Some disclosed embodiments include a non-transitory computer readable medium, systems, and methods that involve implementing character movement relative to a multidimensional map. Operations may include causing a display of the multidimensional map, the display containing a plurality of distributed spaces. The operations may also include receiving a request to generate a random directionality outcome. Further, based on the received request, the operations may include generating the random directionality outcome, wherein the random directionality outcome includes a combination of directionality indicators. The operations may include identifying a current character location on the multidimensional map. The operations may also include translating the combination of directionality indicators to the multidimensional map using the identified current character location and the generated random directionality outcome. This may render the display of the multidimensional map in a manner reflecting movement of the character across some of the plurality of distributed spaces from the current character location to a new character location.

Some disclosed embodiments include a non-transitory computer readable medium, systems, and methods that involve unpredictably generating a first multidimensional map and a second multidimensional map differing from the first multidimensional map. Operations may include receiving a first request to initiate a first session in an environment employing the first multidimensional map. The operations may also include, based on the received first request, determining at least one first multidimensional map parameter defining at least one first constraint for the first multidimensional map employed in the first session, wherein the at least one first multidimensional map parameter includes at least one of a map height, a map width, a map length, a map type, a map geography, or a map size. Further, the operations may include determining, for inclusion in the first multidimensional map for the first session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map. The operations may include generating the first multidimensional map to conform with the determined at least one first multidimensional map parameter and the determined at least one first multidimensional map element. The operations may include causing a display of the first generated multidimensional map on a computing device. The operations may also include instituting the first session using the first generated multidimensional map. Further, the operations may include, following the first session, receiving a second request to initiate a second session in the environment. The operations may include based on the received second request, determining at least one second multidimensional map parameter defining at least one second constraint for the second multidimensional map in the second session, wherein the at least one second multidimensional map parameter includes the map height, the map width, the map length, the map type, the map geography, or the map size. The operations may also include determining, for inclusion in the second multidimensional map for the second session, at least one second multidimensional map element defining at least one feature of the second multidimensional map, wherein the at least one second multidimensional map element for the second session includes at least one of the location of at least one award on the second multidimensional map, the identity of the at least one award, the number of the at least one award, or the functionality associated with the particular location on the multidimensional map. Further, the operations may include generating the second multidimensional map to conform with the determined at least one second multidimensional map parameter and the at least one second multidimensional map element. The operations may also include causing a display of the second generated multidimensional map on the computing device for the second session, wherein the second generated multidimension map differs from the first generated multidimensional map in a non-predictable manner.

Some disclosed embodiments also involve, systems, methods, and non-transitory computer readable medium that perform operations for providing non-predictable award outcomes. The operations may include presenting a first phase display including a graphical user interface for activating an intermediate outcome generator. The operations may also include receiving a request, via the graphical user interface, to provide an intermediate outcome, wherein the intermediate outcome includes a plurality of variables from which an award is non-predictable. Further, the operations may include presenting a second phase display associated with an engine for implementing the intermediate outcome. The operations may include feeding the plurality of variables of the intermediate outcome into the engine to generate a subsequent outcome. The operations may further include presenting the subsequent outcome in the second phase display. The operations may also include revealing, in the second phase display, an award corresponding to the subsequent outcome Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
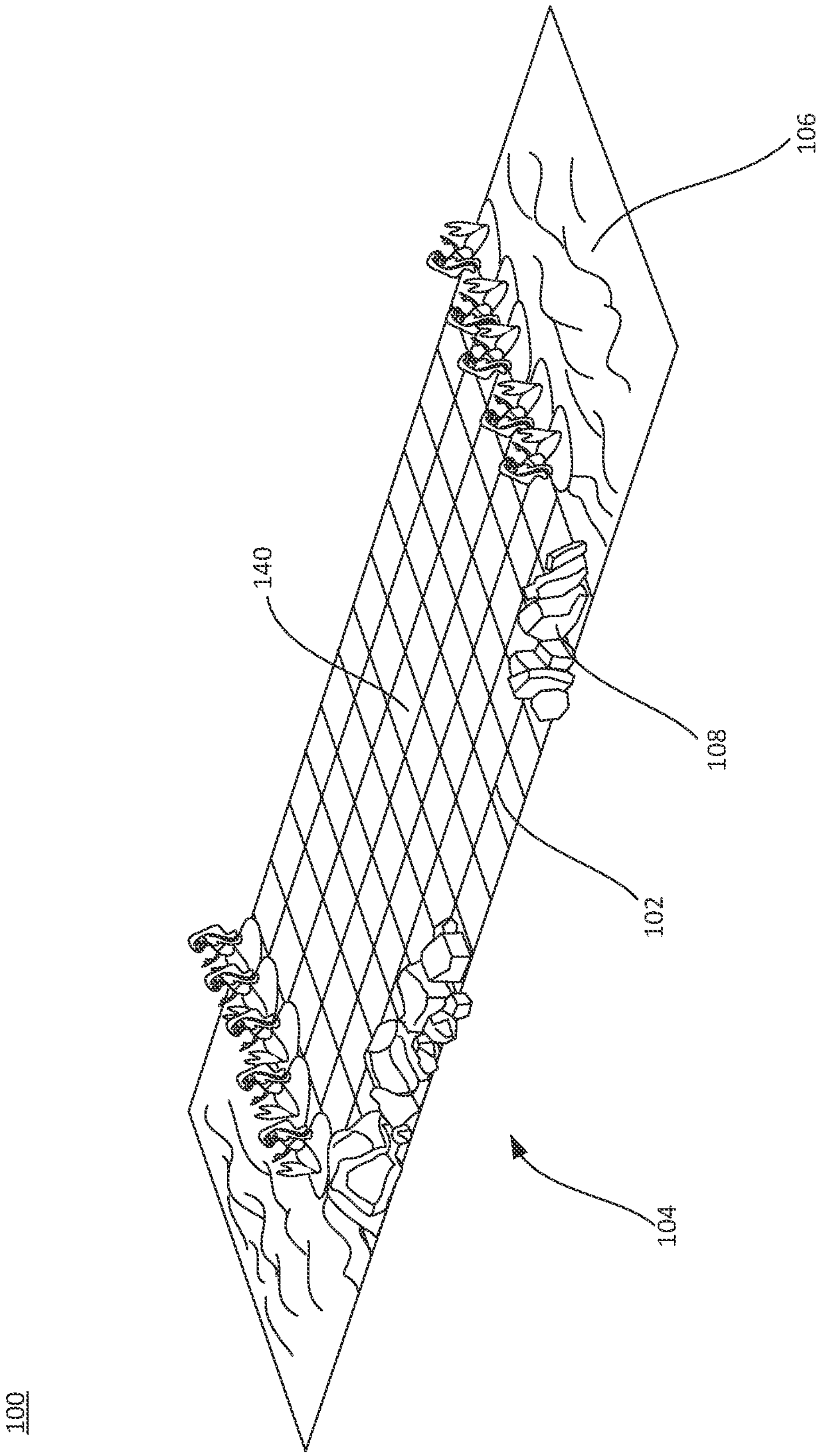
FIG. 1 is an exemplary display of a multidimensional map, consistent with some disclosed embodiments.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. The words "comprising," "having," "containing," and "including," and other similar forms are intended to be equivalent in meaning and are open ended in that an item or items following any one of these words is not meant to be an exhaustive listing of such item or items or meant to be limited to only the listed item or items. It should also be noted that as used in the present disclosure and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Unless specifically stated otherwise, and as apparent from the following description, throughout the specification, terms such as "processing," "calculating," "computing," "determining," "generating," "setting," "configuring," "selecting," "defining," "applying," "obtaining," "monitoring," "providing," "identifying," "segmenting," "classifying," "analyzing," "associating," "extracting," "storing," "receiving," "transmitting," or the like, include actions and/or processes of a computer that manipulate and/or transform data into other data, the data represented as physical quantities, and/or electronic quantities. The terms "computer," "processor," "controller," "processing unit," "computing unit," and "module" should be expansively construed to cover any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

As used herein, the phrase "for example," "such as," "for instance," and variants thereof describe non-limiting embodiments of the presently disclosed subject matter. Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

The drawings in this document may not be to any scale. Different figures may use different scales and different scales can be used even within the same drawing, for example different scales for different views of the same object or different scales for the two adjacent objects.

Some exemplary embodiments of the present disclosure relate to an online or digital game that may allow a user (or player) to initiate an action that causes an outcome. For example, a user may activate one or more actual or virtual reels, dice, or other outcome generators. This may occur by pressing one or more buttons, pulling an actual or virtual arm to cause reels to spin, and/or to stop reels from spinning or to cause other outcome generators to operate. The initiated action may, in some embodiments occur online (e.g., such as in a social game) or may occur on a dedicated machine, such as a slot machine. In some, but not all embodiments, a user may place a wager (also called a bet or assurance) in advance of initiating the action, thereby executing an instance of gameplay that may result in an outcome. An instance of gameplay may represent one event or occurrence that may result in an outcome related to a wager placed by a user. In some embodiments, the event or occurrence associated with an instance of gameplay may include more than one action, for example, placing a wager followed by taking another action (e.g., causing one or more reels to spin and/or stopping the spinning wheels) that results in an outcome or result. The outcome or result may cause the user to receive an award or receive no award.

An award may refer to a benefit (e.g., tokens, coins, points, or credits, or money) that a user may receive based on the outcome of a gameplay. Additionally or alternatively, an award may refer to one or more instances of gameplay provided to the user, wherein the user may not need to provide an additional wager for executing those instances of gameplay. For example, an award may include two or more free spins of the reels. A user may be able to cause the one or more reels to spin two or more times, based on the award, without having to place additional wagers. In some embodiments, an award may specify a multiplier for the wager placed by the user such that the user may receive a larger sum of money or monetary benefit (e.g., a multiple of the monetary amount corresponding to the wager). For example, if the user wagers 100 tokens, and the award is a 5× multiplier, the user may receive 500 tokens as an award. In some embodiments, an award may include other items that may be used by the user to play the game. For example, an award may include a key that the user may use to open a treasure chest, which in turn may include other awards (e.g., additional tokens, coins, or multipliers).

An exemplary game, consistent with disclosed embodiments, is described next. It is to be understood that this description is exemplary and nonlimiting and the concepts described below and/or other concepts may be implemented in the disclosed embodiments in many other ways. For example, a game may involve a pirate character (e.g., Long John Silver) attempting to search for buried treasure using a treasure map. The game may include displaying a treasure map on a display of a computing device. The treasure map may be a multidimensional map that may or may not be animated and that may be associated with varying displays of geography and location. In some embodiments, the multidimensional map may display a sandy surface of a deserted island.

Figure 5:
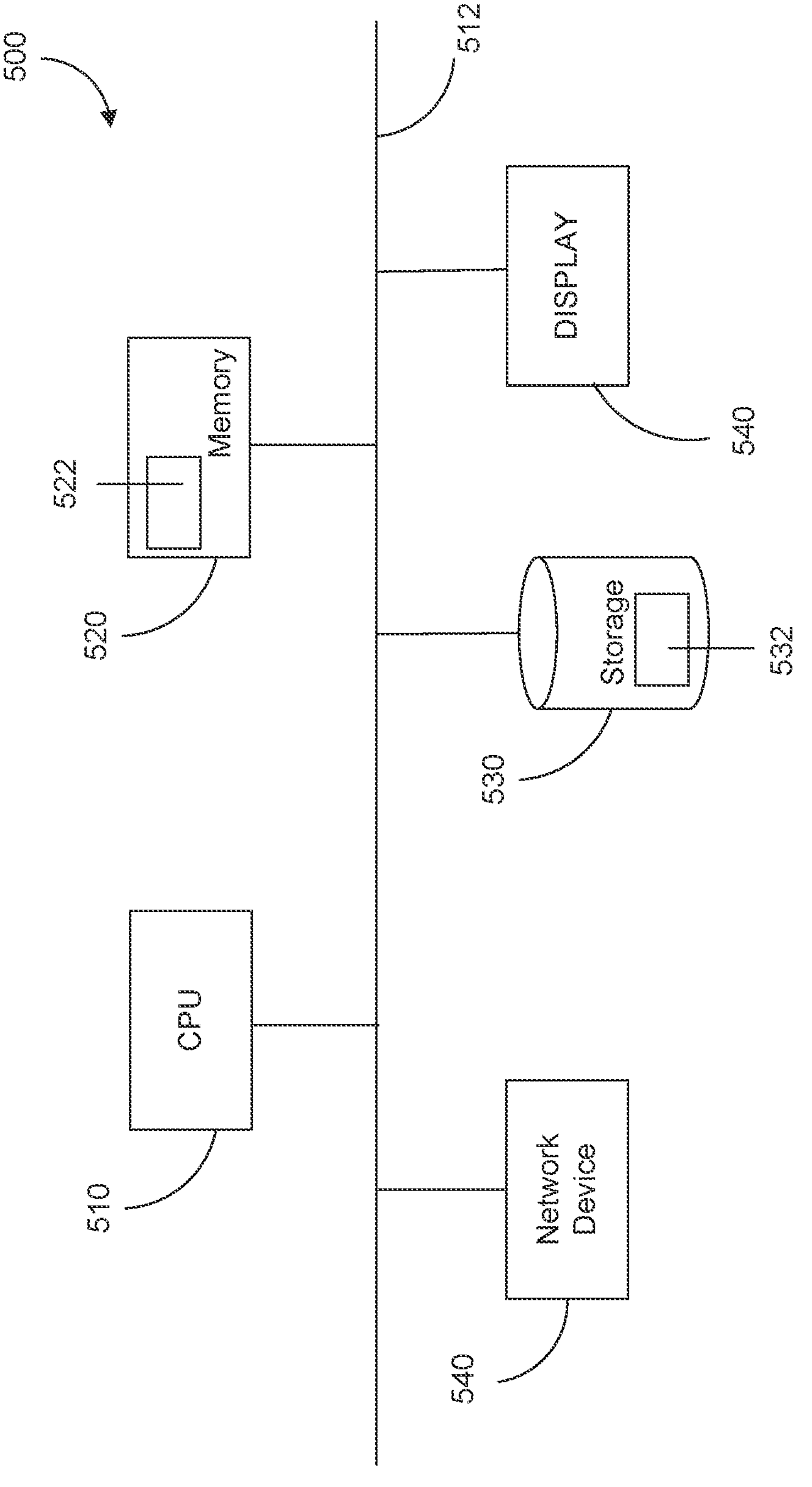
FIG. 5 is an exemplary schematic diagram of a computing device, consistent with some disclosed embodiments.

By way of a nonlimiting example, FIG. 1 illustrates an exemplary multidimensional map 100 that may be displayed on a display 540 of a computing device 500, as illustrated in FIG. 5. As illustrated in FIG. 1, multidimensional map 100 may include representation of a sandy surface 102 on a portion of island 104. Map 100 may also include, for example, a water body 106 bounding island 104, one or more rocks 108, and/or other natural or geographic features that may be present on island 104.

In some embodiments, the multidimensional map may be displayed as including a plurality of distributed spaces (e.g., tiles). In some exemplary embodiments, the multidimensional map may include thirteen columns of spaces along a width of the map (e.g., along a y axis) and fifty rows of spaces long along a length of the map (e.g., along an x axis). It should be understood, however, that the multidimensional map may have any number of columns and rows. A character may move forward along the x-axis and sideways (e.g., to the left or right) along the y-axis. In some embodiments, only a portion of the multidimensional map may be visible on a computing device at any time. For example, the computing device may display a window showing a total of thirty-six distributed spaces, or six rows by six columns.

Figure 2:
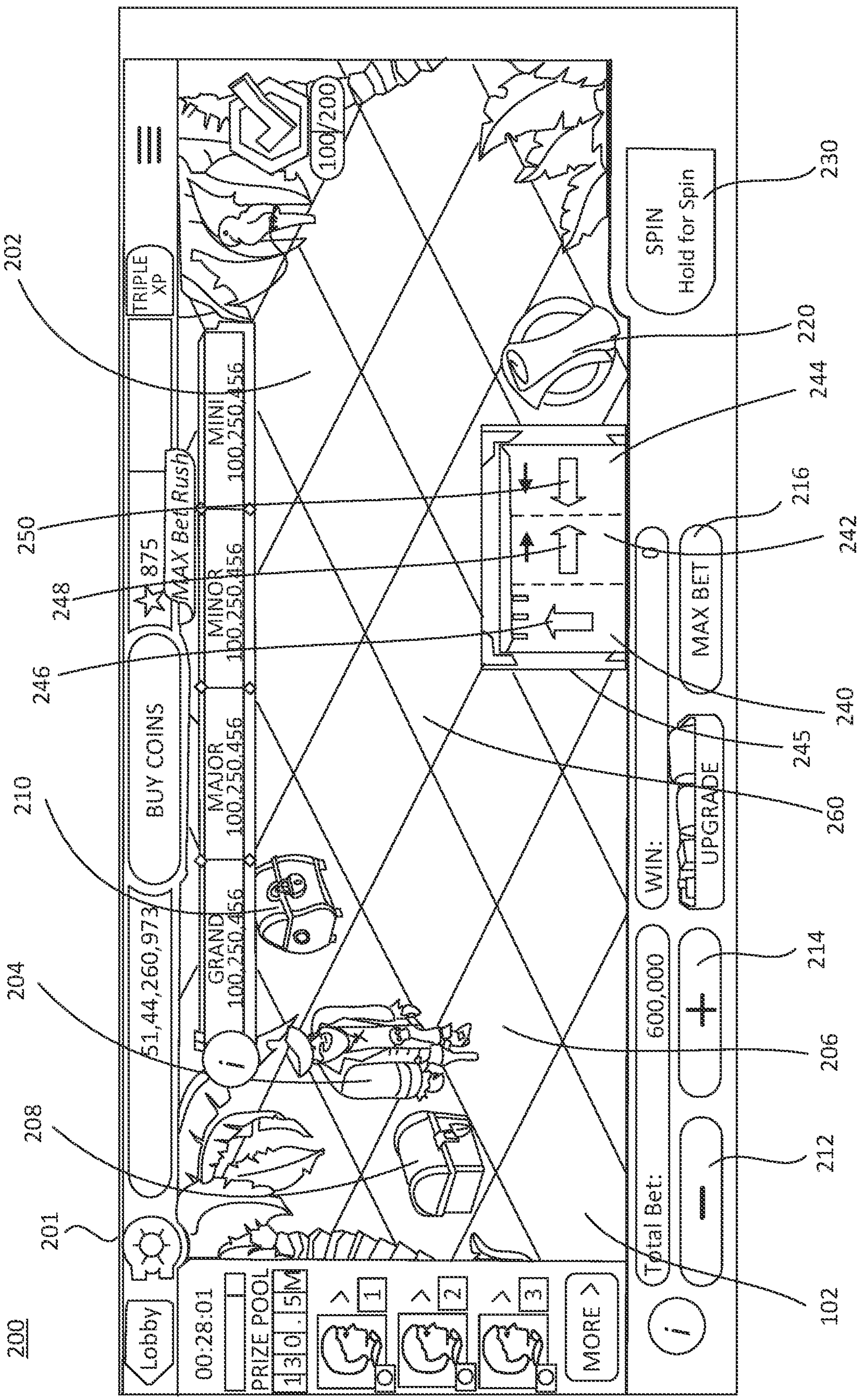
FIG. 2 is an exemplary display of a portion of a multidimensional map together with random directionality indicators, consistent with some disclosed embodiments.

By way of a nonlimiting example, FIG. 2 illustrates a portion 200 of multidimensional map 100. As illustrated in FIG. 2, portion 200 may display sandy surface 102 in the form of a plurality of distributed spaces 202 distributed in rows and columns along two axes of map 100. As further illustrated in FIG. 2, character 204 (e.g., a representation of a pirate such as Long John Silver) may be displayed as occupying one of the tiles or spaces 206.

Multidimensional maps may be unpredictably generated for each and every game instance, so that no one map is the same. Multidimensional map parameters and elements may be determined uniquely for each map to provide for map constraints and map features, respectively. Multidimensional map parameters may include, for example, a map height, a map width, a map length, a map type, a map geography, or a map size. Multidimensional map elements may also include, for example, a location of an award on the multidimensional map, an identity of an award, a number of the awards, or a functionality associated with a particular location on the multidimensional map. The multidimensional map may be generated based on the map parameters and elements. In some embodiments, a multidimensional map input may be received and the multidimensional map may also be based on the received multidimensional map input. Data may be collected with each multidimensional map and stored to be partially used or reviewed before making a new multidimensional map to improve player experience with the game. The multidimensional map may be two-dimensional, three-dimensional, or four-dimensional. For example, multiple two-dimensional maps may be generated based on the same parameters and different elements, and then stacked on top of one another to create a three-dimensional map. By way of example, as illustrated in FIG. 2, portion 200 of multidimensional map 100 may include elements 208, 210 (e.g., treasure chests 208, 210).

A wager (e.g., an assurance) may be received from a player, and the multidimensional map may be generated based on the wager. For example, if a new wager amount is received during a game session and exceeds a wager amount threshold, a new multidimensional map may be generated. In another example, the map parameters and map elements may be compared against one another when generating multidimensional maps, and when there is a match, a new map parameter or element may be generated to avoid creating the same multidimensional map.

The multidimensional map may reveal outcomes associated with movements of the character determined based on one or more reels as will be explained later. As described above, the multidimensional map may include a plurality of columns and rows. Each intersection of a column and row may form a space (e.g., space 202 of FIG. 2). The multidimensional map may include a plurality of such spaces. For example, a multidimensional map having thirteen columns and fifty rows, would include six-hundred and fifty spaces.

In some embodiments, a player may input a wager on a computing device, by entering an input corresponding to either "+/−", "Max BET," or "Upgrade" widget to enter or change the wager. For example, as illustrated in FIG. 2, one or more buttons or widgets 212, 214 may be displayed to allow a player to increase or decrease an amount of a wager. Thus, for example, a button or widget 212 with a "+" sign may allow a player to increase the amount of the wager, and a button or widget 214 with a "–" sign may allow the player to decrease the amount of the wager. As also illustrated in FIG. 2, a button or widget 216 labeled "MAX BET" may allow the player to wager all of the tokens, coins, points, credits, or other monetary equivalent that the player has currently applied in the game. When a player changes a previously placed wager, the computing device may display a "Change-Bet" pop-up graphical user interface that may state that the multidimensional map will reset and the character (e.g., Long John) will start over at an initial starting location. The player may then select from two options: "OKAY" or "CANCEL." Then a mini-map displaying a new multidimensional map may appear, showing a new character location and a newly populated multidimensional map. In some embodiments, the length of time of the "Change-Bet" pop-up may be one second, two seconds, ten seconds, or any other predetermined amount of time. When the player chooses the "OKAY" widget, a new multidimensional map may be generated, and the user may start over. On the other hand, when the player chooses the "CANCEL" widget the "Change-Bet" pop-up may close, and the player may continue with the next spin.

In some embodiments, a display of the entire multidimensional map may be accessed through a "MAP" icon located to the right of the reels icon. When a user selects the "MAP" icon, a multidimensional map appear and the player may be able to scroll through the map, showing the character location and locations of awards. This may be advantageous so that the player may determine whether the Long John character is on track for reaching locations with awards. Any time a pop-up of the multidimensional map is displayed, the pop-up may be scrolled using a control to the left side of the pop-up, and may be closed using an "X" in the upper right corner of the pop-up. Various awards (e.g., chests, wheels, rum bottles, coins) may be seen on the multidimensional map, along with any other visible coins, awards, and events.

Figure 3:
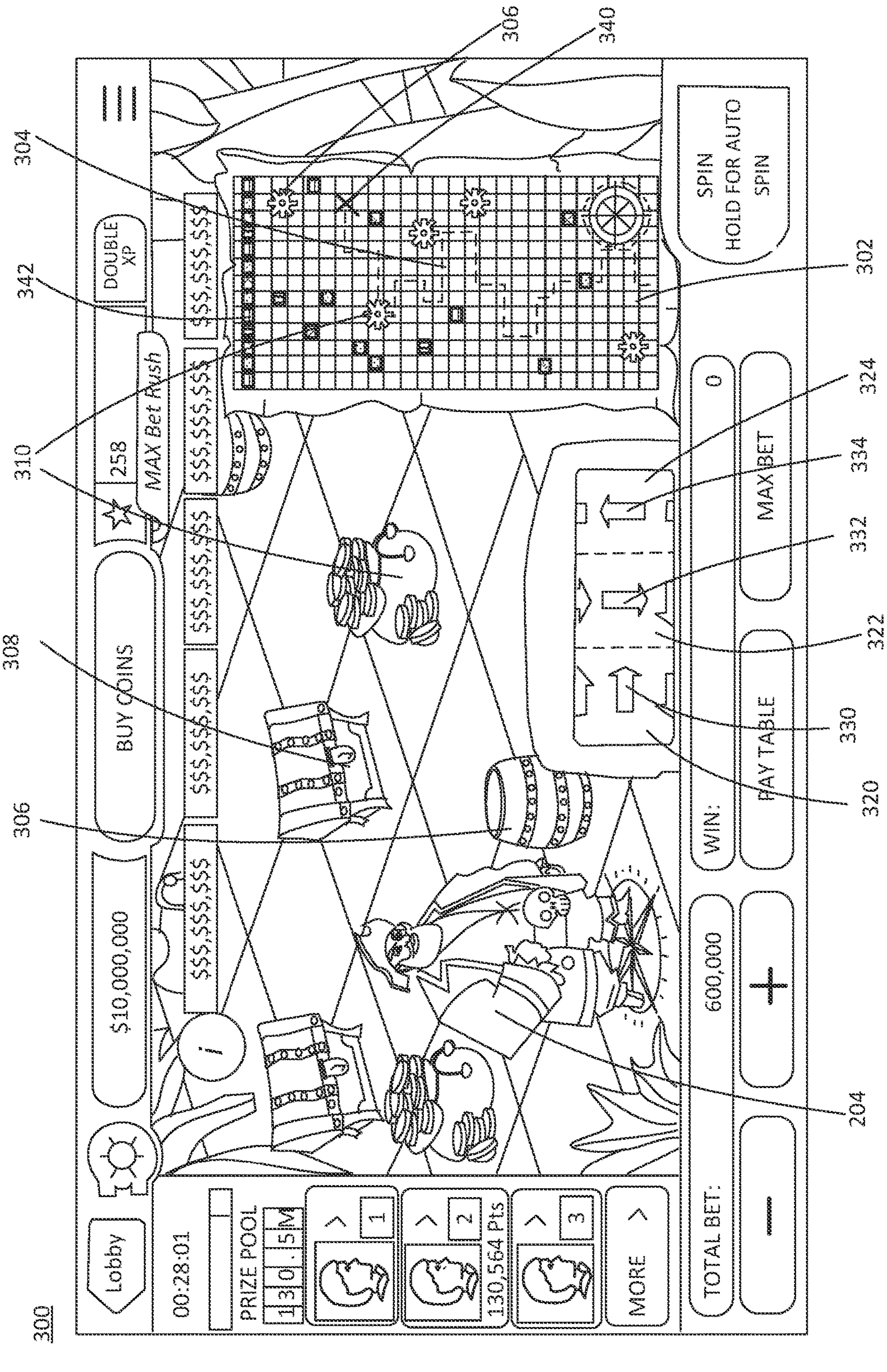
FIG. 3 is another exemplary display of a portion of a multidimensional map including a pop-up of the entire multidimensional map, consistent with some disclosed embodiments.

For example, as illustrated in FIG. 2, the display of map 100 may include a "MAP" icon 220. By way of a nonlimiting example, FIG. 3 illustrates a portion 300 of multidimensional map 100. When a user clicks on or selects icon 220, map 302 may appear, allowing the player to scroll through an entirety of multidimensional map 100, showing the character location and locations of awards. As illustrated in FIG. 3, map 302 may illustrate the location of character 204 by a "X" sign. A path 304 (e.g., shown in dashed line) traveled by character 204 during a current session of the game may also be displayed on map 3022. In addition, awards 306, 308, 310 may be illustrated on both map portion 200 and map 302 currently displayed on the display of a computing device.

The disclosed system may dynamically enhance the generation of multidimensional maps. As described above, each multidimensional map may include multidimensional map parameters and multidimensional map elements. The multidimensional map parameters and multidimensional map elements may be used to generate the multidimensional map. Quality measures may be determined and associated with each multidimensional map. Together, the multidimensional map parameters, multidimensional map elements, and quality measure may be stored, for example, in a data structure or database. In future generations of multidimensional maps (e.g., subsequently generated maps), the previously stored multidimensional map parameters, multidimensional map elements, and quality measures may be used to create and enhance the subsequently generated multidimensional maps. Various dynamic rules associated with multidimensional map parameters and multidimensional map elements may be used to affect multidimensional map generation. Multidimensional maps may be monitored to prevent the quality measure from exceeding or falling below threshold quality measures to enhance user experience.

As mentioned above, wagers (e.g., assurances) for each session of a multidimensional map may be received. Historic session information may be retrieved related to prior sessions. The multidimensional map may be generated based on the retrieved historic session information and the received wagers. During a particular session, data may be collected characterizing that session. In a subsequent session, a second similar or different assurance may be received. A new multidimensional map may be generated based on the historic session information and the collected data to enhance map creation.

As discussed above, the multidimensional map may include one or more awards in one or more of the plurality of spaces. One of the most common awards in the game may include coins. Coins may be located in bags (e.g., 310 in FIG. 3), in chests (e.g., 308 in FIG. 3), on ship wheels, or may be buried in the sand. The coins that are buried in the sand may be discovered by a character digging in that location or space.

Other awards may include chests (e.g., 308 in FIG. 3). Chests may vary in size and may include small chests, medium chests, and large chests. A small chest may contain either coins, a mini jackpot, or free spins. A medium chest may contain either coins, a minor jackpot, or free spins. A large chest may contain either coins, a major jackpot, a grand jackpot, or free spins. A jackpot (e.g., mini, minor, major, or grand) may include, for example, an award (e.g., tokens, coins, points, credits) that may be some predetermined multiple of the wager placed by a player or alternatively may include a predetermined number of tokens, coins, points, or credits, or any other object having a monetary value that may be significantly higher (e.g., double, triple, 5 times higher, 500 times higher, 1000 times higher) than a maximum wager that a player may be allowed to place. A mini jackpot may be smaller than a minor jackpot, which may be smaller than a major jackpot, which in turn may be smaller than a grand jackpot.

Other awards may include a ship's wheel. The ship's wheel may in turn award a bonus that may award tokens, coins, points, or credits, jackpots, or free spins. The ship's wheel may also award multiple spins of the ship's wheel for multiple awards. For example, if the character moves to a location with an associated award in the form of the ship's wheel, either by visibly interacting with one or discovering one by digging, an associated animation with the ship's wheel may be displayed on the display of the computing device. A pop-up graphical user interface may appear on the display of the computing device, showing "Ship's Wheel Bonus" where the "external bonus" is loaded, to enable a player to visibly see a wheel trigger. The ship's wheel may land on any one of the following or more: a coin award, a jackpot award, free spins award, and/or a double. A double may allow the player to spin again and the award may be doubled in value. Once the ship's wheel spin is complete, the ship's wheel graphic may fly out of one of the edges of the display of the computing device and the character may wait at its current location until a next turn or next instance of gameplay.

Other awards may include rum bottles award. When one of the plurality of spaces includes this award, a plurality of rum bottles may be displayed, and a player may select a single one of the plurality of rum bottles. Each bottle may contain one of the following: empty contents, a three times multiplier coin award, a five times multiplier coin award, and a seven times multiplier coin award. It is contemplated that the bottle may contain some other multiplier coin award. Another possible content of a rum bottle may include a randomly chosen award from the following group a mini jackpot, a minor jackpot, a major jackpot, a grand jackpot, a fifteen times multiplier coin award, or a double. The double may double all the awards in the rum bottles, shuffle them, and then have the player select a rum bottle again.

Other "awards" may include garbage. For example, the character may dig in a space to reveal the garbage award. The garbage award may include boots, fish bones, old anchors, or any related item. Upon digging and discovering the garbage award, the garbage award may cause animations of the garbage landing on the space and a crab walking down to carry the garbage off, with the character providing a disappointment animation.

Another award may include free spins award. In some example, free spins may include one, two, three, four, five, or any other number of free spins on one of two mini-games. A sub-session of a game (e.g., mini game) may dynamically impact a main session of a game involving a multidimensional map. For example, the multidimensional map may include a plurality of distributed spaces, and the plurality of distributed spaces may include at least one triggering space with associated sub-session triggering functionality. A character may move to the triggering space. Upon landing on the trigger space, the sub-session may be initiated. The main session may be paused during a period when the sub-session is active. The sub-session functionality may be invoked at this time resulting in a sub-session outcome. Upon cessation of the sub-session, the main session may be resumed and may be impacted by the sub-session outcome. The sub-session functionality may include a mini game, a loot box, a spinning wheel, avatar interaction, an item selection, or an award discovery. The sub-session functionality may include an award of a bonus and impacting the main session may include applying the bonus in the main session. The sub-session functionality may include a penalty and impacting the main session may include applying the penalty in the main session.

The mini games may include "Skull & Crossbones" and "Here Be Monsters," or any other games. Skull & Crossbones may include mini awards including skulls (two times multipliers), swords (wild awards that can be stacked), bars, "sevens," three skulls (may award a grand jackpot), and one-line games. Here Be Monsters may include monster wild awards that affect the spun reel and monsters on all three reels may award a top jackpot. Although particular types of awards and/or mini games have been discussed above, it is contemplated that many other types of awards and/or mini games may be included in the game in one or more of the disclosed embodiments.

A multidimensional map may be populated and/or seeded with awards throughout. The multidimensional map may be seeded with awards, among other events, items, and characters. Seeding may refer to positioning awards throughout one or more of the plurality of spaces of the multidimensional map. A character may be positioned at a first character location on one of the plurality of spaces. A first seeding of awards may be performed on a subset of the plurality of distributed spaces. The subset of the plurality of spaces may be selected based on the first character location. Thereafter, the character may move to a second character location during the game. The second character location may immediately proceed from the first character location. A second seeding of awards may be performed for a second subset of the plurality of distributed spaces. The second subset of the plurality of spaces may be selected based on the new location of the character. In some embodiments, the second subset of the plurality of spaces may be selected based on one or both of the first and second locations of the character. The awards may be positioned closer to the character's location or further away from the character's location. Positioning of the awards may take into account avoiding distribution of at least some awards to spaces less likely to be reached by the character in a subsequent move. The first set of awards may be the same as or different from the second set of awards.

In the game, character movement may be implemented relative to a multidimensional map. A user may enter a bet (e.g., a wager or an assurance) and a request to generate a random directionality outcome may be received. The request may include activation of an element for causing a reel spin on a virtual slot machine. The reel may include a plurality of reels. In some embodiments, a graphical representation of one or more reels may be displayed on the display of the computing device. When the user activates the element for causing the one or more reels to spin, and animation showing a graphical representation of spinning reels may be displayed on the display of the computing device. The random directionality outcome may include a combination of directions derived from the plurality of reels. A reel may be "spun" to reveal a combination of three or more symbols (e.g., including a combination of directionality indicators). The combination of symbols may determine where the character advances to in the multidimensional map. In some embodiments, each symbol may be weighed, before the request is received, based on the character's current location. Weighing the symbol may be based on the character's relative location to a boundary of the multidimensional map or a geography of a part of the multidimensional map. In some embodiments, the user may continue with the same bet amount and continue to request to generate random directionality outcomes to be received for each instance of gameplay. These received random directionality outcomes may determine the path of character movement in the multidimensional map. The symbols representing the directionality indicators may be presented on different icons or on a common icon. The symbols may represent a cardinal direction or include a forward direction, a reverse direction, a right direction, a left direction, or an indicator of non-movement (e.g., a blank space). Further, the symbols may be in the form of multiples (e.g., two right directions). In some embodiments, the character may be restricted from moving backwards.

For example, the reel may be a reel with three faces on which the symbols may appear. The symbol may be a right arrow, a left arrow, and an up arrow. The right arrow would move the character right by one space, the left arrow would move the character left by one space, and the up arrow would move the character up by one space. In another example, a double right arrow would move the character right by two spaces. In another example, if the reel displays three blanks, the character (e.g., Long John) may play a disappointment animation and not move for the current space. The combination of the symbols may determine the characters movement. In some embodiments, the symbols may be read from left to right. For example, when the random directionality outcome contains the following three symbols (left arrow, right arrow, and up arrow), the character may move left one space, right one space, and up one space. In some embodiments, the character may move left, right, or forward, one, two, or three spaces for each reel outcome.

For example, as illustrated in FIG. 3, graphical icon 310 may illustrate reels 320, 322, 324. Reels 320, 322, 324 are illustrated in FIG. 3 as separated by vertically-oriented dashed lines. Further, as illustrated in FIG. 3, reels 320, 322, 324 may display directionality outcomes 330, 332, 334. For example, as illustrated in FIG. 3, directionality outcome 320 may depict a right arrow indicating that character 204 must move right by one space, directionality outcome 322 may depict a right arrow indicating that character 204 must move right by another space, and directionality outcome 324 may depict an up arrow indicating that character 04 must move forward by one space. It is to be understood that the directionality indicators 330, 332, 334 discussed above are exemplary and non-limiting and that reels 320, 322, 324 may display other combinations of symbols and/or other combinations of directionality indicators.

The goal of the user is to stay on the map with each "spin" of the reel, and the ultimate goal is to reach jackpot awards located in the final row of the multidimensional map. In some embodiments, the final row of the multidimensional map may be row fifty and may include a treasure chest on every distributed space in the row (e.g., thirteen treasure chests). Some treasures chests may award free spins, and others may have jackpot awards. After a chest from row fifty is awarded, the character may return to a starting location on a newly generated multidimensional map. However, the character, in its journey, may also receive other awards along its journey and encounter other in-game events.

For example, if the character moves to a location with no visible award, the character may "dig" to determine if there is a hidden award or associated event with the space. In some examples, the character may find nothing or garbage. In other examples, the character may "dig" and reveal the hidden award or the associated event. For example, if the hidden award or the associated event is a treasure chest, the character may pull it up to reveal it. If the hidden award or the associated event is a wheel, the character may pull it up to spin it. If the hidden award or the associated event is a coin or coins, the coin or coins may fly up and be awarded to the player. In some embodiments, if there is a visible award with the space the character moved to, the character may interact with it. If the award is a treasure chest, the character may open it. The treasure chest may reveal coins, jackpots, or free spins.

Upon character movement, a character may find itself moving to an endangered location associated with a termination risk. The endangered character location may include an existence of an obscured condition for abating the termination risk. In some instances, the existence of the obscured condition may be determined and the termination risk may be abated by repositioning the character on the multidimensional map from the endangered character location to a safety location lacking the termination risk. The determination may include probabilistically determining in a given instance that the termination risk is abated. The endangered character location may be a location beyond a boundary of a plurality of distributed spaces included with the multidimensional map. The safety location may be non-predictably determined or a location other than an initial character location. The safety location may be determined as a function of the initial character location or as a function of the endangered character location.

Figure 4A:
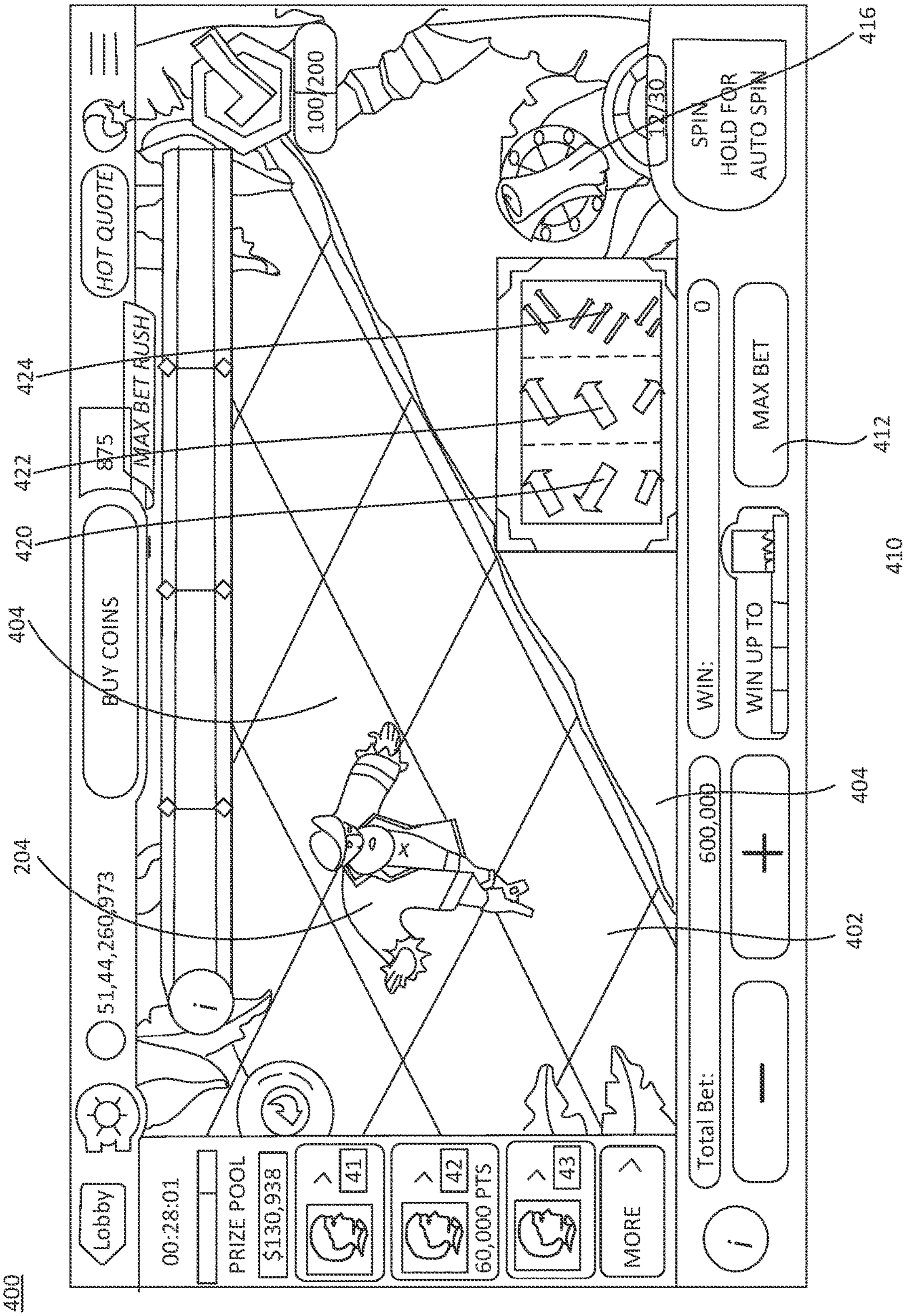
FIG. 4A is another exemplary display of a portion of a multidimensional map together with random directionality indicators displayed a reel, consistent with some disclosed embodiments.
Figure 4B:
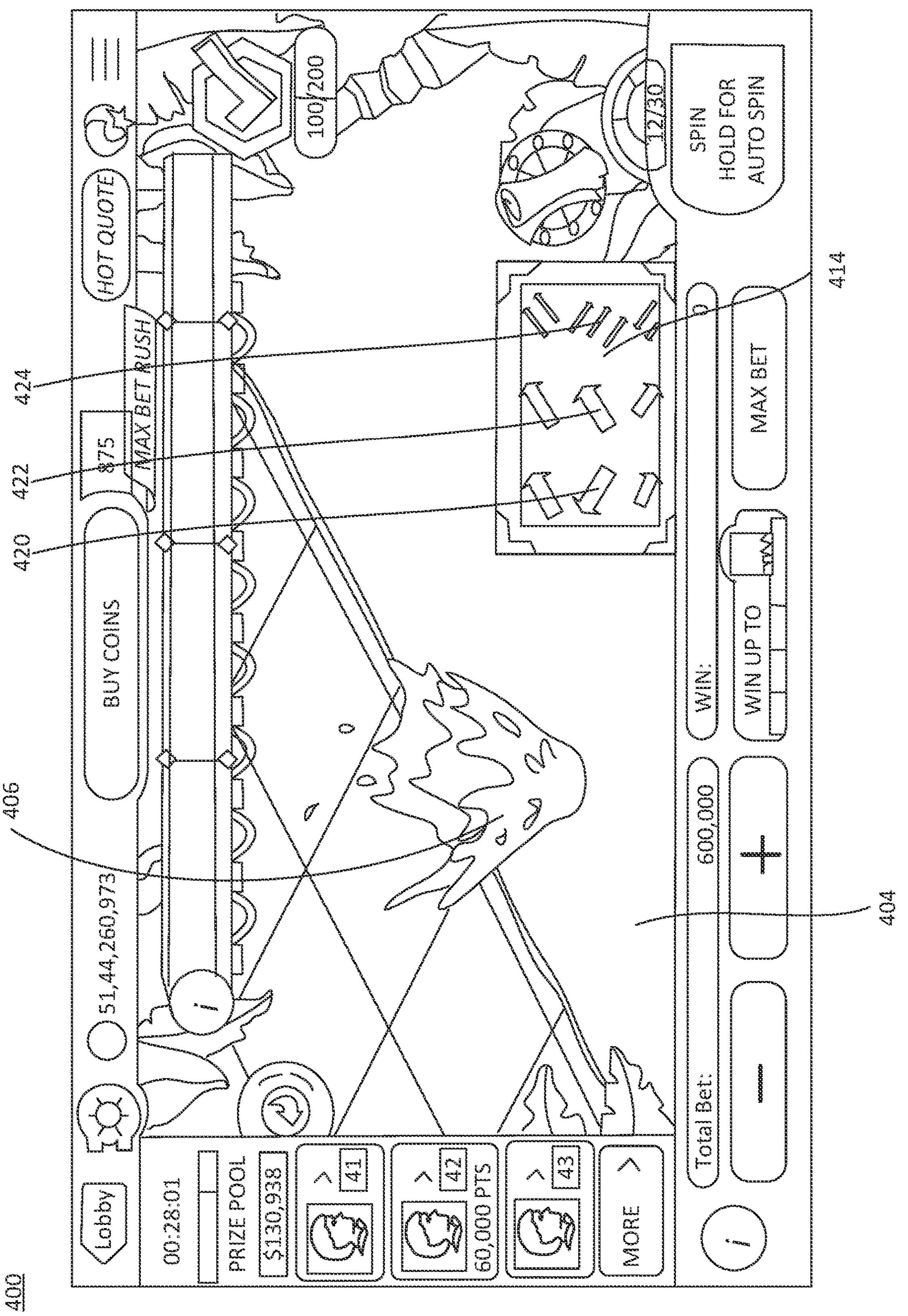
FIG. 4B is another exemplary display of a portion of a multidimensional map together with random directionality indicators displayed on a reel, consistent with some disclosed embodiments.
Figure 4C:
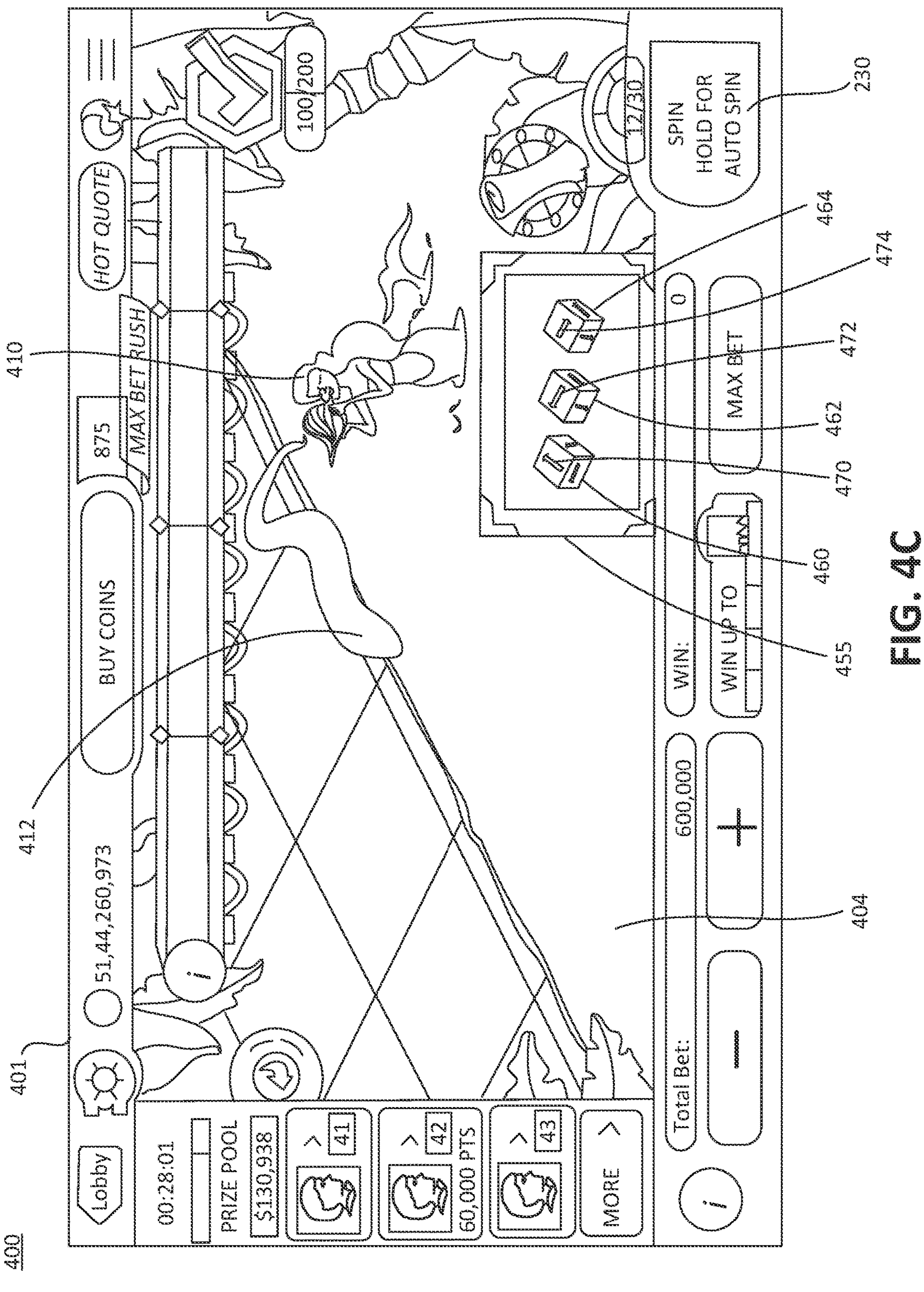
FIG. 4C is another exemplary display of a portion of a multidimensional map together with random directionality indicators displayed on dice faces, consistent with some disclosed embodiments.
Figure 4D:
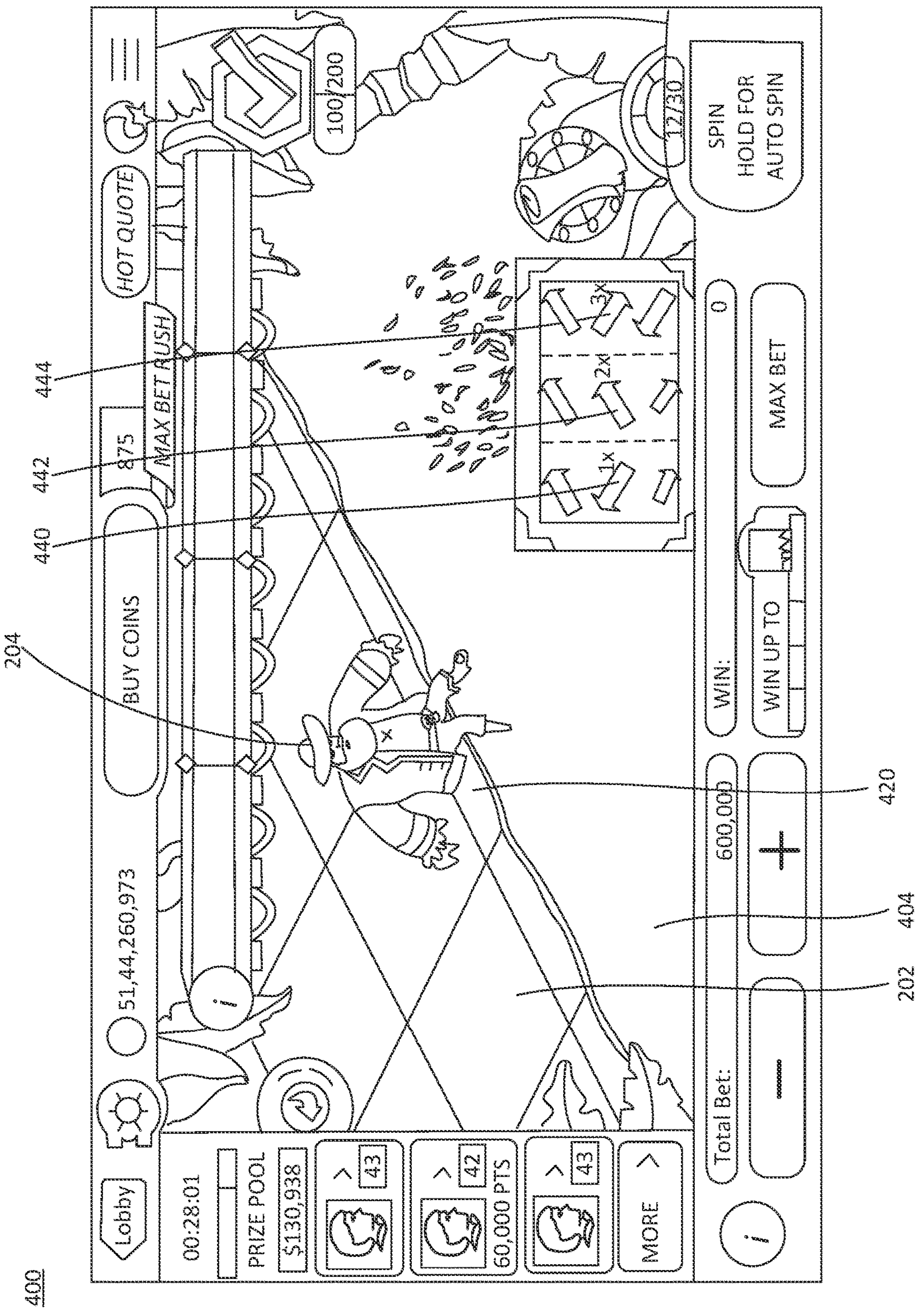
FIG. 4D is another exemplary display of a portion of a multidimensional map together with random directionality indicators displayed on a reel, consistent with some disclosed embodiments.

For example, when a character leaves or falls off a multidimensional map (e.g., the character moves too far left or right and falls into water), the character may be returned to a starting location in the multidimensional map. In some instances, the character may be saved and returned to the multidimensional map near the location where the character fell off. Mermaids may save the character (e.g., Long John) and return the character to a location on the row of distributed spaces that the character fell off from. By way of a non-limiting example, FIG. 4A illustrates character 204 located on title 402 adjacent to water body 404. The movement of character 204 in a forward direction may cause character 204 to fall off map 100 and into water body 404 as illustrated by the splash 406 of water in FIG. 4B. When this happens, as illustrated in FIG. 4C, a mermaid 410 may appear in water body 404. As also illustrated in FIG. 4C, an animation of mermaid 410 playing music 412 may be displayed. After completion of the animation, as illustrated in FIG. 4D, the mermaid may cause character 204 to be returned to a location 420 on the row of spaces 202 from which character 204 fell into water body 404

FIG. 5 shows a schematic diagram of an exemplary computing device 500 on which the game may be executed and played, consistent with some disclosed embodiments. In some embodiments, computing device 500 may include one of a laptop computer, a desktop computer, a tablet, a small form, a smart watch, an augmented reality device, a virtual reality device, smart glasses, or any other device capable of performing one or more computations and displaying one or more animated or in animate graphical images. Computing device 500 may include at least one processor 510, as discussed elsewhere in this disclosure. Processor 510 may be coupled via bus 512 to memory 520. Processor 510 and/or the memory 520 may also include non-transitory computer or machine readable media for storing software. As used herein, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals.

Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Bus 512 may refer to a physical connection between processor 510 and memory 520 that may allow exchange of electrical signals representing commands or data between processor 510 and memory 520. Memory 520 may refer to a memory device as discussed elsewhere in this disclosure.

In some embodiments, memory 520 may include memory portion 522 that may contain instructions that when executed by processor 510 performs one or more methods described in more detail herein. Memory 520 may be further used as a working scratch pad for processor 510, a temporary storage, and others, as the case may be. Processor 510 may be further connected to a network device 540, such as a network interface card, for providing connectivity between computing device 500 and a network, such as a network 610, discussed in more detail with respect to FIG. 6 below. Processor 510 may be further coupled with storage 530. In some embodiments, storage 530 may be used to store database 532, which may include single data type column-oriented data structures, data elements associated with the data structures, and so on.

A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Computing device 500 may include or be connected to display 540. Display 540 may include an LCD or LED display, a touchscreen display, an augmented reality (AR) device, a virtual reality (VR) device, a projection system, or any other type of display device capable of displaying graphical representations of the multidimensional map and associated features (e.g., character, awards, reels) for viewing by the player.

Figure 6:
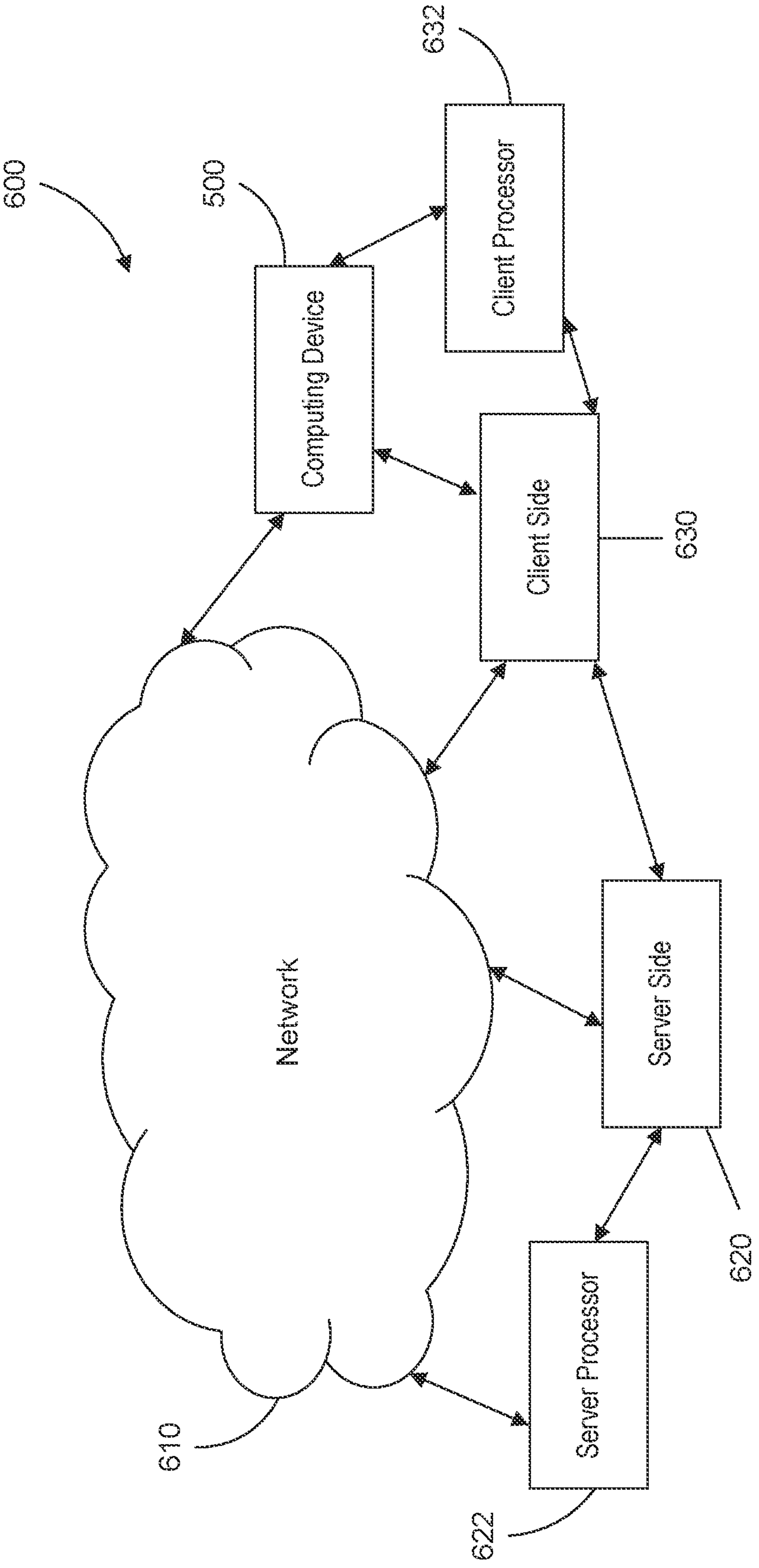
FIG. 6 is an exemplary network diagram of a system in which various disclosed embodiments are implemented.

FIG. 6 is a network diagram of an exemplary environment in which various disclosed embodiments are implemented. Computing architecture 600 may include computing device 500 that may be coupled to a network 610. Network 610 may enable communication between different elements that may be communicatively coupled with the computing device 500, as further described herein below. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

One or more client-side devices 630 may be communicatively coupled with computing device 500 and client processor 632 via network 610. Client-side device 630 may be configured to send to and receive from the computing device 500 data. Both client-side device 630 and computing device 600 may communicate with network 610. One or more server-side devices 620 may be communicatively coupled with server processor 622 and client-side device 630 via network 610.

Conventional slot machines include one or more reels, each of which has a number of symbols. In conventional slot machine gameplay, a player places a wager and pulls a lever or pushes a switch or button to cause the reels to spin. The reels eventually stop spinning and display symbols on their face. The combination of symbols on the one or more reels may correspond to an award for the player or no award for the player.

Unlike conventional slot reels which display symbols or numbers corresponding to an award, embodiments of the present disclosure include one or more reels that display directionality indicators. The reels in the disclosed embodiments may be physical reels or may be graphical representations of the reels displayed on a display (e.g., display 540) of a computational device (e.g., computational device 500). As in the conventional slot machines, a player may place a wager and may then select or engage with one or more widgets or icons on the display to cause the reels to spin. When the reels are displayed as graphical representations, spinning of the reels may be displayed as an animation on a display of a computing device. When the reels stop spinning, the reels in the disclosed embodiments may display a combination of directionality indicators. As discussed above, a character located on a multidimensional map may move from its current location to a new location based on the combination of directionality indicators. The player may receive one or more awards based on the new location of the character. Thus, the reels of the present disclosure may not directly correspond to an award for a player. Instead, movement of a character on a multidimensional map as determined by the symbols on the reels may correspond to an award for the player.

Some embodiments involve a non-transitory computer readable medium containing instructions that when executed by at least one processor cause the at least one processor to perform operations for implementing character movement relative to a multidimensional map. A non-transitory computer-readable medium may be understood as described elsewhere in this disclosure. A computer-readable medium containing instructions may refer to such a medium including program code instructions stored thereon, for example to be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), and/or any other programming language. At least one processor may include one or more processing devices as described elsewhere in this disclosure (e.g., processor 510, 622, or 632). Instructions executed by at least one processor may include implementing one or more program code instructions in hardware, in software (including in one or more signal processing and/or application specific integrated circuits), in firmware, or in any combination thereof, as described earlier. Causing a processor to perform operations may involve causing the processor to calculate, execute, or otherwise implement one or more arithmetic, mathematic, logic, reasoning, or inference steps, for example by a computing processor.

A map may refer to a diagrammatic representation of an area of land and/or water body showing one or more geographical or physical features. Such geographical or physical features may include for example, a flat or undulating land surface, a beach, a grassy or forested area, vegetation, a desert, sand, water bodies such as a lake, a river, or a sea, roads or other pathways, housing, dwelling, or other structures, or any other natural or manmade physical or geographical structure. A multidimensional map may refer to a map that may represent the area of land and/or water body in more than one dimension. For example, a multidimensional map may have two, three, or four dimensions. Each dimension of a multidimensional map may represent a direction relative to a reference point or surface. For example, a two-dimensional map may represent an area along two directions distinct from each other. In some embodiments, the multidimensional map is defined by a cartesian coordinate system. A cartesian coordinate system may refer to a scheme in which each point in a plane is uniquely specified by a pair of real numbers called coordinates. The coordinates may include signed distances to the point from two lines (e.g., representing x and y axes), called coordinate axes, or axes. The point where the two lines intersect is the origin and may have coordinate (0, 0).

Figure 7:
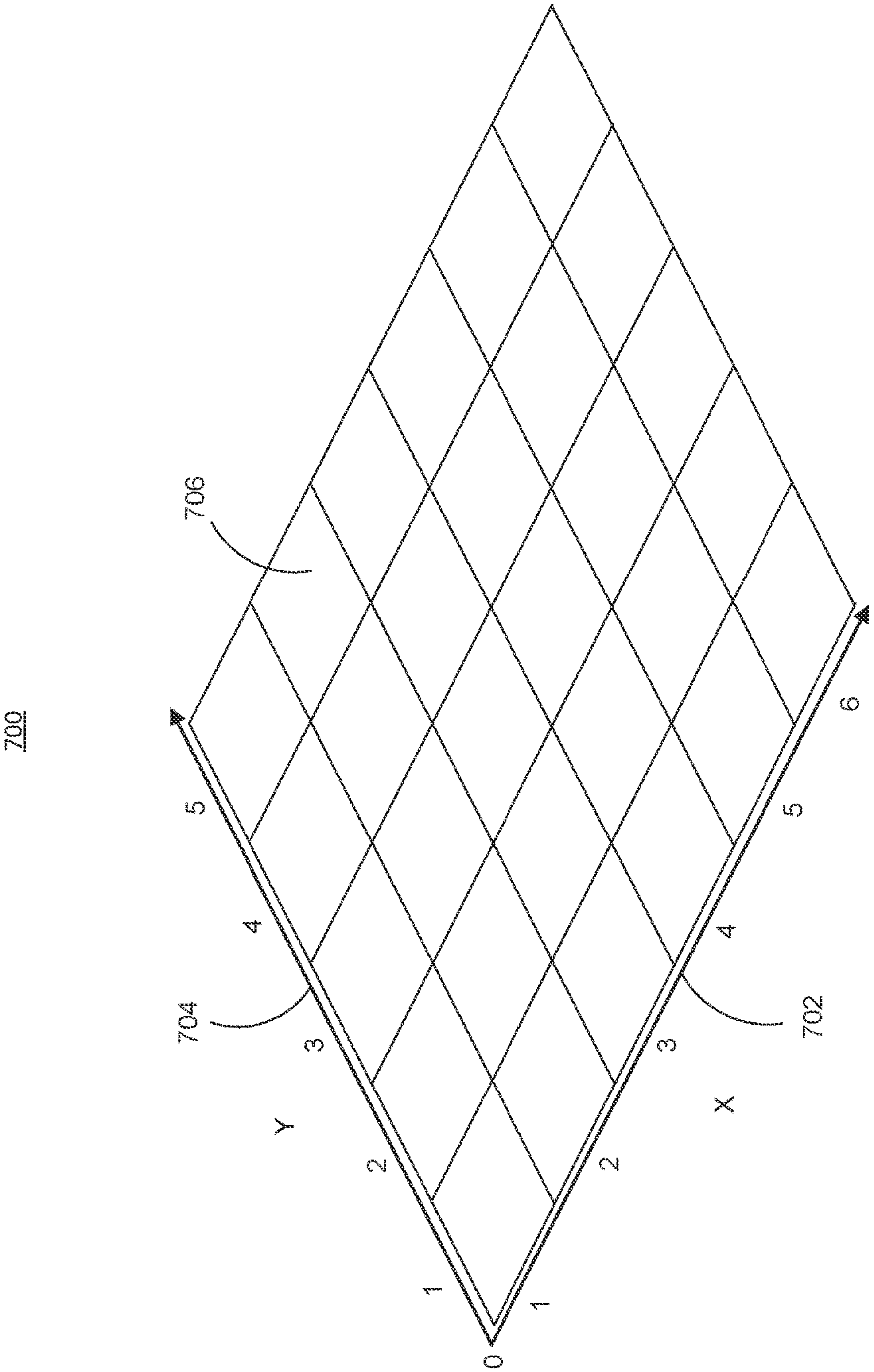
FIG. 7 is an exemplary display of a plurality of distributed spaces of a multidimensional map, consistent with some disclosed embodiments.

In some embodiments, the cartesian coordinate system includes an x-axis and a y-axis. Thus, for example, one of the two intersecting lines may be labeled as the x-axis while the other of the two intersecting lines may be labeled as the y-axis. As is well known, in the pair of numbers (a, b) representing the coordinates of the point, the number "a" may represent the distance of the point from the origin along a positive or negative direction of the x-axis depending on the sign associated with the number "a." Likewise, the number "b" may represent the distance of the point from the origin along the positive or negative direction of the y-axis depending on the sign associated with the number "b." For example, the coordinate (5, 7) may represent a distance equivalent to 5 units from the origin along the positive direction of the x-axis and a distance equivalent to 7 units on the origin along the positive direction of the y-axis. Similarly, for example, the coordinate (−3, −4) may represent a distance equivalent to 3 units from the origin along the negative direction of the x-axis and a distance equivalent to 4 units on the origin along the negative direction of the y-axis. By way of a non-limiting example, FIG. 7 illustrates an exemplary two-dimensional map 700 represented in the cartesian coordinate system having an x-axis 702 and a y-axis 704. As illustrated in FIG. 7, map 700 may include six columns of spaces and six rows of spaces, providing 36 spaces 706 disposed about x-axis 702 and y-axis 704.

Although a two-dimensional map has been discussed above, it is contemplated that in some embodiments the map may be three-dimensional. Such a three-dimensional map may also be defined by a cartesian coordinate system, in which an area of land or a water body may be represented along three directions distinct from each other. In a three-dimensional map, each point or location may be uniquely specified by a group of three real numbers called coordinates. The coordinates may include signed distances to the point from three fixed, generally perpendicularly oriented lines, called coordinate axes, or axes. The point where the three lines intersect may be referred to as the origin and may have coordinate (0, 0, 0).

In some embodiments, the cartesian coordinate system includes an x-axis, a y-axis, and a z-axis. For example, one of the three intersecting lines may be labeled as the x-axis, another one of the three intersecting lines may be labeled as the y-axis, and the remaining line may be labeled as the z-axis. As is well known, in the pair of numbers (a, b, c) representing the coordinates of a point or location on a three-dimensional map, the number "a" may represent the distance of the point from the origin along a positive or negative direction of the x-axis depending on the sign associated with the number "a." Likewise, the number "b" may represent the distance of the point from the origin along the positive or negative direction of the y-axis depending on the sign associated with the number "b." And the number "c" may represent the distance of the point from the origin along a positive or negative direction of the z-axis depending on the sign associated with the number "c." For example, the coordinate (5, 6, 7) may represent a distance equivalent to 5 units of length from the origin along the positive direction of the x-axis, a distance equivalent to 6 units of length from the origin along the positive direction of the y-axis, and a distance equivalent to 7 units of length from the origin along the positive direction of the z-axis. Similarly, for example, the coordinate (−3, −4, −5) may represent a distance equivalent to 3 units of length from the origin along the negative direction of the x-axis, a distance equivalent to 4 units of length from the origin along the negative direction of the y-axis, and a distance equivalent to 5 units of length from the origin along the negative direction of the z-axis. While the x and y axis may represent directions along a plane, the z-axis may represent a height and/or depth of a surface of the map relative to the plane defined by the x and y axes.

Figure 8:
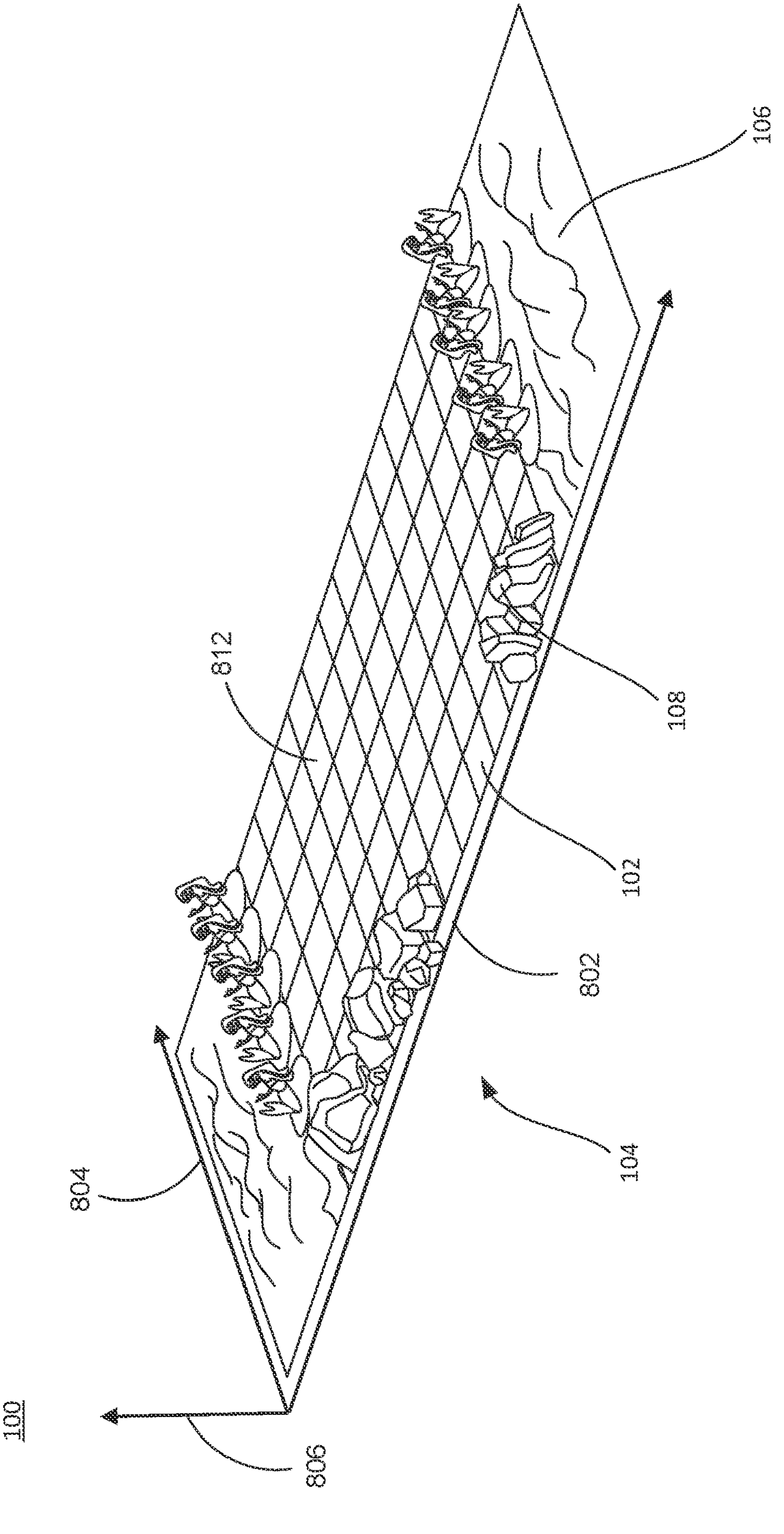
FIG. 8 is an exemplary display of the multidimensional map of FIG. 1, including a plurality of segmented distributed spaces, consistent with some disclosed embodiments.

By way of a non-limiting example, FIG. 8 illustrates an exemplary three-dimensional map 100 represented in the cartesian coordinate system having an x-axis 802 and a y-axis 804. As illustrated in FIG. 8, map 800 a planar surface 812 of the land or water represented in map 800 may be displayed along an x-axis and a y-axis. Moreover, z-axis 806 may represent a distance (e.g., height or depth) of the surface 812 (e.g., of land) represented on map 800 relative to the plane defined by the x and y axes. For example, a height of rock 108 above surface 812 may be represented by a distance measured along the z-axis. Although a cartesian coordinate system has been discussed above, it is contemplated that in some embodiments, a two-dimensional map may be represented using a polar coordinate system, a cylindrical coordinate system, a spherical coordinate system, or any other scheme for defining a map.

In some embodiments, the multidimensional map changes over time. The representations of one or more natural or geographic features or objects shown on a multidimensional map may be different at different times, including, for example, different times of the day, different times of the week, different times of the month, different times of the year, or differing elapsed time as judged from a baseline, such as initiation of gameplay. For example, a multidimensional map generated during the morning may represent an area of land and/or water body as it would appear during the daytime. In contrast, a multidimensional map generated during evening or night time may represent the area of land and/or water body as it would appear, for example, during sunset or under moonlight, respectively. By way of another example, the vegetation displayed on the multidimensional map may change depending on whether the time of the year corresponds to a summer month, a winter month, spring time, or fall. Other variations in the lighting conditions, colors, vegetation, and/or items displayed on the multidimensional map may be determined based on time, which may be determined from a clock associated with a computational device (e.g., device 100) displaying the multidimensional map, or a clock associated with, for example, server side device 620 and/or client side device 630.

Some embodiments involve causing a display of the multidimensional map, the display containing a plurality of distributed spaces. Causing a display of the multidimensional map may include displaying (e.g., information) visually in a manner that allows a user to view the multidimensional map, e.g., by activating one or more pixels of a display of a computing device, activating one or more LEDs, LCDs of the display, and/or activating one or more lasers or other light sources to project information (e.g., on a wall or a screen), and/or performing any other action that allows for information or data associated with the multidimensional map (e.g., for representations of the land or water surface, the character, and/or one or more award) to be visually perceived by a user. Causing the display may also include one or more of selecting a display medium (e.g., a display screen, a wall) for displaying the multidimensional map, determining a layout, size, and/or style for displaying the multidimensional map, selecting a region for displaying the multidimensional map (e.g., in association with a software application, window, frame, or functionality) on a display device associated with a computing device being used by a user to play the game.

The multidimensional map may be divided into a number of regions that may be equally or unequally sized. In some embodiments, the multidimensional map may be divided into a plurality of rectangular or square equally sized regions by a plurality of rows disposed along the x-axis and a plurality of columns disposed along the y-axis. The intersection of the plurality of rows and columns may define a plurality of spaces or tiles. In one exemplary embodiment the multidimensional map may include 50 rows and 13 columns, leading to 650 tiles. The plurality of spaces or tiles may be displayed to the user on a display of a computing device. Causing the processor to display the tiles may involve operations similar to those discussed above with respect to displaying the multidimensional map. By way of a nonlimiting example, FIG. 7 illustrates tiles 706 on a multidimensional map 700. A processor (e.g., processor 510, 622, or 632) may cause multidimensional map 700 and tiles 706 to be displayed on a display 540 of computational device 500. By way of another nonlimiting example, FIG. 1 illustrates map 100 divided into tiles 140. A processor (e.g., processor 510, 622, or 632) may cause multidimensional map 100 and tiles 140 to be displayed on display 540 of computational device 500.

One or more characters may be caused to move on a multidimensional map, as described in succeeding paragraphs. A character may include any icon, representation, token, figurine, game piece, or digital representation.

Figure 9:
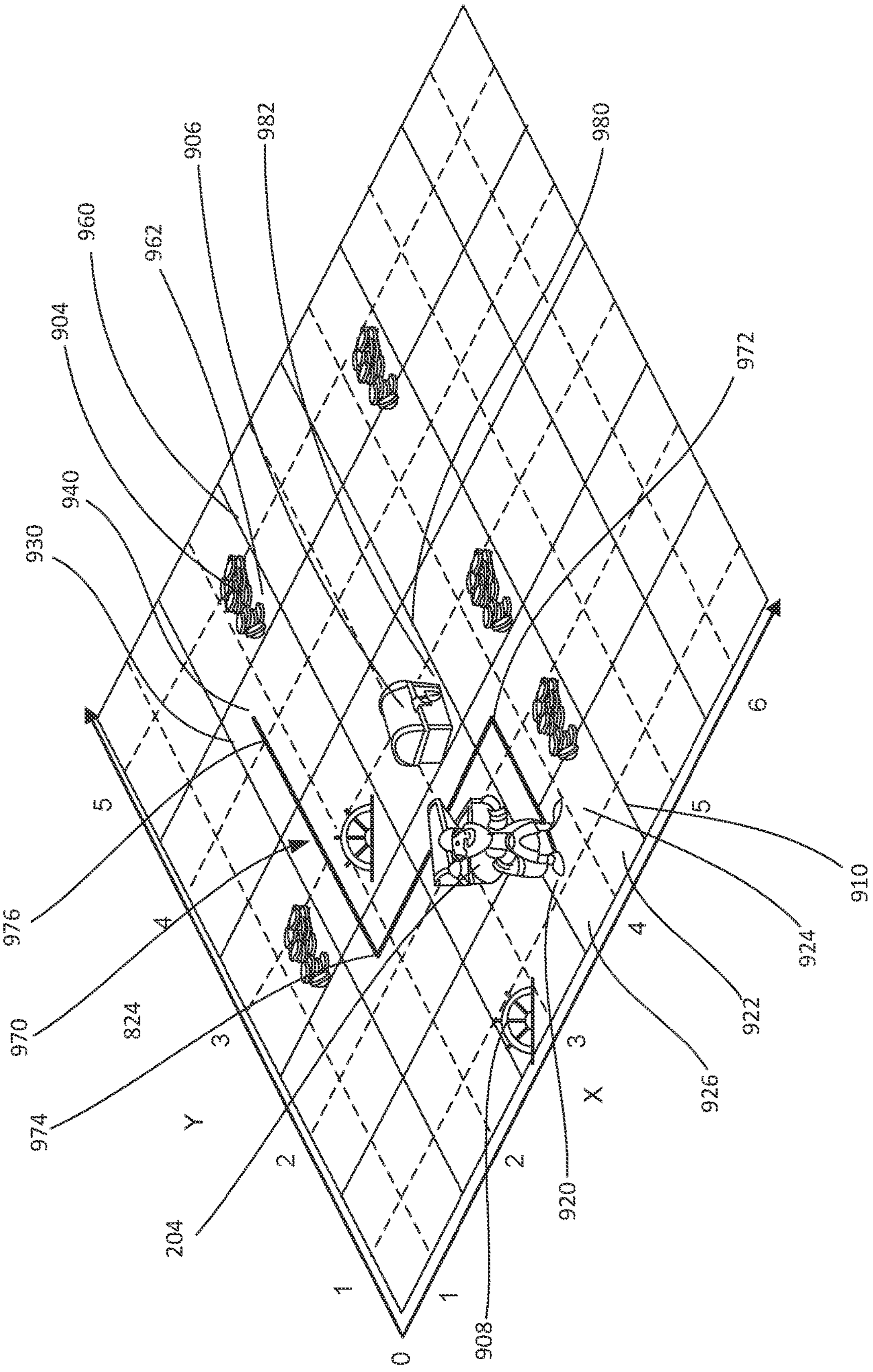
FIG. 9 is an exemplary display of a plurality of distributed spaces of a multidimensional map, including one or more awards, and a display of character movement, consistent with some disclosed embodiments.

Invisible to the player, each tile may be divided into four quadrants—top, left, right, bottom. The character may start and stop all movements in one of the four quadrants, for example, the top quadrant. One or more objects (e.g., coins, chests, wheels, awards) may be positioned in a different quadrant, for example, the bottom quadrant. In one exemplary embodiment, to ensure that the representations of the character and the objects do not overlap, the character may always appear in the top quadrant of any tile whereas the one or more objects may always appear in the bottom quadrant of any tile. By way of example, FIG. 9 illustrates the invisible quadrants 920 (top), 922 (bottom), 924 (right), and 926 (left) for a tile 910. Further, objects such as coins 904, chest 906, and ship's wheel 908 may be positioned in quadrants other than the top quadrant of any given tile. For example, as illustrated in FIG. 9, coins 904 may be placed in bottom quadrant 962 of tile 960 and chest 906 may be placed in bottom quadrant 982 of tile 980. As also illustrated in FIG. 8, for example, character 204 appears in the top quadrant 920 of tile 910. As also illustrated in FIG. 8B, when character 204 moves from tile 910 to tile 930, the character moves from the top quadrant 920 of tile 910 to the top quadrant 940 of tile 9300. One or more rules may be used to determine whether to display character 204 in front of another object 950 or behind object 950

Implementing character movement relative to a multidimensional map may involve causing the processor to calculate, execute, or otherwise implement one or more arithmetic, mathematic, logic, reasoning, or inference steps, for example to determine a current position of a character, a destination position of the character, and one or more positions of the character along a path from the current to the destination position of the character. The movement may be "relative," in that in some embodiments, the character may move with respect to the map, and in other embodiments, the map may move with respect to the character. When displayed on a screen of limited size, for example, in the latter instance, the character may remain in fixed location on the screen, with the map moving "beneath" the character. The processor may determine a destination position or a destination tile to which the character may be allowed to move based on operations discussed elsewhere in this disclosure. Further, the processor may be configured to determine a path that the character must follow to move from a current position (e.g., on a current tile) to a new position (e.g., on a new tile) on the multidimensional map. In addition, implementing character movement may involve causing the processor to calculate, execute, or otherwise implement one or more arithmetic, mathematic, logic, reasoning, or inference steps to generate an animation that shows the character changing its position from a current position (on a current tile) to a future position (on the destination tile) over a period of time. Implementing character movement may also involve causing the processor to display the character at various positions on the path from the current position to the target position to create a visual effect that shows the character moving from the current to the destination position.

By way of example, as illustrated in FIG. 9, character 204 may be currently located on tile 910. Character 204 may be allowed to move to tile 930 based on an outcome of one instance of gameplay as discussed elsewhere in this disclosure. A processor (e.g., 510, 622, 632) may determine the position of tiles 910 and 930, and also determine a plurality of positions 972, 974, 976 on path 970 from current position (e.g., tile 910) to destination position (e.g., tile 930). The processor (e.g., 510, 622, 632) may render character 204 on display 540 of computing device 500 sequentially at positions 972, 974, 976 to visually depict a movement of character 204 from a current position to a destination position.

Some embodiments involve receiving a request to generate a random directionality outcome. As discussed above, after placing a wager (if the particular game involves a wager), a user may pull on a lever or activate a button, switch, or click on or select a widget or other graphical, which in turn may cause one or more physical or graphical reels to spin. As also discussed above, the one or more physical or graphical reels may eventually come to a stop (either automatically or in response to a subsequent user action) and display one or more symbols on a face of each of the one or more physical or graphical reels. An outcome may refer to an end result or consequence, for example, an end result or consequence that may be determined from a position of the one or more reels after the reels have come to a stop. The outcome may be determined based on a combination of some or all of the symbols displayed on the one or more reels after the reels have stopped spinning A directionality outcome may refer to an end result or consequence that may dictate a direction and/or an amount of movement, for example, of the character displayed on the multidimensional map. For example, the one or more symbols displayed on the one or more reels may determine a direction and/or a distance by which the character displayed on the multidimensional map may move from the character's current position to a new or destination position. The term random may refer to something that has no perceived specific pattern, purpose, or objective. A random directionality outcome may refer to a directionality outcome that may be generated based on a final position or orientation of each of the one or more reels obtained without following any pattern, purpose, or objective. Randomness in digital games can be generated through various means, such as using random number generators that generate a sequence of numbers appearing be random, even though they are generated by a deterministic process. In a broadest sense, if a perception is presented to a user that an outcome is random (even if there may be some non-random underlying mechanism), the outcome is considered "random" within the meaning of this disclosure. For example, the position in which each of the one or more wheels may stop after spinning may follow no particular pattern. Thus, the directionality outcome obtained using a combination of one or more of the symbols displayed on the one or more wheels after every spin may also follow no particular pattern or scheme. Receiving a request to generate the random directionality outcome may refer to receiving, by a processor, a signal generated as a result of a user pulling the lever, activating a button or switch, or clicking on or select a widget or other graphic to cause the one or more physical reels or graphical representations of the reels to spin. The processor may, in turn, calculate, execute, or otherwise implement one or more arithmetic, mathematic, logic, reasoning, or inference steps that may result in spinning of the one or more physical reels or in the display of an animation showing spinning of the graphical representations of the one or more virtual reels. Further, the processor may calculate, execute, or otherwise implement one or more arithmetic, mathematic, logic, reasoning, or inference steps to stop the spinning of the one or more physical reels, or to end display of the animation showing spinning of the graphical representations of the one or more virtual reels. By way of example, as illustrated in FIG. 2, a user may place a wager or assurance of, for example, 600,000 coins and then click on button 230 labeled "SPIN." A processor (e.g., 510, 622, 632) associated with computing device 500, server side device 620, and/or client side device 630, may receive a signal generated in response to the user clicking button 230 labeled SPIN. In response, the processor (e.g., 510, 622, 632) may generate and display an animation showing reels 240, 242, 244 spinning on display 540 of computing device 500. Further, after a predetermined period of time, the processor (e.g., 510, 622, 632) may cause the display of the animation of reels 240, 242, 244 to stop so that directionality indicators 246, 248, and 250 may be displayed on reels 240, 242, 244. The particular directionality indicators 246, 248, and 250 including an up arrow, a right arrow, and a left arrow, respectively, may be displayed on reels 240, 242, 244 at the end of the animation without following any pattern or scheme. Thus, a combination of one or more of the randomly generated directionality indicators 246, 248, and 250 may result in a random directionality outcome based on the processor (e.g., 510, 622, 632) receiving the signal generated in response to the user clicking button 230 labeled SPIN.

Some embodiments involve generating the random directionality outcome based on the received request. As discussed above, after placing a wager, a user may pull on a lever or activate a button, switch, or click on or select a widget or other graphical, which in turn may cause one or more physical or graphical reels to spin. As further discussed above, the one or more physical or graphical reels may eventually come to a stop. The portion of the one or more physical or graphical reels that may be displayed to the user may be determined randomly based on, for example, one or more parameters. Such parameters may include, for example, an actual mass or a representation of a mass associated with each reel, the speed of rotation of each reel, an amount of braking or stopping force applied to each reel to cause the reel to stop spinning, a numerical weight associated with one or more of the reels causing it to spin faster or slower than the other of the one or more reels, and/or other parameters that may be used to determine a position in which each of the one or more reels may come to a stop. Thus by randomly selecting the position in which each of the one or more reels may stop, the one or more symbols displayed by each of the one or more reels may also be randomly generated each time the user causes the physical or graphical reels to spin. Further, because the position in which one or more reels stop determines the combination of symbols displayed on the basis of the one or more reels, the outcome or result determined based on the displayed combination of symbols may also be generated randomly, thereby producing a random outcome. And as discussed above, the random generated combination of symbols may cause a character located on a particular position on the multidimensional map to be moved in the direction and/or by a distance based on the combination of symbols displayed on the one or more reels.

In some embodiments, the random directionality outcome includes a combination of directionality indicators. A directionality indicator may refer to text, a symbol, an icon, or other graphical display that may indicate or suggest a direction. A textual directionality indicator may include a letter, a word, or a phrase that may represent a particular direction. For example, a textual directionality indicator may include one or more letters "L," "R," indicating a left or a right direction, respectively. In some embodiments, each of the directionality indicators represents at least one of a forward direction, a reverse direction, a right direction, and a left direction. In some embodiments, the textual directionality indicator may include, for example, the word "Forward," "Reverse," "Right," or "Left," indicating a forward, reverse, rightward, or leftward direction, respectively. Additionally or alternatively, the textual directionality indicator may include, for example, the letters "F," "B," "R," or "L," indicating a forward, backward, rightward, or leftward direction, respectively. In some embodiments, each of the directionality indicators represent a cardinal direction. A cardinal direction may refer to a full direction without any variation such a North, South, East, or West and not including the in between directions such as, for example, North-East, North-West, South-East, or South-West. In some embodiments, the textual directionality indicator may include letters "N," "S," "E," or "W," indicating North, South, East, or West cardinal directions, respectively. In some examples, the indicators may include the words North, South, East, or West to indicate the respective cardinal directions.

In some embodiments the directionality indicators may be graphical, for example, a symbol, an icon, an image, a combination of symbols, icons, or images that may represent a particular direction. By way of example, the symbols "→", "←", "↑", "↓" may represent the directions right, left, up or top, down or bottom, respectively. As another example, the symbols "↘", "↖", "↙", , and "↗" may represent the directions forward, reverse, left, and right, respectively. In some embodiments, a set or combination of graphical circles, squares, or other geometrical shapes may be arranged sequentially to form the shapes of arrows pointing in a particular direction. Other combinations of letters, words, or symbols may be used to indicate a direction. In one non-limiting example, as illustrated in FIG. 3, symbols 330 (e.g., right arrow), 332 (e.g., right arrow), and 334 (e.g., upward arrow), each may indicate a direction.

The combination of the one or more symbols may constitute a single directionality outcome. The symbols may be combined in many different ways. For example, the symbols may be read sequentially from left-to-right, from right-to-left, or in any other desired order, combining each successive direction indicated by the respective directionality indicator with the direction indicated by a previous directionality indicator. For example, referring to FIG. 3, directionality indicators 330, 332, and 334 when combined from left-to-right may indicate movement in a direction toward the right, followed by another movement towards the bottom of the figure, and further followed by a movement towards top of the figure. Likewise when combined from right-to-left the directionality indicators 330, 332, and 334, in FIG. 3 may indicate a direction that includes movement in a direction towards top of the figure, followed by a movement in the direction toward the bottom of the figure, and further followed by a movement towards right. The combination of the one or more directionality indicators displayed on the one or more reels may lead to a result that may include for example movement of the character displayed on the multidimensional map from a current position of the character to a new or destination position that may be determined by the combination of the one or more direction symbols.

In some embodiments, each of the directionality indicators are presented on a differing icon. An icon may refer to an image, representation or symbol. Differing icons may refer to two or more icons that are different from each other. As discussed above, faces of the one or more reels may each display a textual or graphical directionality indicator. In some embodiments, the face of each reel may display only a single directionality indicator. Further, the one or more reels may display an image, representation, symbol, or directionality indicator that may be different from an image, representation, symbol, or directionality indicator displayed on a different reel. By way of a non-limiting example, FIG. 3 illustrates three reels 320, 322, 324 Furthermore, reels 320, 322, 324 display directionality indicators 330, 332, 334, each in the form of a single icon displayed on the face of a respective reel 320, 322, 324. Moreover, each of the directionality indicators 330, 332, 334 displays an icon or arrow that is different from the icon or arrow displayed on the other reels.

In some embodiments, a plurality of directionality indicators are presented on a common icon. For example, some of the spaces on the reels may contain two directionality indicators, such as "↑52", "↓↓", "RR", or "LL." In this way, multiple movements can be conveyed by a single space on a single reel. Additionally or alternatively, the symbols that might otherwise be displayed on more than one reel (e.g., on 3 reels) may be displayed as a single graphical icon. By way of a nonlimiting example, FIG. 4B illustrates a single icon 414 that includes three separate directionality indicators 420, 422, and 424, corresponding to three reels. For example, as illustrated in FIG. 4B, all three directionality indicators 420, 422, and 424 are displayed on a single icon 414 representing three reels.

In some embodiments, each of the directionality indicators is associated with a multiplier. A multiplier may refer to the quantity by which something is to be multiplied. In the context of a directionality indicator, a multiplier may refer to the quantity by which a number of directionality indicators is to be increased or scaled or by which a magnitude of a distance associated with a directionality indicator is to be increased or scaled. In some embodiments, a multiplier associated with each directionality indicator may be represented simply by the number of directionality indicators displayed on the face of the reel. In some embodiments, the multiplier associated with each directionality indicator may be represented in the form of a numerical value displayed adjacent to the directionality indicator on the face of the reel. By way of example, FIG. 4A illustrates icon 414 showing three directionality indicators 420, 422, and 424 corresponding to three reels. The first and second directionality indicators 420 and 422 include only a single arrow. Thus, the multiplier associated with each of directionality indicators 420 and 422 may be the number 1. In contrast, directionality indicator 424 includes three arrows displayed next to each other. Thus directionality indicator 422 may be associated with a multiplier equal to the number 3. By way of another example, FIG. 4D illustrates icon 434 showing three directionality indicators 440, 442, and 444. As also illustrated in FIG. 4D, each directionality indicator is accompanied by a multiplier 1×, 2×, or 3× to indicate the number of directionality indicators associated with each reel.

In some embodiments, the combination of directionality indicators indicates both direction and distance. As discussed above, the combination of the one or more direction symbols (or directionality indicators) displayed on the one or more reels may represent, for example, movement of a character displayed on the multidimensional map from a current position of the character to a new or destination position that may be determined by the combination of the one or more direction symbols. In some embodiments, each directional indicator may represent movement of the character in the direction indicated by the directional indicator. A distance by which the character may move in the direction indicated by the directional indicator may be determined based on the multiplier associated with each directional indicator. For example, in some embodiments, each directional indicator may indicate that the character will move by one tile or space in the direction indicated by the directional indicator. When a multiplier is associated with the directional indicator (usually in the form of multiple arrows being displayed or in the form of a numerical multiplier value), the distance moved by the character may be based on the multiplier. For example when the multiplier is 3, the character may move by 3 tiles or spaces in the direction indicated by the directionality indicator. Thus, the combination of directionality indicators with their respective multipliers may determine the direction of movement and distance travelled by the character on the multidimensional map.

Figure 10A:
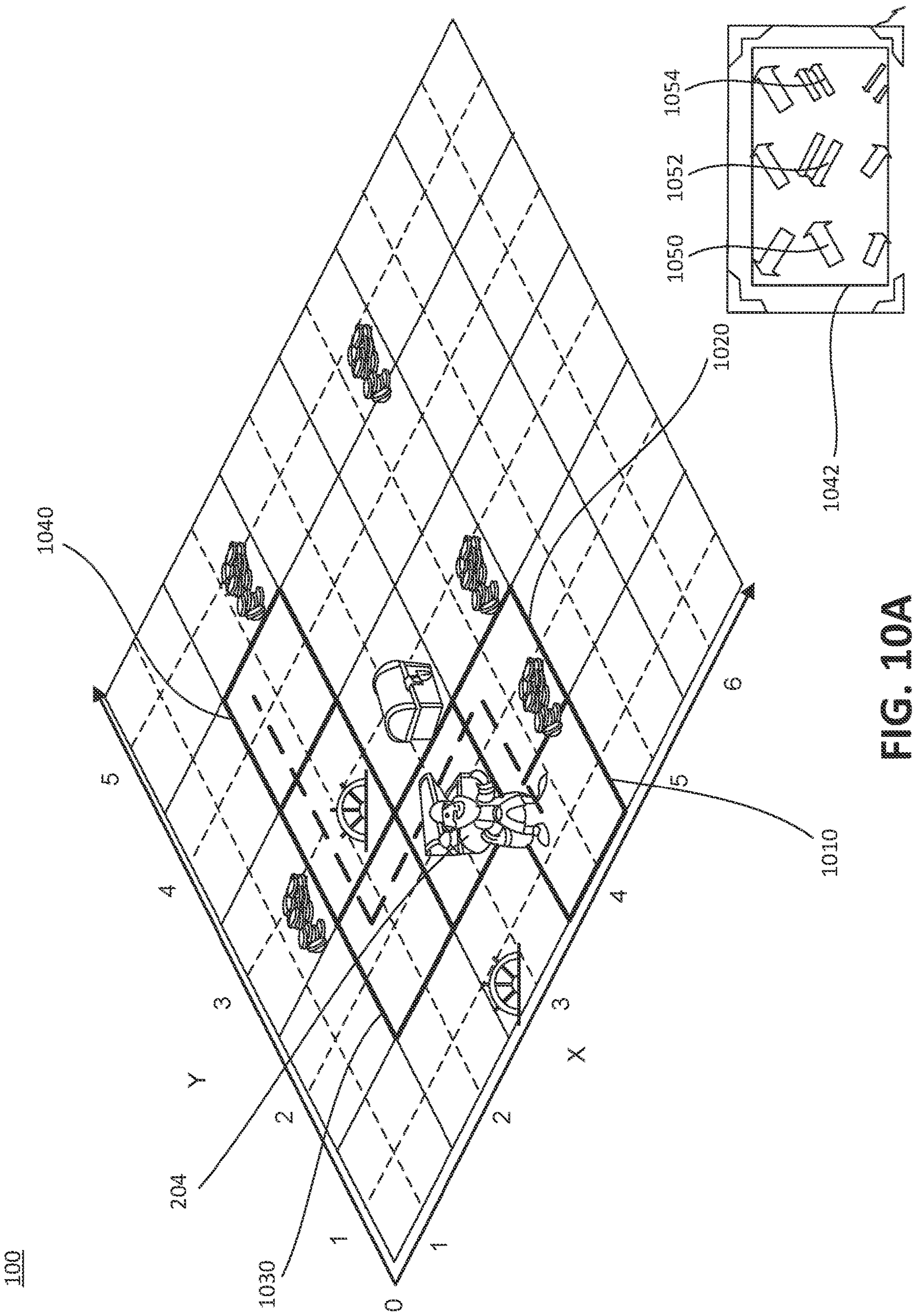
FIG. 10A is an exemplary display of character movement on a multidimensional map, consistent with some disclosed embodiments.

By way of example, FIG. 10A illustrates character 204 positioned on tile 1010 of multidimensional map 100. As also illustrated in FIG. 10A, icon 1042, displays directionality indicators 1050, 1052, and 1054. Because directionality indicator 1050 displays only a single arrow, the multiplier associated with directionality indicator 1050 is 1. Because directionality indicator 1052 displays two arrows, the multiplier associated with directionality indicator 1052 is 2. And because directionality indicator 1054 displays two arrows, the multiplier associated with directionality indicator 1054 is 2. Thus, the combination of the three directionality indicators 1050, 1052, 1054 indicate that character 204 must move from tile 1010 one space to the right to tile 1020, then move two spaces towards the top left of the figure to tile 1030, and then move two spaces towards right to tile 1040.

Figure 10B:
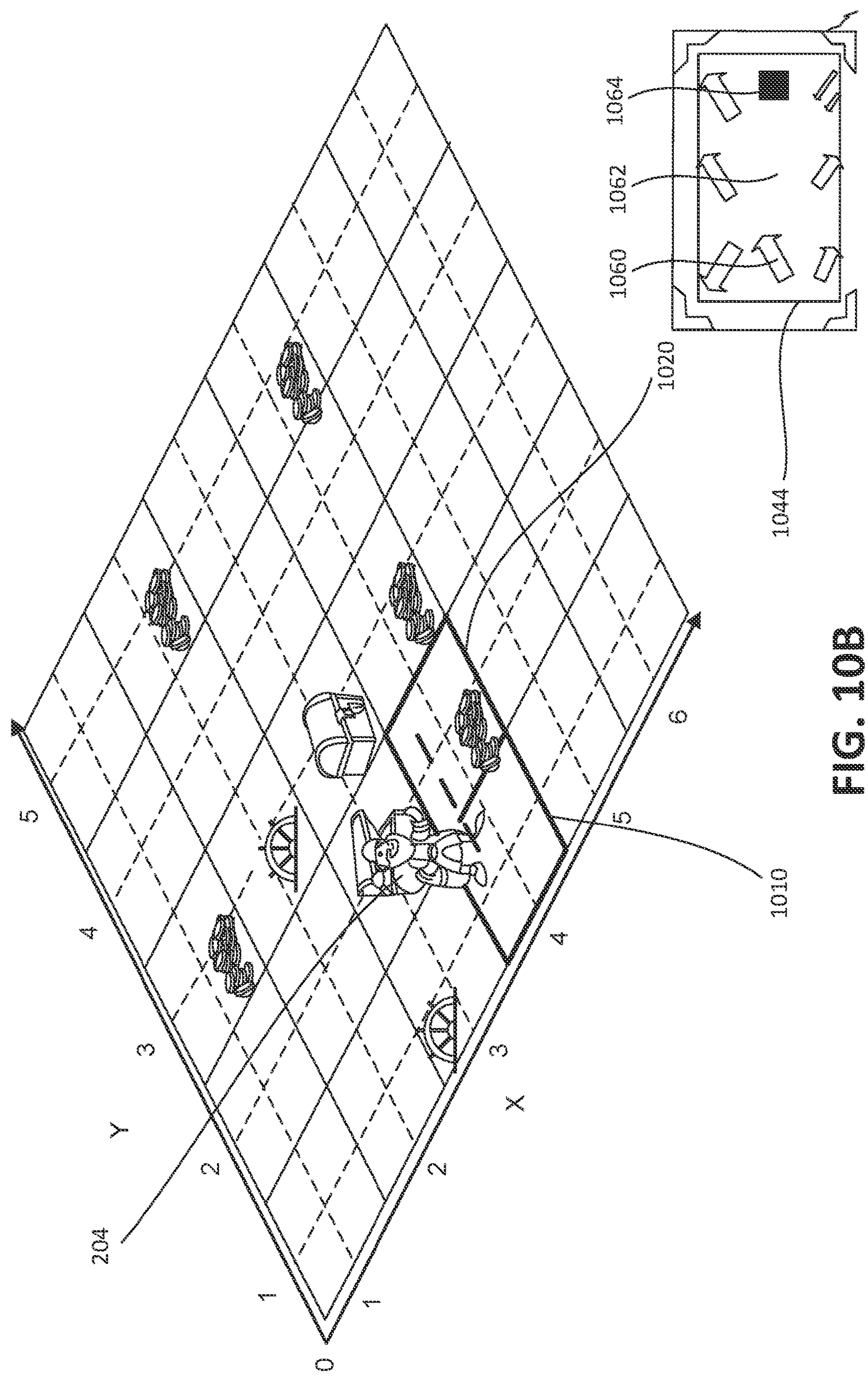
FIG. 10B is another exemplary display of character movement on a multidimensional map, consistent with some disclosed embodiments.

In some embodiments, at least one of the directionality indicators includes an indicator of non-movement. Although directionality indicators have been discussed in connection with the one or more reels, in some embodiments, one or more of the reels may not display a directionality indicator when the one or more reels has stopped spinning. The absence of a directionality indicator may signify that the character should not move on the multidimensional map. In some embodiments the lack of movement (or non-movement) of the character may be indicated by a blank or absence of a directionality indicator. In some embodiments, one or more other symbols displayed by the one or more reels may indicate non-movement (or lack of movement) of the character. By way of example, FIG. 10B illustrates character 204 positioned on tile 1010 of multidimensional map 100. As also illustrated in FIG. 10B, icon 1044, displays directionality indicators 1060, 1062, and 1064. Because directionality indicator 1060 displays only a single arrow, the multiplier associated with directionality indicator 1060 is 1. However, directionality indicator 1062 displays a blank indicating that no movement of character 204 may be associated with directionality indicator 1062. Similarly, directionality indicator 1044 displays a black square, which may also represent non-movement of character 204. Thus, the combination of the three directionality indicators 1060, 1062, 1064 indicate that character 204 must move from tile 1010 one space to the right to tile 1020 and then the character should not move further based on the blank displayed by directionality indicator 1062 and the black square displayed by directionality indicator 1064. Although a blank and a black square have been discussed above as representing non-movement, it is contemplated that other symbols may be used to show that character 204 should not move on the multidimensional map.

Figure 11:
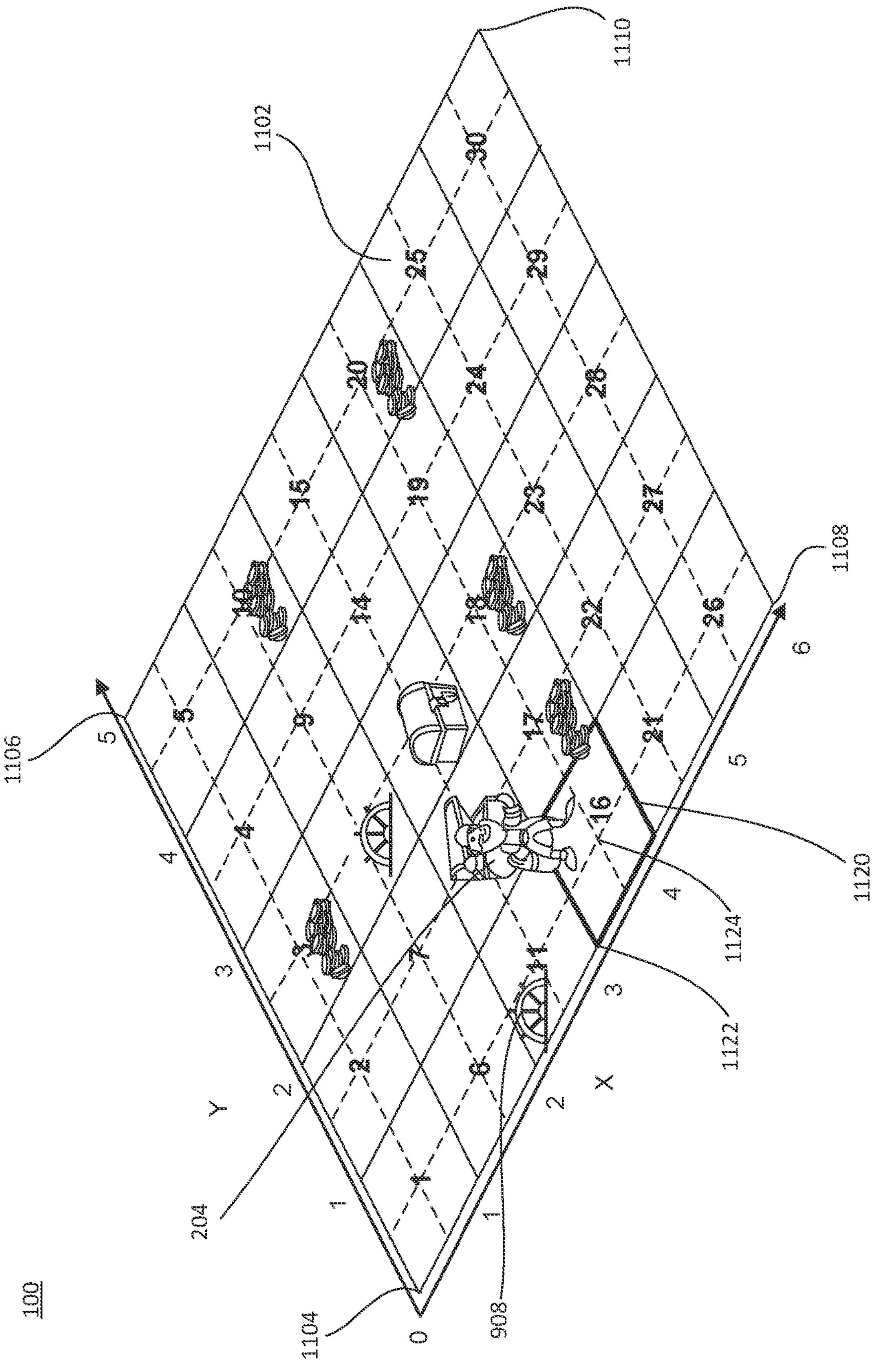
FIG. 11 is an exemplary display of a multidimensional map having numbered tiles, consistent with some disclosed embodiments.

Some embodiments involve identifying a current character location on the multidimensional map. A character location may refer to a place or position of the character on the multidimensional map. The location may refer to a position of the character relative to an origin. In some embodiments, the origin may be located at one corner of the map and distances may be determined relative to that particular origin. As discussed above, the multidimensional map may extend along two axes (e.g., x and y axes in a cartesian coordinate system). Thus, a location may refer to the distances along the x and y axes or the coordinates of the character. As also discussed above, the multidimensional map may be divided into a plurality of spaces or tiles. In some embodiments, a character location may refer to the particular tile on which the character may be located. In some embodiments, the tile location may be determined by numbering the tiles. By way of a nonlimiting example, FIG. 11 illustrates the plurality of spaces or tiles 1102 of a multidimensional map 100, with the origin located on the top left corner 1104 of the map. It is to be understood that the origin may alternatively be located on the top right corner 1106, bottom left corner 1108, bottom right corner 1110, or any other location on multidimensional map 1100. Character 204 may be positioned on tile 1120. A processor (e.g., 510, 622, 632) may determine the coordinates of a corner (e.g., 1122) or a centroid (e.g., center point 1124) of tile 1120 based on a distance of the corner 1122 or centroid 1124 from the origin, which may be located in the top left corner 1104 of the map. As another example, a processor (e.g., 510, 622, 632) may number the tiles 1102 sequentially first along the y-axis, and then along each row. For example, FIG. 11 illustrates tiles 1102 numbers from 1 to 30 (shown in bold on FIG. 11). The processor (e.g., 510, 622, 632) may then determine the location of the tile based on its number (e.g., 1, 2, 5, 13, etc.) As illustrated in FIG. 11, character 204 is located on the tile numbered 16.

A current character location may refer to the location (position or tile) on which the character may be located before a user causes the reels to spin. Identifying a current character location may refer to determining, acquiring, retrieving, obtaining or otherwise gaining access to information representative of the location of the character. For example, at the beginning of the game, the processor (e.g., 510, 622, 632) may store the location of the character (e.g., x, y coordinates) or location of the tile in which the character resides in a memory (e.g., 520) or a database (e.g., 532). During the game, as the character moves from its initial location, the processor (e.g., 510, 622, 632) may update the location of the character (e.g., x, y coordinates) or location of the tile in which the character resides in the memory (e.g., 520) or a database (e.g., 532). Identifying a current character location may involve accessing the memory (e.g., 520) or a database (e.g., 532) and retrieving the value of the x, y coordinates (e.g., of the corner or centroid of the tile) on which the character is located or retrieving the number of the tile stored in the memory (e.g., 520) or a database (e.g., 532). Thus, for example, referring to the non-limiting example of FIG. 11, identifying the current character location of character 204 may include retrieving, from memory 520 or database 532, the previously stored value of the x, y coordinates (e.g., 3, 0) of corner 1122, x, y coordinates (e.g., 3.5, 0.5) of centroid 1124, or tile number (e.g., 16) of tile 1120 on which character 204 is located.

Some embodiments involve translating the combination of directionality indicators to the multidimensional map, using the identified current character location and the generated random directionality outcome, to thereby render the display of the multidimensional map in a manner reflecting movement of the character across some of the plurality of distributed spaces from the current character location to a new character location. Translating the combination of directionality indicators to the multidimensional map may refer to determining a target or destination location on the multidimensional map based on the combination of directionality indicators. As discussed above, each of the directionality indicators may represent a direction of movement and a distance of movement based on an associated multiplier. As also discussed above, the directionality indicators may be combined by applying the direction and distances of movement of the various directionality indicators sequentially. Translating the combination of directionality indicators may include determining a location on the multidimensional map resulting from the sequential application of each directional indicator. For example, consider the situation where there are three reels displaying three directionality indicators that are to be applied sequentially from left to right. Starting from a current location on the multidimensional map, translating may include determining a first location on the multidimensional map relative to the current location based on a direction and distance associated with a first directionality indicator (e.g., a left-most directionality indicator). Translating may also include determining a second location on the multidimensional map relative to the first location based on a direction and distance associated with a second directionality indicator (e.g., a middle directionality indicator). Translating may further include determining a third location on the multidimensional map relative to the second location based on a direction and distance associated with a third directionality indicator (e.g., a middle indicator). Thus, translating the combination of directionality indicators to the multidimensional map may help determine the target or destination location relative to the current location based on the directionality indicators displayed on the one or more reels.

By way of a nonlimiting example, FIG. 10 illustrates character 204 positioned on tile 1010 of multidimensional map 100. As also illustrated in FIG. 10, directionality indicators 1050, 1052, and 1060 may be displayed on display 540 of computational device 500. Translating the combination of directionality indicators 1050, 1052, and 1060 to the multidimensional map 100 may include determining a first location (or first tile) on the multidimensional map relative to the current location (e.g., tile 1020) based on a direction and distance associated with directionality indicator 1050. As illustrated in FIG. 10, directionality indicator 1050 illustrates a single arrow towards the right (or top right corner of multidimensional map 100). Because directionality indicator 1050 displayed only a single arrow, the multiplier associated with directionality indicator 1050 may be 1, indicating that the first location may be only one tile or space away in the forward direction from current tile 1010. Thus, the first location may correspond to tile 1020. Translating the combination of directionality indicators to the multidimensional map may include determining a second location on the multidimensional map relative to the first location (e.g., tile 1020) based on a direction and distance associated with directionality indicator 1052. As illustrated in FIG. 10, directionality indicator 1052 illustrates two arrows towards the top left corner of the figure. Because directionality indicator 1052 displays two arrows, the multiplier associated with directionality indicator 1052 may be 2, indicating that the second location may be two tiles or spaces away towards the direction of the top left corner from the first location (e.g., tile 1020). Thus, the second location may correspond to tile 1030. Translating the combination of directionality indicators to the multidimensional map may further include determining a third location on the multidimensional map relative to the second location (e.g., tile 1030) based on a direction and distance associated with directionality indicator 1054. As illustrated in FIG. 10, directionality indicator 1054 illustrates two arrows towards the top right corner of the figure. Because directionality indicator 1054 displays two arrows, the multiplier associated with directionality indicator 1054 may be 2, indicating that the third location may be two tiles or spaces away towards the top right corner of the figure from the second location (e.g., tile 1030). Thus, the third location may correspond to tile 1040. Thus, translating the combination of directionality indicators 1050, 1052, 1054 on the multidimensional map 100 may include determining the target or destination location (e.g., tile 1040) relative to the current location (e.g., tile 1010) based on the combination of directionality indicators 1050, 1052, 1054.

Rendering the display of the multidimensional map may include updating one or more pixels on a display of computational device to display an updated version of the multidimensional map. Rendering the display of the multidimensional map may also include sequentially updating the one or more pixels to display animation or movement of one or more objects associated with the multidimensional map on the display of the computational device. Rendering the display of the multidimensional map in a manner reflecting movement of the character across some of the plurality of distributed spaces from the current character location to a new character location may include sequentially updating the one or more pixels to display movement of the character from a current location of the character to the target or destination location. With reference to the nonlimiting example of FIG. 10, rendering the display of the multidimensional map 100 may involve repeatedly and sequentially updating the one or more pixels on the display 540 of computational device 500 to show how character 204 moves from its current location (e.g., tile 1010) to the new character location (e.g., target or destination location, tile 1040) based on a combination of directionality indicators 1050, 1052, 1054. Thus, for example, the processor (e.g., 510, 622, 632) may update one or more pixels of display 540 to show character 204 being sequentially located at tiles 1010, 1020, 1030, and 1040 to show movement of character 204 from its current location (e.g., tile 1010) to the new character location (e.g., 1040). Rendering the character 204 to reflect movement may involve rending the character at a new location on the map with the map remaining in a relatively constant location; rendering the character in a relatively constant location while updating a location of the map; or a combination of both.

In some embodiments, each of the directionality indicators are presented on a dice face. Although reels have been discussed in this disclosure, it is contemplated that in some embodiments, the display on computing device 500 may instead include one or more dice instead of one or more reels. Each of the one or more dice may have six faces. Each of the six faces may either have a directionality indicator, a blank, or a symbol indicating non-movement, similar to what has been described above with respect to reels. When a user pulls on a lever or activate a button or switch, or clicks on or selects a widget or other graphical icon, the processor (e.g., 510, 622, or 632) may cause the one or more dice to be shuffled or moved. The processor may display an animation showing shuffling of the dice on display 540 of computing device 500. When the one or more dice stop shuffling, one face of each of the one or more dice may be prominently displayed and may include either a directionality indicator, a blank, or a symbol indicating non-movement as discussed above with respect to the one or more reels. The directionality indicators on the dice faces may be combined in a manner similar to that disclosed above with respect to the directionality indicators on the reels to determine a new location for the character displayed on the multidimensional map.

By way of a non-limiting example, FIG. 4C illustrates three dice 460, 462, 464, each having a plurality of faces (e.g. six faces). Each of the dice faces includes a directionality indicator or an indicator of non-movement. As illustrated in FIG. 4C, the faces of dice 460, 462, 464 include directionality indicators 470, 472, 474, which may be combined in a manner similar to that discussed above with respect to directionality indicators on reels (e.g., 320, 322, 324 of FIG. 3) to generate a random directionality outcome. As also discussed above, a new or destination position (e.g., tile 1040 of FIG. 10) may be determined for movement of character 204 based on the combination of directionality indicators 470, 472, 474 on dice 460, 462, 464 in a manner similar to that discussed above with respect to the directionality indicators (e.g., 330, 332, 334) on reels (e.g., 320, 322, 324). Although three dice have been described above, it is contemplated that any number of dice may be used to display directionality indicators, consistent with some disclosed embodiments. By way of a non-limiting example, FIG. 4C illustrates a portion 400 of multidimensional map 100. A set of three dice 460, 462, 464 may be displayed along with the multidimensional map 100 on display 540 of computing device 500. When a user activates or selects the SPIN button 230, a processor (e.g., 510, 622, or 632) may cause the one or more dice 460, 462, 464 to be shuffled and may cause a display of an animation showing shuffling of dice 460, 462, 464 on display 540 of computing device 500. When dice 460, 462, 464 stop shuffling, faces of dice 460, 462, 464 may display directionality indicators 470, 472, 474, respectively. Directionality indicators 470, 472, 474 may be combined to determine a new location for character 204 as discussed elsewhere in this disclosure.

Some embodiments involve receiving an assurance. An assurance (synonymously referred to as a wager) may refer to a bet, which, depending on implementation or embodiment, may include tokens, points, credits, virtual coins, a sum of money, or an item being associated with a real or perceived value that a user risks, in the hope of winning an equivalent or larger value or perceived value based on an uncertain outcome.

Receiving an assurance may refer to accepting delivery of, retrieving, obtaining or otherwise gaining access to signals representing a value of the assurance or wager placed by a user. The signals may be received in a manner that is detectable by or understandable to a processor. The data or signals representing the data may be received via a communications channel, such as a wired channel (e.g., cable, fiber) and/or wireless channel (e.g., radio, cellular, optical, IR). The data may be received as individual packets or as a continuous stream of data. The data may be received synchronously, e.g., by periodically polling a memory buffer, queue or stack, or asynchronously, e.g., via an interrupt event. For example, a user may select an assurance on a display by selecting an assurance amount or quantity, and in response to the selection, a processor may receive a signal or signals indicating the selection. By way of example, as illustrated in FIG. 2, one or more buttons or widgets 212, 214 may be displayed to allow a player to increase or decrease an amount of a wager. Thus, for example, a button or widget 214 with a "+" sign may allow a player to increase the amount of the wager, and a button or widget 212 with a "–" sign may allow the player to decrease the amount of the wager. As also illustrated in FIG. 2, a button or widget 216 labeled "MAX BET" may allow the player to wager all of the tokens, coins, points, credits, or other monetary equivalent that the player has currently applied in the game. Activation of one or more of widgets 212, 214, 216 may generate a signal that may be transmitted to a processor (e.g., 510, 622, 632) that may receive the signal and interpret the signal as being representative of a value (a monetary value) of the assurance or wager placed by the user. By way of example, the user may place a wager of $100, $200, or for any other amount of money for each instance of gameplay. By way of another example, the user may place a wager of 100, 500, or any other desired number of tokens, coins, points, credits, or other monetary equivalent for each instance of gameplay.

Some embodiments involve using the identified current character location, the generated random directionality outcome, and the assurance, translating the combination of directionality indicators to the multidimensional map to thereby render the display of the multidimensional map in a manner reflecting movement of the character across some of the plurality of distributed spaces from the current character location to the new character location. As discussed above, the user may first place a wager, and then activate a lever, a button or a widget to cause one or more reels to spin. When the one or more reels have stopped spinning, the one or more reels may display symbols representing directionality indicators. As also discussed above, a processor (e.g. 510, 622, 632) may translate the combination of directionality indicators to determine a target or destination location relative to a current location on the multidimensional map. However, when a user changes the amount of wager during one session, the processor (e.g. 510, 622, 632) may be configured to redraw the multidimensional map and return the user to the user's starting position. A user may change the amount of wager by, for example, by selecting one or more of widgets 212, 216, or 216. As discussed above, when a user changes a previously placed wager, the computing device may display a "Change-Bet" pop-up graphical user interface that may state that the multidimensional map will reset and the character (e.g., Long John) will start over at an initial starting location. The player may then select from two options: "OKAY" or "CANCEL." When the player chooses the "OKAY" widget, a new multidimensional map may be generated, and the user may start over. In some embodiments, the user's starting position may be stored in a memory (e.g., 520) and/or database (e.g. 532). Thus when the user changes the amount of wager, the processor may regenerate the multidimensional map and select the user's starting position as the target or destination location instead of a target or destination location determined based on translating the combination of the directionality indicators. By way of a non-limiting example, consider the display illustrated in FIG. 10. As discussed above, the combination of directionality indicators 1050, 1052, 1054 may indicate that character 204 must move from its current location on tile 1010 to a destination location on tile 1040. However, if the user changes the wager, the processor (e.g., 510, 622, 632) may instead replace the destination location 1040 with the starting location stored in memory 520 or database 532. Thus, depending on whether or not the user changes the wager, the processor may use the wager in combination with the directionality indicators 1050, 1052, 1054 to determine whether to move character 204 to the destination location 1040 or to the starting location stored in memory 520 or database 532.

Some embodiments involve identifying a subset of spaces of the plurality of distributed spaces. A subset of spaces of the plurality of distributed spaces may refer to a grouping of spaces that may include less than the total number of distributed spaces. The subset of spaces may be selected in various ways. For example, the subset of spaces may be selected, by identifying spaces corresponding to a subset of rules or columns out of the total number of rows or columns making up the multidimensional map. In some embodiments the subset of spaces may be contiguous. It is contemplated however that the selected subset of spaces may be noncontiguous. Although the multidimensional map has been described as being rectangular, the subset of spaces may form a rectangular shape, a square-shaped, or any other geometrical shape based on the set of spaces identified for including in the subset of spaces. By way of example, FIG. 1 illustrates a multidimensional map 100 that may have a plurality of distributed spaces 140. For example, as illustrated in FIG. 1, multidimensional map 100 may include a total of 91 spaces distributed along 7 columns and 13 rows. A subset of spaces selected from the total number 91 of spaces may include only 32 spaces. For example, FIG. 2 illustrates a subset 32 of spaces 202 out of the total number 91 of spaces 140 of multidimensional map 100. As illustrated in FIG. 2, the subset of spaces 202 may include 32 spaces (e.g., less than the total number 91 of spaces 140 of multidimensional map 100).

Some embodiments involve using the identified current character location, the generated random directionality outcome, and the identified subset of spaces, translating the combination of directionality indicators to the multidimensional map to thereby render the display of the multidimensional map in a manner reflecting movement of the character across some of the plurality of distributed spaces from the current character location to the new character location. Translating the combination of directionality indicators to the multidimensional map, using the identified current character location and the generated random directionality outcome, to thereby render the display of the multidimensional map in a manner reflecting movement of the character across some of the plurality of distributed spaces from the current character location to the new character location may be performed in a manner similar to that described above. Further, instead of displaying the entire multidimensional map on a display of the computational device, in some embodiments, the processor may be configured to display only the subset of the plurality of spaces associated with the multidimensional map on the display of the computational device. The subset of spaces selected for display may be identified in a manner similar to that described above. Further, the processor may be configured to render the display, using the identified subset of spaces, by initially displaying the subset of spaces on a display of the computational device. The processor may also be configured to sequentially update the one or more pixels forming the display of the subset of spaces to cause a display of an animation or movement of the character from its current location to a target or destination location on the subset of spaces in a manner similar to that described above. By way of example, as illustrated in FIG. 2, the processor may be configured to sequentially update the one or more pixels forming the display of the subset of spaces 202 to show movement of character 204 from its current location on tile 206 to a new or destination location on tile 260.

In some embodiments, translating the combination of directionality indicators affects a character's status in the multidimensional map. A character status may refer to one or more parameters or characteristics associated with the character. For example, a character's status may indicate the character's position relative to the last row of the multidimensional map. The status may be determined in the form of a distance or number of spaces between the character and the last row, as a percentage of the total distance from the character's current position to the last row, or some other distance measure indicating a distance of the character from the last row of the multidimensional map. By way of example, as illustrated in FIG. 3, a status of character 204 may be determined as being six spaces between a current character location 340 and the final row 342. In some embodiments, the character status may indicate the player's current monetary position in a current session of the game. The monetary position may be determined in the form of the total number of tokens or coins the user has won so far in the game or the total amount of tokens or coins the user has accumulated in the game. For example, as illustrated in FIG. 3, the status of the player may be indicated as having 0 Wins in the game. In some embodiments, the status may refer to a total number of awards (e.g., free spins) that may be available to the player. In some embodiments, the status may refer to a number of spins after which the player has won an award or a number of spins after which the player has won no award or fallen in the water. As discussed above, translating the combination of directionality indicators may result in character 204 moving from its current location to a new location on multidimensional map 100. As also discussed above, character 204 may receive one or more awards (e.g., coins 310 or chest 308 in FIG. 3) when character 204 lands on a tile or space on which the awards are located. When character 204 receives an award, a status of character 204 may change because the number of tokens, coins, points, or credits available to the user may increase due to the received awards. Similarly, the distance of character 204 from the final row may also be updated based on the new location of character 204, which also may change the status of character 204.

Some embodiments involve initiating a sub-session when the new character location is on a triggering space associated with sub-session triggering functionality. As discussed above, a primary game session may begin when the user places a wager, which in turn results in generation of a multidimensional map. As also discussed above, the multidimensional map may be divided into a plurality of spaces or tiles distributed along rows and columns of the multidimensional map. During successive instances of game play, a user may cause a character located on the multidimensional map to move from an initial or starting location to a new space or tile of the multidimensional map. In some embodiments, one or more of the new spaces or tiles to which the character may move during the primary game session may have additional features. For example, one or more of the new spaces or tiles to which the character may move during the primary game session may be configured to start a sub-session. A sub-session may refer to a temporary instance of a game session separate from the primary game session. The temporary instance of the game session may allow a user to perform certain actions outside of the primary game session. The temporary instance of the game session may end after a predetermined period of time or after the user has completed certain actions within the temporary instance of the game session. When the temporary instance of game session ends, the user may continue playing the primary game session.

In some embodiments, a sub-session may involve a separate mini game. As discussed elsewhere in this disclosure, the mini games may include "Skull & Crossbones" and "Here Be Monsters," or any other games. Skull & Crossbones may include mini awards including skulls (two times multipliers), swords (wild awards that can be stacked), bars, "sevens," three skulls (may award a grand jackpot), and one-line games. Here Be Monsters may include monster wild awards that affect the spun reel and monsters on all three reels may award a top jackpot. Although particular types of awards and/or mini games have been discussed above, it is contemplated that many other types of awards and/or mini games may be included in the game in one or more of the disclosed embodiments.

In some embodiments, a sub-session may allow the user to add or remove tokens, credits, points, virtual coins, or money to the primary session. For example, one or more devices (e.g., credit card reader, or cash receiver, or coin slot) may be associated with computing device 500. A user may use a credit card, insert cash into the cash receiver, or add coins to a coin slot to increase an amount of money, tokens, coins, points, or credits available to the user during the game. Once the user has finished adding money, the sub-session may end returning the user to the primary game session.

A triggering space may refer to a space or tile capable of initiating the separate session. For example, a triggering space or tile in the multidimensional map may be capable generating a signal that may cause the processor to execute program code to initiate a mini-game. In some embodiments, when a character is moved to a triggering space, a signal may be generated and sent to the processor. The processor may be programmed to receive the signals generated by the one or more triggering spaces. When the processor receives the signal, the processor may be configured to execute program code to initiate a sub-session that may include a mini game. In some embodiments, when a character is moved to a triggering space, the value of a flag or parameter stored in association with that triggering space may change. The processor may be programmed to periodically monitor the value of the flag or parameter, associated with the one or more triggering spaces, stored in a memory or database. When the processor receives determines that the flag or parameter has changed, the processor may be configured to execute program code to initiate a sub-session that may include a mini game.

Some embodiments involve receiving a second request to generate a second random directionality outcome and generating the second random directionality outcome. A second random directionality outcome may be similar to the first random directionality outcome described above. A processor (e.g. 510, 622, 632) may receive a second request to generate a second random directionality outcome in the same manner in which the processor receives the first random directionality outcome as described above. The second random directionality outcome may be generated by a processor (e.g. 510, 622, 632) in the same manner in which the processor generates the first random directionality outcome as described above.

Figure 12:
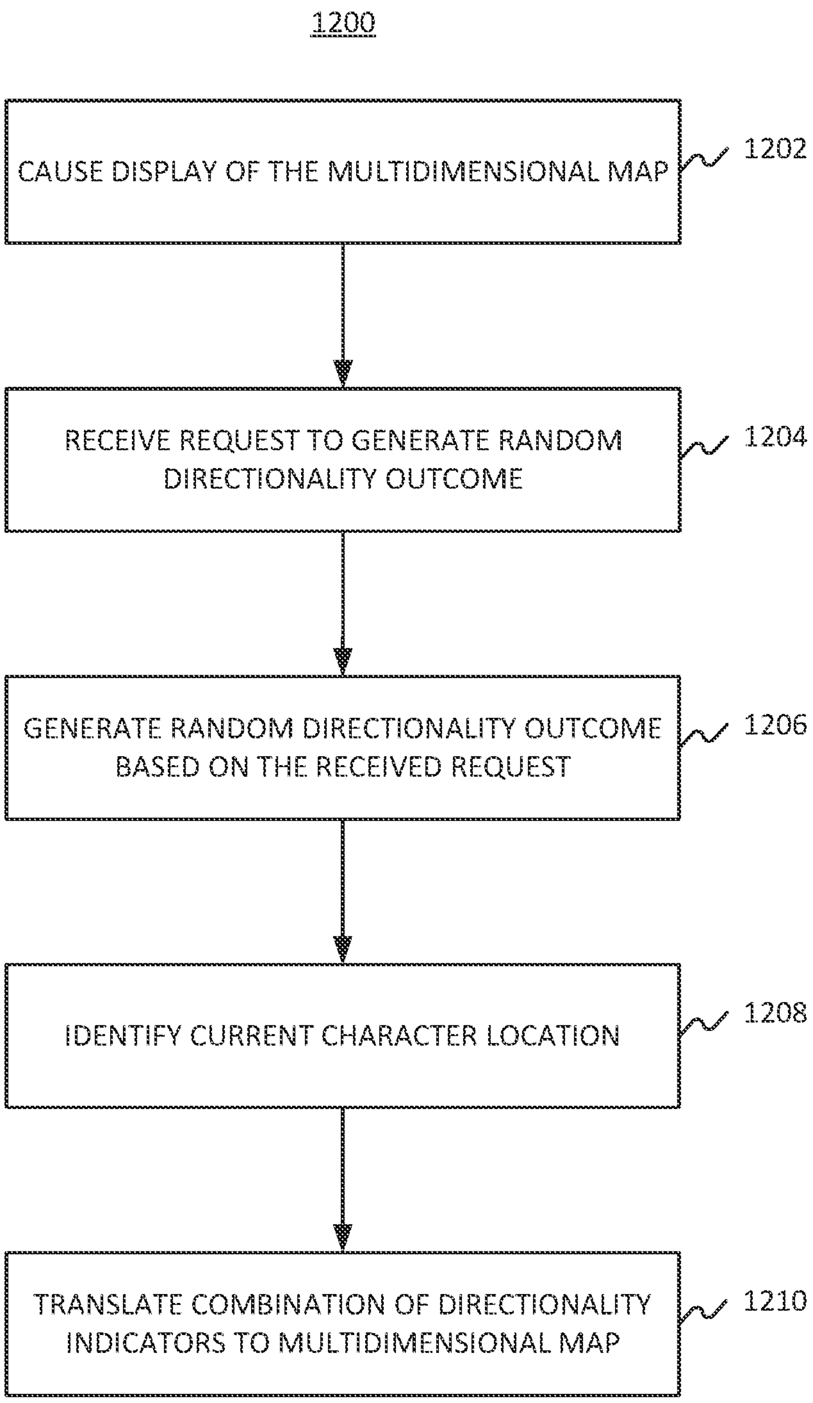
FIG. 12 is a flowchart of an exemplary method for implementing character movement relative to a multidimensional map, consistent with some disclosed embodiments.

FIG. 12 illustrates a flowchart of example process 1200 for implementing character movement relative to a multidimensional map, consistent with embodiments of the present disclosure. In some embodiments, process 1200 may be performed by at least one processor (e.g., 510, 622, 632) to perform operations or functions described herein. In some embodiments, some aspects of process 1200 may be implemented as software (e.g., program codes or instructions) that are stored in a memory (e.g., 520) of computing device 500 or a non-transitory computer readable medium 530. In some embodiments, some aspects of process 1200 may be implemented as hardware (e.g., a specific-purpose circuit). In some embodiments, process 1200 may be implemented as a combination of software and hardware.

Referring to FIG. 12, process 1200 may include a step 1202 of causing a display of the multidimensional map. As discussed above, the display contains a plurality of distributed spaces. Process 1200 may include a step 1204 of receiving a request to generate a random directionality outcome. Process 1200 may include a step 1206 of generating the random directionality outcome based on the receive request. The random directionality outcome includes a combination of directionality indicators. Process 1200 may include a step 1208 of identifying a current character location on the multidimensional map. Process 1200 may also include a step 1210 of translating the combination of directionality indicators to the multidimensional map, using the identified current character location and the generated random directionality outcome. Translating the combination of directionality indicators to the multidimensional map renders the display of the multidimensional map in a manner reflecting movement of the character across some of the plurality of distributed spaces from the current character location to a new character location.

Some embodiments involve a system for implementing character movement relative to a multidimensional map. The system may include at least one processor configured to: cause a display of the multidimensional map, the display containing a plurality of distributed spaces; receive a request to generate a random directionality outcome; based on the received request, generate the random directionality outcome, wherein the random directionality outcome includes a combination of directionality indicators; identify a current character location on the multidimensional map; and using the identified current character location and the generated random directionality outcome, translate the combination of directionality indicators to the multidimensional map to thereby render the display of the multidimensional map in a manner reflecting movement of the character across some of the plurality of distributed spaces from the current character location to a new character location.

By way of a non-limiting example, FIGS. 5 and 6 taken together illustrate a system 600 including at least one processor (e.g., 510, 622, 632). The processor may cause a display of a multidimensional map (e.g., 100 of FIG. 1), having a plurality of distributed spaces 140. The processor may receive a request to generate a random directionality outcome when a user activates widget 230 (see e.g., FIG. 2) causing one or more reels 240, 242, 244 to spin. When reels 240, 242, 244 stop spinning, they display a random directionality outcome comprising directionality indicators 246, 248, 250. The random directionality outcome includes a combination of directionality indicators 246, 248, 250. The processor may translate the combination of directionality indicators 246, 248, 250 to multidimensional map 100 to determine a new position of a character 204. The processor may also display an animation showing character 204 moving from its initial location (e.g., tile 1010 of FIG. 10) to the new position of character 204 (e.g., tile 1040 of FIG. 10).

Some embodiments involve a non-transitory computer readable medium containing instructions that when executed by at least one processor cause the at least one processor to perform operations for unpredictably generating a first multidimensional map and a second multidimensional map differing from the first multidimensional map. A non-transitory computer-readable medium containing instructions, at least one processor, and causing the at least one processor to perform operations may be understood as described elsewhere in this disclosure. Similarly a multidimensional map may be understood as describe elsewhere in this disclosure. The first multidimensional map and the second multidimensional map may refer to two maps that differ in at least one respect. The differences in the first and the second multidimensional maps may include differences in, for example, one or more of lengths, widths, heights, or sizes of the maps. The differences may additionally or alternatively include differences in, for example, one or more of a geography, features, or terrain displayed in the maps, one or more objects displayed on the maps, and/or any other characteristic associated with the maps.

Unpredictable generation of maps may refer to the generation of different maps having no perceivable relationship or pattern of change between the different maps. Unpredictable generation refers at least to the perspective of a viewer of the map. Thus, a map may be considered as being unpredictably generated if the viewer is unable to know at least some of the map characteristics in advance. For example, the second multidimensional map and/or any subsequent multidimensional maps may not have any specific relationship to the first multidimensional map or to any prior multidimensional map. Moreover, a user may not be able to perceive any specific pattern or trend between two successively generated multidimensional maps. The unpredictability in the generation of the multidimensional maps may be achieved through various means, such as using random number generators that generate a sequence of numbers that appear to be random, even though they may be generated by a deterministic process. In a broadest sense, if a perception is presented to a user that successively generated multidimensional maps are random (even if there may be some non-random underlying mechanism), the successively generated multidimensional maps may be deemed to be unpredictably generated within the meaning of this disclosure.

Some embodiments involve receiving a first request to initiate a first session in an environment employing the first multidimensional map. An environment may refer to circumstances or conditions presented to a game player or user. For example, an environment may refer to a type of gaming device through which the user intends to engage in gameplay. In some embodiments, the environment may include a graphical user interface presented on a display associated with an online or digital gaming machine or computing device. In some embodiments, the environment may include a display associated with a physical gaming machine (e.g., a physical slot machine). Employing may refer to using or being directed towards something. As one example, an environment employing the first multidimensional map may refer to a graphical user interface displaying the first multidimensional map on a display associated with an online or digital gaming machine or computing device. As another example, an environment employing the first multidimensional map may refer to a display of a physical gaming machine presenting the first multidimensional map. An online or digital gaming machine may include any device through which a map may be displayed. Examples of such devices include smart phones, tablets, PCs, laptops, ER/VR glasses, projectors, or any other device containing a mechanism for presenting a map to a viewer.

A session may refer to a period, term, or duration of time devoted to a particular activity. A session associated with a first or a second multidimensional map may refer to a period, term, or duration during which a multidimensional map may be displayed to a user, for example, during a time period for which the user may interact with the multidimensional map on a digital, online, or physical gaming machine. By way of example, a session may refer to a period of time for which a user may play a game on a digital, online, or physical gaming machine that displays the multidimensional map. The session may begin when the user starts playing the game and may end when the game ends. The game may end when the user achieves the objective or goal of the game or when the user decides to stop playing the game, which may occur even before the user has achieved the objective or goal of the game.

The term "receiving" may refer to acquiring, obtaining, retrieving, or otherwise gaining access. A first request may refer to an input that may include a signal, data, or information provided by a user via an input device. An input device may include one or more of a keyboard, a mouse, a touch pad, a touch screen, a joystick, a microphone, an image sensor, and/or any other device for conveying data to an online, digital, or physical gaming machine. In some examples, the received input or received request may include one or more of text, sounds, speech, hand gestures, body gestures, tactile information, movement of a lever, button, or dial, and/or a selection of one or more widgets on a user interface displayed on a display of an online, digital, or physical gaming machine. Receiving a first request to initiate a first session may refer to receiving, by a processor, a signal generated as a result of a user employing one or more input devices to begin a first period or duration of time for interacting with the multidimensional map. For example, receiving a first request to initiate a first session may refer to receiving, by a processor, a signal generated as a result of a user employing one or more input devices to begin playing a game on an online, digital, and/or a physical gaming machine.

Figure 13:
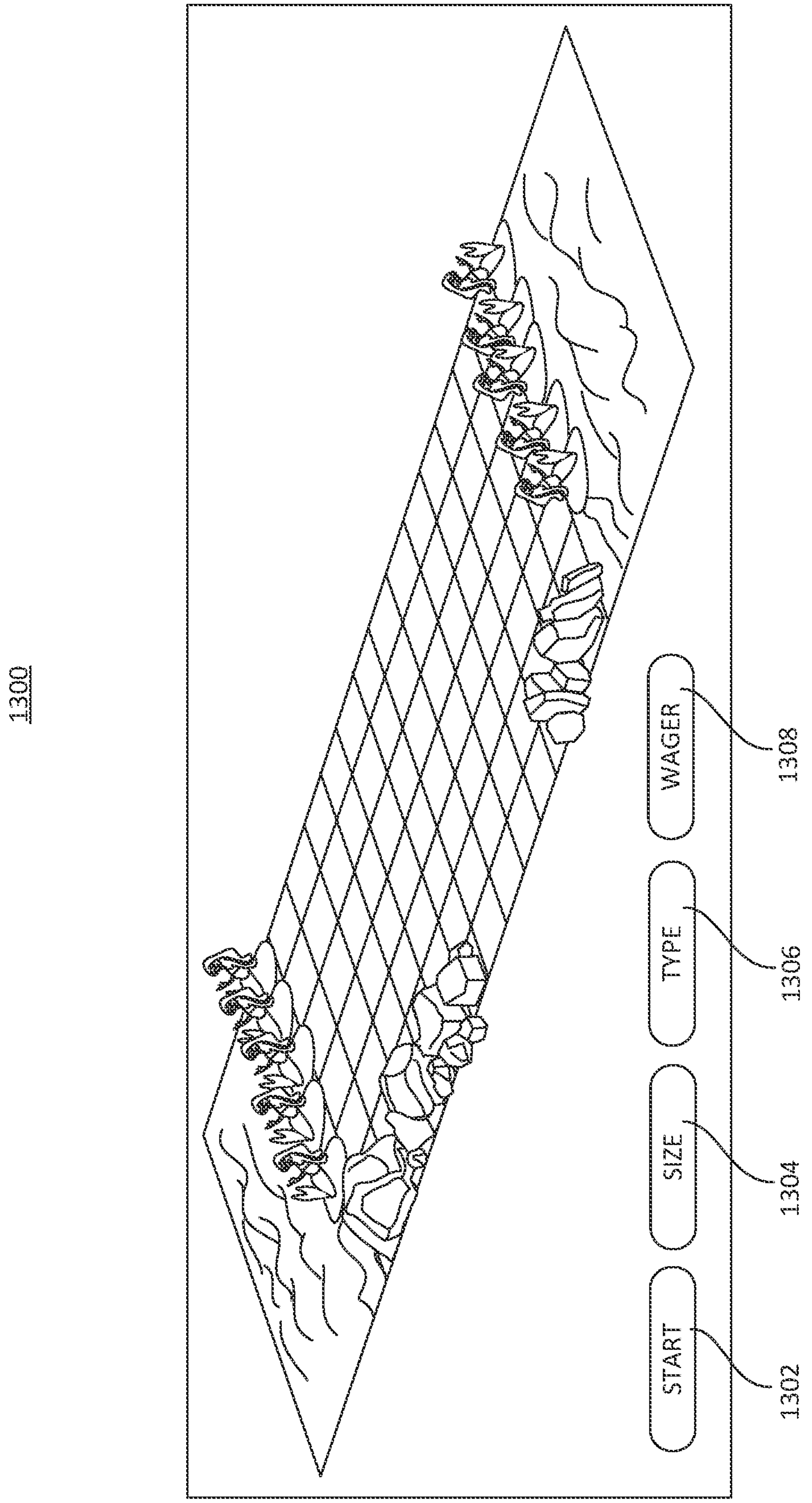
FIG. 13 illustrates an exemplary environment for initiating a session for playing a game, consistent with some disclosed embodiments.

By way of non-limiting example, FIG. 13 illustrates an environment 1300 (e.g., a user interface displayed on a screen of an online or digital gaming machine). As illustrated in FIG. 13, environment 1300 may include display of a button 1302 labelled "START" or "BEGIN". A user may select and/or click button 1302 using one or more of the input devices discussed above. Selection/clicking of button 1302 may generate a signal received by a processor (e.g., 510, 622, 632 in FIGS. 5 and 6), which in turn may initiate a game on the online or digital gaming machine for a particular period of time (e.g., session).

Some embodiments involve, based on the received first request, determining at least one first multidimensional map parameter defining at least one first constraint for the first multidimensional map employed in the first session, wherein the at least one first multidimensional map parameter includes at least one of a map height, a map width, a map length, a map type, a map geography, or a map size. A map parameter may refer to a quantity or a value that may determine a property of a map. A multidimensional map parameter may refer to the quantity or a value that may determine a property such as a size and/or type of a multidimensional map. A constraint may refer to something that may place a restriction or limit. A multidimensional map parameter defining at least one constraint may refer to a quantity or value that may define or place a restriction or a limit on at least one property of a multidimensional map. For example, a multidimensional map parameter may include properties such as a map height, a map width, a map length, or a map size. A map width, length, height, or size (e.g., area or volume) may place a restriction or limit on the dimensions of the multidimensional map. In some embodiments, a multidimensional map parameter may also include other properties or characteristics of a map, such a map geography or terrain, which may determine whether the map includes, for example, representations of a plain region, a hilly region, a beach, a desert region, a forested region, a deep valley, or any combination thereof. Other exemplary properties may include a color palette for the map, whether the representation of the map is based on infrared, ultraviolet, or other types of light, or any other property representative of an image displayed on a display associated with an online, digital, or physical gaming device.

By way of a non-limiting example, as illustrated in FIG. 13, environment 1300 may include display of a button 1304 labelled "SIZE" or a button 1306 labeled "TYPE." As one example, when a user selects button 1304 using one or more input devices, a pulldown menu with a list of different map sizes may appear, allowing the user to select one of the displayed map sizes. As another example, when the user selects button 1304, one or more text entry fields may be displayed, allowing the user to enter values for a length, a width, and/or a height for the multidimensional map. As another example, when the user selects button 1306 labeled "TYPE," a list of various types of maps (e.g., hilly, desert, forested, beach, valley, or other descriptors of geography or terrain) may be displayed to the user, allowing the user to select one of the displayed map types. When the user selects the "START" or "BEGIN" button, the processor (e.g., 510, 622, 632 in FIGS. 5 and 6) may receive a signal indicating that the user wishes to initiate a session to begin interacting with the online, digital, or physical gaming machine. The processor (e.g., 510, 622, 632) may determine a map parameter based on the selections the user may have made using, for example, buttons 1304 and/or 1306. In some embodiments, when the user does not provide information using buttons 1304 and/or 1306, the processor (e.g., 510, 622, 632) may determine one or more map parameters based on values of the one or more properties or characteristics of the map stored in, for example, a memory (e.g., 520) or a data structure such as a database (e.g., 532). Thus, one or more of the size button 1304 and the type button 1306 (or any other selector of a map parameter) may not be provided within the scope of the disclosed embodiments. For example, it is contemplated within the scope of this disclosure that computer readable media, systems, or methods may determine such parameters or other characteristics without user input.

Some embodiments involve determining, for inclusion in the first multidimensional map for the first session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map. A feature may refer to an attribute or characteristic. An element may refer to a constituent part. A multidimensional map element defining at least one feature may refer to a constituent part of the map associated with an attribute or characteristic of the map. In some embodiments, the attribute or characteristic may include, for example, one or more of a location of an award, an identity of an award, a number of awards, or a functionality associated with a particular location on the map. An award may be understood as discussed elsewhere in this disclosure. An identity of an award may refer to a set of characteristics by which an award may be recognizable or known. For example an identity of an award may include a name, label, and/or a description of the award. As one example, an identity of an award may include an award name or description, for example, chest, wheel, rum bottle, or coin, which may identify a type of the award. In some embodiments, a multidimensional map element may specify the number of awards that may be present on a multidimensional map. It is also contemplated that in some embodiments, a multidimensional map element may specify a number of awards of each of a plurality of types of awards (e.g., chest, field, rum bottle, coins). In some embodiments the multidimensional map element may specify a location on the multidimensional map where an award may be placed. As discussed elsewhere in the disclosure, the multidimensional map may be divided into a plurality of rectangular or square portions, and the multidimensional map element may define a location of a particular rectangular or square portion on which an award may be located. In some embodiments, the multidimensional map element may specify a functionality associated with the location of an award. For example, the functionality may specify that an award (e.g., chest) may automatically open when a character in a game associated with the multidimensional map is positioned at the particular location where an award (e.g., chest) may also be located. Other types of functionalities are also contemplated. For example in some embodiments, the functionality associated with an award may include initiation of a mini game separate from the primary game as discussed elsewhere in the disclosure. In some embodiments, the functionality may allow the character to virtually "dig" the ground at the character's current location to reveal an award that may be buried. As another example, in some embodiments, the functionality may allow the character to spin a wheel that may be located at the same location on the map as the character.

Inclusion may refer to adding, accommodating, inserting, or incorporating. Inclusion of a multidimension map element in a multidimensional map may refer to adding accommodating, inserting or incorporating the feature or characteristic defined by the multidimensional map element in the multidimensional map. Determining for inclusion may include retrieving or reading, by a processor (e.g., 510, 622, 632 in FIGS. 5 and 6), data or information from a data structure (e.g., 532) or memory (e.g., 520), storing values associated with a multidimensional map element. As discussed above, the stored values may define one or more characteristics of the multidimensional map including, for example, one or more of an award, and identity of an award, a number of the awards, or functionality associated with a particular location on the map.

Some disclosed embodiments involve generating the first multidimensional map to conform with the determined at least one first multidimensional map parameter and the determined at least one first multidimensional map element. Generating the first multidimensional map may refer to rendering, creating, producing, or bringing into existence a multidimensional map. A processor (e.g., 510, 622, 632) may create or produce the multidimensional map by outputting a set of data or values that may define the characteristics and locations associated with a plurality of pixels that when displayed on a display screen may render a visual representation of a map. The characteristics of each pixel may include, for example, properties such as color, intensity, or hue. The processor may generate the pixel characteristics based on a first multidimensional map parameter that may define a size or type of multidimensional map. For example, based on a map length, a map width, and/or a map height, the processor may generate values or color, intensity, or hue associated with a plurality of pixels depicting a map having the specified map length, width, and height. Similarly, based on a map type (e.g., hilly, desert, beach), the processor may determine the color, intensity, or hue of one or more pixels to represent the type of map specified by the first multidimensional map parameter. As also discussed above, the processor may generate information representative of a plurality of distributed spaces (e.g., tiles) on the multidimensional map. Further, the processor may generate information representative one or more awards placed at one or more of the tiles of the multidimensional map based on the information specified by a first multidimensional map element. In some embodiments, the processor may also generate information representative of a number of awards or the identity of an award specified by the first multidimensional map element. In some embodiments, the processor may generate code (e.g., binary code, script, or other type of instructions recognizable and executable by a processor) to represent a functionality associated with one or more locations (e.g., tiles) on the multidimensional map as specified by the first multidimensional map element. The processor may store the generated set of data associated with the first multidimensional map in a memory (e.g., 520) and/or a data structure (e.g., 532).

In some embodiments, the multidimensional map type is two-dimensional, three-dimensional, or four-dimensional. A multidimensional map may have two, three, or four dimensions. Each dimension of a two- or three-dimensional multidimensional map may represent a direction relative to a reference point or surface. For example, a two-dimensional map may represent an area along two directions distinct from each other. In some embodiments, the multidimensional map is defined by a cartesian coordinate system. A cartesian coordinate system may refer to a scheme in which each point in a plane is uniquely specified by a pair of real numbers called coordinates. The coordinates may include signed distances to the point from two lines (e.g., representing x and y axes), called coordinate axes, or axes. The point where the two lines intersect is the origin and may have coordinate (0, 0). By way of a non-limiting example, FIG. 7 illustrates an exemplary two-dimensional map 700 represented in the cartesian coordinate system having an x-axis 702 and a y-axis 704. As illustrated in FIG. 7, map 700 may include six columns of spaces and six rows of spaces, providing 36 spaces 706 disposed about x-axis 702 and y-axis 704. In a three-dimensional map, each point or location may be uniquely specified by a group of three real numbers called coordinates. Such a three-dimensional map may also be defined by a cartesian coordinate system, in which an area of land or a water body may be represented along three directions distinct from each other. In a three-dimensional map, each point or location may be uniquely specified by a group of three real numbers called coordinates. The coordinates may include signed distances to the point from three fixed, generally perpendicularly oriented lines, called coordinate axes, or axes. The point where the three lines intersect may be referred to as the origin and may have coordinate (0, 0, 0).

By way of a non-limiting example, FIG. 8 illustrates an exemplary three-dimensional map 100 represented in the cartesian coordinate system having an x-axis 802 and a y-axis 804. As illustrated in FIG. 8, a planar surface 812 of the land or water represented in map 800 may be displayed along an x-axis and a y-axis. Moreover, z-axis 806 may represent a distance (e.g., height or depth) of the surface 812 (e.g., of land) represented on map 800 relative to the plane defined by the x and y axes. For example, a height of rock 108 above surface 812 may be represented by a distance measured along the z-axis. Although a cartesian coordinate system has been discussed above, it is contemplated that in some embodiments, a two-dimensional map may be represented using a polar coordinate system, a cylindrical coordinate system, a spherical coordinate system, or any other scheme for defining map positions.

In some embodiments, the two- or three-dimensional map may include another dimension, namely time. For example, in some embodiments, the multidimensional map may change over time. The representations of one or more natural or geographic features or objects shown on a multidimensional map may be different at different times, including, for example, different times of the day, different times of the week, different times of the month, different times of the year, or differing elapsed time as judged from a baseline, such as initiation of gameplay. For example, a multidimensional map generated during the morning may represent an area of land and/or water body as it would appear during the daytime. In contrast, a multidimensional map generated during evening or night time may represent the area of land and/or water body as it would appear, for example, during sunset or under moonlight, respectively. By way of another example, the vegetation displayed on the multidimensional map may change depending on whether the time of the year corresponds to a summer month, a winter month, spring time, or fall. Other variations in the lighting conditions, colors, vegetation, and/or items displayed on the multidimensional map may be determined based on time, which may be determined from a clock associated with a computational device (e.g., device 100) displaying the multidimensional map, or a clock associated with, for example, server side device 620 and/or client side device 630. Thus, a four-dimensional multidimensional map may include a three-dimensional multidimensional map that changes over time.

Some embodiments involve receiving at least one multidimensional map input, and wherein generating the first multidimensional map is at least partially based on the at least one multidimensional map input. Receiving may be understood as discussed elsewhere in this disclosure. A multidimensional map input may refer to a signal representing data or information. Such input may be automatically generated, preset, or provided, by a user, using an input device as discussed elsewhere in this disclosure. In some embodiments, the data or information associated with the multidimensional map input may be stored in a memory (e.g., 520) and/or a data structure (e.g., 532). Receiving at least one multidimensional map input may refer to receiving, by a processor, a signal generated as a result of a user employing one or more input devices to provide data or information. In some embodiments, receiving at least one multidimensional map input may refer to reading, by the processor, data or information stored in a memory (e.g., 520) and/or a data structure (e.g., 532). In some embodiments, the multidimensional map input may refer to data or information associated with a user. For example, the data or information associated with the user may include a name, a username, an identifier, an age, or any other information associated with the user. In some embodiments, the multidimensional map input may include data or information specifying a maximum duration for which a user wishes to engage with an online, digital, or physical gaming machine (e.g., duration of time for which the user wishes to play a game). In some embodiments, the multidimensional map input may include one or more of a multidimensional map parameter, a multidimensional map element, or a wager. A multidimensional map parameter, a multidimensional map element, and a wager may be understood as discussed elsewhere in this disclosure.

One or more of the above-identified multidimensional map inputs may alter at least some properties or characteristics of a multidimensional map. For example, when the multidimensional map input includes a multidimensional map parameter (e.g., map length, map width, map height, map size, and/or map type), the processor (e.g., 510, 622, 632 in FIGS. 5 and 6) may generate the multidimensional map as discussed above based on that parameter or multidimensional map input. Similarly, when the multidimensional map input includes a multidimensional map element (e.g., award, identity of award, number of awards, functionality associated with map location), the processor (e.g., 510, 622, 632) may generate the multidimensional map as discussed above based on that element or multidimensional map input. As another example, when the multidimensional map input is a wager, the processor (e.g., 510, 622, 632) may determine a size of the multidimensional map based on the wager. For example, the processor may generate a multidimensional map having a larger size when the amount of the wager is larger as compared to when the amount of the wager is smaller. The correlation between amounts of wager and map sizes may be determined by the processor using a lookup table or other information stored in a memory (e.g., 520) and/or a data structure (e.g., 532), using an algorithm, using a mathematical expression, or based on any other computing instructions provided to the processor. When the multidimensional map input includes user information, the processor may generate the multidimensional map using imagery consistent with, for example, an age of the user. It is to be understood that one or more properties or characteristics of the first multidimensional map may be determined or adjusted by the processor based on any of the various types of multidimensional map inputs discussed above.

By way of non-limiting example, FIG. 13 illustrates an environment 1300 (e.g., user interface displayed on a screen of an online or digital gaming machine). as illustrated in FIG. 13, environment 1300 may include display of a button 1304 labelled "SIZE" or a button 1306 labeled "TYPE". In some embodiments, when a user selects button 1304 using one or more input devices, a pulldown menu with a list of different map sizes may appear, allowing a user to select one of the displayed map sizes. In some embodiments, when the user selects button 1304, another screen may appear, allowing the user to enter values for a length, a width, and/or a height for the multidimensional map. As another example, when the user selects button 1306 labeled "TYPE" list of various types of maps (e.g., hilly, desert, beach, valley, or other descriptors of geography) may be displayed to the user, allowing the user to select one of the displayed map types. As another example, when the user selects button 1308 labeled "WAGER," a pulldown menu displaying a plurality of different wagers, a checkbox menu displaying a plurality of different wagers with associated checkboxes, a text entry field, and/or any other type of graphical user interface widget, allowing a user to enter an amount of wager may be displayed to the user. The user may select a wager from among the displayed wagers and/or may enter an amount of wager in a text entry field to provide a multidimensional map input in the form of a wager. As discussed above, the processor (e.g., 510, 622, 632) may receive one or more signals generated in response to the user entering a size, a type, and/or a wager using, for example, buttons 1304, 1306, and/or 1308. The processor (e.g., 510, 622, 632) may generate the first multidimensional map based on the received multidimensional input as discussed above.

Figure 14A:
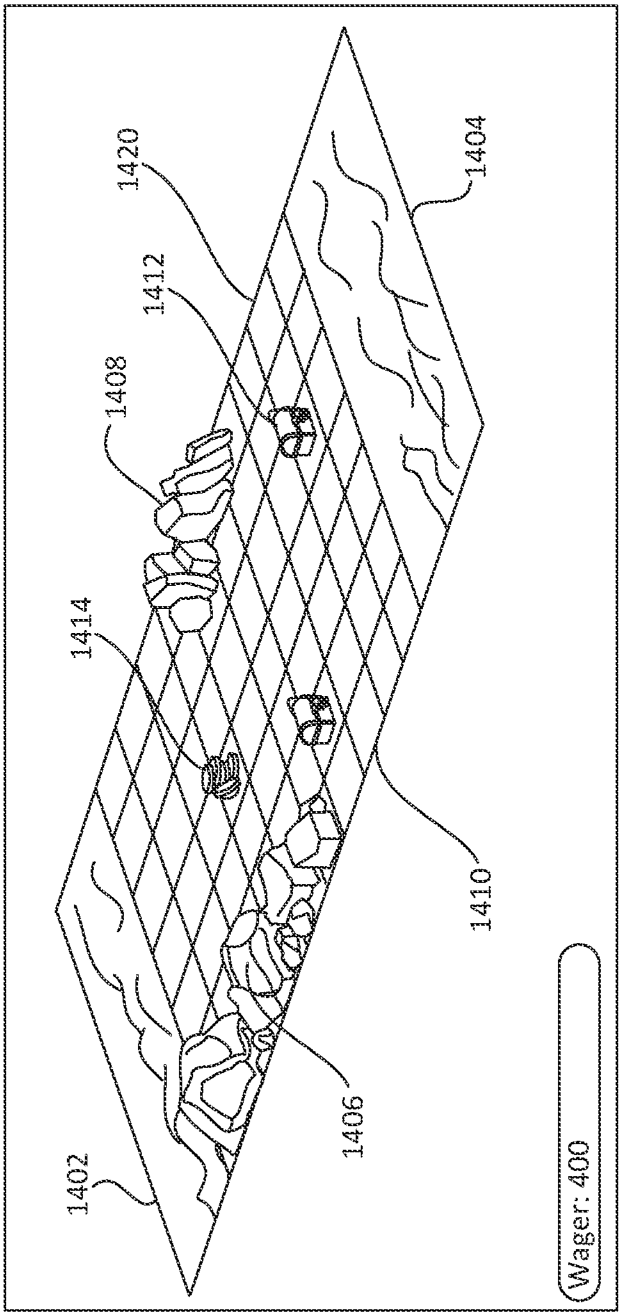
FIG. 14A illustrates an exemplary first multidimensional map, consistent with some disclosed embodiments.

Some embodiments involve causing a display of the first generated multidimensional map on a computing device. Causing a display of the multidimensional map may include displaying (e.g., information) visually in a manner that allows a user to view the multidimensional map, e.g., by activating one or more pixels of a display of a computing device, activating one or more LEDs, LCDs of the display, and/or activating one or more lasers or other light sources to project information (e.g., on a wall or a screen), and/or performing any other action that allows for information or data associated with the multidimensional map (e.g., for representations of the land or water surface, the character, and/or one or more award) to be visually perceived by a user. Causing the display may also include one or more of selecting a display medium (e.g., a display screen, a wall) for displaying the multidimensional map, determining a layout, size, and/or style for displaying the multidimensional map, selecting a region for displaying the multidimensional map (e.g., in association with a software application, window, frame, or functionality) on a display device associated with a computing device being used by a user to play the game. By way of a non-limiting example, FIG. 14A illustrates first multidimensional map 1400. A processor (e.g., processor 510, 622, or 632) may cause multidimensional map 1400 to be displayed on a display 540 of computational device 500.

Some embodiments involve instituting the first session using the first generated multidimensional map. A first session may be understood as a session discussed elsewhere in the disclosure. Instituting may refer to originating, establishing, beginning, commencing, or starting. Instituting the first session may refer to originating, establishing, beginning, commencing, or starting a period, term, or duration of time over which a user may interact with a multidimensional map. As one example, instituting the first session may refer to originating, establishing, beginning, commencing, or starting a first period, term, or duration of time over which a user may play a game using the first multidimensional map. In some embodiments, the processor (e.g., 510, 622, 632) may display the first multidimensional map on a screen or display of a user device and may institute a first session (e.g., begin or commence a period of time over which a user may play a game) using the first multidimensional map. As discussed above, the first multi-map may be associated with an online or digital game and/or a game on a physical gaming machine. To play the game a user may place a wager and pull a lever or push a switch or button to cause one or more reels associated with the game to spin. When the one or more reels stop spinning, one or more symbols or text displayed on the faces of the reels may result in an outcome, which may lead to an award being provided to the user or no award being provided to the user. To continue with a game the user may place another wager and pull the lever or manipulate a switch or button to cause the one or more reels to spin again. The player may continue to place wagers and spin the reels until the user reaches the end of the game or decides to end the game before reaching the end of the game. The duration of time between a time when the processor first displays the multidimensional map and allows the user to place a wager up to the time when the game ends or when the user and the game may be referred to as the first session. Thus, the processor may be configured to institute (e.g., begin or commence) the first session by displaying the first multidimensional map and providing one or more buttons and/or widgets on the first multidimensional map for a user to interact with the first multidimensional map.

Some embodiments involve receiving a first assurance, and dynamically altering the first multidimensional map when the received first assurance exceeds a predetermined assurance threshold. As discussed above, a user may play a game in which the user may interact with the first multidimensional map by placing a wager and then interacting with the multidimensional map by, for example, pulling a lever or manipulating a button or a switch. In response, the user may either receive an award or may receive no award. To continue playing the game, the user may provide a subsequent wager and again interact with the first dimensional map by, for example, pulling a lever or manipulating a button or a switch. The player may continue with the steps until the game ends. During a game, the user may be allowed to make minor changes to the wager. For example, user may be allowed to increase or decrease the wager by a small amount. However if the user increases the amount of wager by a large amount, the processor may be configured to regenerate the multidimensional map. A threshold may refer to a level, point, or value above which something is true or will take place and below which it is not or will not take place. A predetermined assurance threshold may refer to a maximum value of a wager below which the multidimensional map may remain unchanged. However when a wager placed by a user is greater than or equal to the specified maximum value of the wager (e.g., predetermined assurance threshold), the processor may be configured to regenerate the multidimensional map.

Dynamically may refer to something that is reactive, responsive, or that otherwise varies situationally. Altering may refer to modifying, changing, or transforming something. Dynamically altering the first multidimensional map may refer to the processor modifying or changing the first multidimensional map by changing one or more properties or characteristics of the map. For example, the processor (e.g., 510, 622, 632 in FIGS. 5 and 6) may alter one or more of a multidimensional map parameter or a multidimensional map element, as discussed above. Furthermore the processor may regenerate the first multidimensional map with the altered value of the multidimensional map parameter or the multidimensional map element while the user is still playing the game in the first session. The processor may also display the altered multidimensional map to the user. Thus, the user may be able to visually perceive a change in the multidimensional map while the user is playing the game. In a broadest sense, if a perception is presented to a user that a visual appearance of a multidimensional map displayed to the user changes while the user is playing a game, such a change may be deemed to be dynamically altering the multidimensional map within the meaning of this disclosure Thus, changing an amount of the wager such that there wager is greater than the predetermined assurance threshold may cause the processor to change one or more properties of the first multidimensional map, and the updated first multidimensional map may be displayed to the user while the user is playing the game in the first session.

Figure 14B:
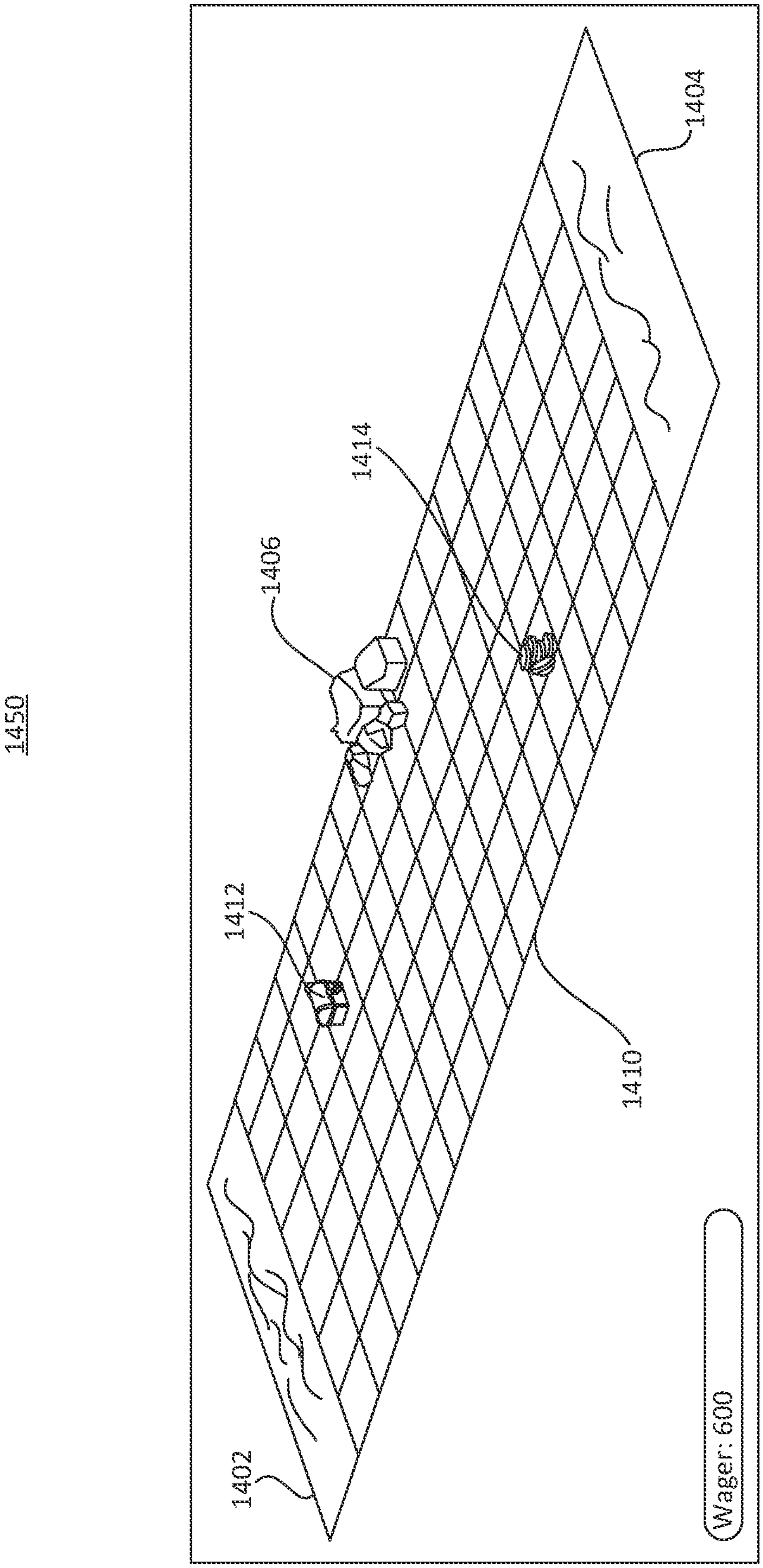
FIG. 14B illustrates an exemplary second multidimensional map, consistent with some disclosed embodiments.

By way of non-limiting example, FIG. 14A illustrates a first multidimensional map 1400 bounded by water adjacent edges 1402 and 1404, and including rocks 1406 along portions of edge 1410 and rocks 1408 along portions of edge 1420. Additionally first multidimensional map 1400 may include awards such as chests 1412 and coins 1414. As also illustrated in FIG. 14A, the first multidimensional map 1400 may be associated with a wager value of 400 coins. During a game, a user may increase the wager value to 600 coins, which may be larger than a predetermined assurance threshold of 500 coins. A processor (e.g., 510, 622, 632) may receive a signal generated in response to the change in the wager value made by the user. The processor may compare the wager value of 600 coins with the predetermined assurance threshold of 500 coins and may determine that the wager is larger than the predetermined assurance threshold. In response the processor may regenerate first dimensional map 1400. FIG. 14B illustrates a regenerated multidimensional map 1450. A comparison of FIGS. 14A and 14B shows that a size of regenerated multidimensional map 1450 may be larger than a size of first dimensional map 1400. Furthermore the positions of rocks 1406 in regenerated multidimensional map 1450 may be different compared to the position of rocks 1406 in first multidimensional map 1400. Rocks 1408 may be absent from regenerated multidimensional map 1450, and locations of awards such as chests 1412 and coins 1414 on regenerated multidimensional map 1450 may be different from that of first multidimensional map 1400. Thus, the processor (e.g., 510, 622, 632) may dynamically alter the first multidimensional map 1400 into a regenerated multidimensional map 1450, while the user is playing a game, when a wager placed by the user exceeds a predetermined assurance threshold.

In some embodiments, the first assurance includes a wager, and the predetermined assurance threshold includes a wager indicator. As discussed above, an assurance may refer to a bet, which, depending on implementation or embodiment, may include an item being associated with a real or perceived value that a user risks, in the hope of winning an equivalent or larger value or perceived value based on an uncertain outcome. As also discussed above, in some embodiments, an assurance may include a wager (e.g., tokens, points, credits, virtual coins, or a sum of money). As further discussed above, a processor (e.g., 510, 622, 632) may be configured to dynamically alter the first multidimensional map depending on whether a wager placed by a user is greater than or less than a predetermined assurance threshold. An indicator may refer to text, a symbol, an icon, or other graphical display that may signal, point, specify, demarcate, and/or identify something. A wager indicator may refer to text, a symbol, an icon, and/or any other graphical display that may signal, point, specify, demarcate and/or identify an amount of a wager. A predetermined assurance threshold that includes a wager indicator may include text, one or more symbols, icons, or other graphical display specifying or pointing to a value associated with the predetermined assurance threshold. For example, a predetermined assurance threshold that includes a wager indicator may include text specifying the value of the predetermined assurance threshold. In some embodiments, a predetermined assurance threshold that includes a wager indicator may be in the form of a widget (e.g., button, switch, box, dial) on a graphical user interface that when activated may display the value of the predetermined assurance threshold. By way of example, FIG. 2 illustrates a portion 200 of an exemplary multidimensional map 100. As illustrated in FIG. 2, portion 200 may display wager 250 placed by a user (e.g., displayed as 600,000). Furthermore, portion 200 may include a button 252 labeled "MAX BET" that may be a wager indicator. When a user interacts with (e.g., clicks on, selects, taps) button 252, the processor (e.g., 510, 622, 632) may be configured to display or indicate the value of the predetermined assurance threshold to the user.

Some embodiments involve receiving a first assurance, and dynamically altering the first multidimensional map when the received first assurance fails to exceed a predetermined assurance threshold. As discussed above, a processor and/or software may be configured to completely (or at least partially) regenerate the multidimensional map when a wager placed by the user exceeds a predetermined assurance threshold. It is contemplated that in some embodiments the processor may be configured to make changes to the first multidimensional map, without completely regenerating the first multidimensional map, when a wager placed by the user is less than the predetermined assurance threshold. For example, the processor may be configured to alter the value of a multidimensional map element, while keeping the values of one or more multidimensional map parameters the same. As one example, when a wager placed by the user is less than the predetermined assurance threshold, the processor may be configured to add an award to a particular location on the first multidimensional map, remove an award from a particular location on the first of multidimensional map, and/or move change the position of one or more awards on the multidimensional map. While adding, subtracting, and/or altering the positions of the one or more awards, a size and/or type of the first multidimensional map may remain the same.

Figure 14C:
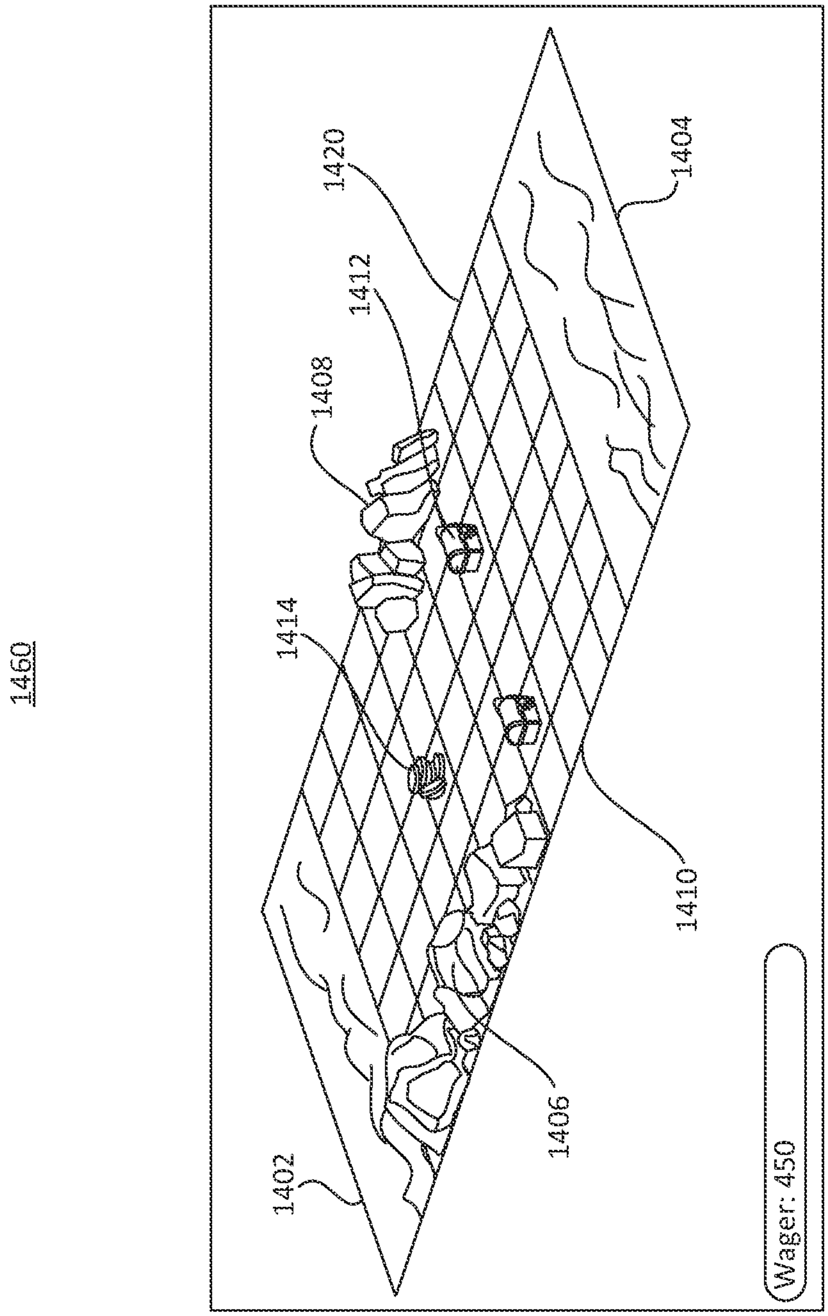
FIG. 14C illustrates an exemplary regenerated first multidimensional map, consistent with some disclosed embodiments.

By way of non-limiting example, FIG. 14A illustrates a first multidimensional map 1400 bounded by water adjacent edges 1402 and 1404, and including rocks 1406 and 1408 along portions of edge 1410 and 1420, respectively. Additionally first multidimensional map 1400 may include awards such as chests 1412 and coins 1414. As also illustrated in FIG. 14A, the first multidimensional map 1400 may be associated with a wager value of 400 coins. During a game, a user may increase the wager value to 450 coins, which may be smaller than a predetermined assurance threshold of 500 coins. A processor (e.g., 510, 622, 632) may receive a signal generated in response to the change in the wager value made by the user. The processor may compare the wager value of 450 coins with the predetermined assurance threshold of 500 coins and may determine that the wager is smaller than the predetermined assurance threshold. In response the processor may regenerate first dimensional map 1400. FIG. 14C illustrates regenerated first multidimensional map 1460. A comparison of FIGS. 14A and 14C shows that a size of regenerated multidimensional map 1460 may be about equal to a size of first multidimensional map 1400. Furthermore the positions of rocks 1406 and 1408 in regenerated first multidimensional map 1460 may remain unchanged compared to the position of rocks 1406 and 1408 in first multidimensional map 1400. Only the location of one of the awards (e.g., chest 1412) on the regenerated multidimensional map 1460 may be different from that of first multidimensional map 1400. Thus, the processor (e.g., 510, 622, 632) may dynamically alter the first multidimensional map 1400 into a regenerated first multidimensional map 1450, while the user is playing a game, when a wager placed by the user is less than a predetermined assurance threshold.

Some embodiments involve, following the first session, receiving a second request to initiate a second session in the environment. The terms environment and first session may be understood as discussed elsewhere in this disclosure. The second session may be understood as being similar to the first session except, for example, that the second session may have a different start and end time as compared to the first session. A second request to initiate a session (e.g., second session) may be understood to be similar to the first request to initiate a session (e.g., first session) discussed above. Following may refer to coming next in time or order. In some embodiments, the processor (e.g., 510, 622, 632 in FIGS. 5 and 6)) may receive a second request to initiate a second session in the environment after completion of the first session. For example, as discussed above, a user may play a game using the first multidimensional map during a first period of time (e.g., during a first session). As also discussed above, the first session may end when either the user reaches the end of the game or when the user ends the game before reaching the end of the game. After the game has ended and the first session is concluded, the same or another user may interact with the online, digital, or physical gaming machine causing generation of a signal indicating a request to initiate another session (e.g., second session).

By way of non-limiting example, FIG. 13 illustrates an environment 1300 (e.g., user interface displayed on a screen of an online or digital gaming machine). As illustrated in FIG. 13, environment 1300 may include display of a button 1302 labelled "START" or "BEGIN." After a first session has ended, the same or a different user may select or click on button 1302 using one or more of the input devices discussed above. Selection/clicking of button 1302 may generate a signal received by a processor (e.g., 510, 622, 632), which in turn may initiate a game on the online or digital gaming machine for another period of time (e.g., second session).

Some embodiments involve, based on the received second request, determining at least one second multidimensional map parameter defining at least one second constraint for the second multidimensional map in the second session, wherein the at least one second multidimensional map parameter includes the map height, the map width, the map length, the map type, the map geography, or the map size. The second multidimensional map parameter and the second constraint may be understood as being similar to the first multidimensional map parameter and the first constraint discussed above. A processor (e.g., 510, 622, 632) may determine a second multidimensional map parameter when it receives a signal generated in response to an input provided by the user regarding a multidimensional map parameter such as, a map size or a map type. It is contemplated that in some embodiments the processor (e.g., 510, 622, 632) may additionally or alternatively determine the second multidimensional map parameter by reading or retrieving a value of the second multidimensional map parameter from a memory (e.g., 520), and/or database (e.g., 532). One or more of the second multidimensional map parameters may be the same as or different from one or more of the first multidimensional map parameters.

By way of a non-limiting example, as illustrated in FIG. 13, environment 1300 may include display of a button 1304 labeled "SIZE," a button 1306 labeled "TYPE," and/or a button 1308 labeled "WAGER." When a user selects one of buttons 1304, 1306, 1308, the processor (e.g., 510, 622, 632) may receive a signal indicating a value of a second multidimensional map parameter selected or entered by the user. The processor (e.g., 510, 622, 632) may determine the second multidimensional map parameter based on values stored in a memory (e.g., 520) or a data structure (e.g., 532) when, for example, the user has not selected buttons 1304, 1306, or 1308 to specify a map parameter.

Some embodiments involve determining, for inclusion in the second multidimensional map for the second session, at least one second multidimensional map element defining at least one feature of the second multidimensional map, wherein the at least one second multidimensional map element for the second session includes at least one of the location of at least one award on the second multidimensional map, the identity of the at least one award, the number of the at least one award, or the functionality associated with the particular location on the multidimensional map. A second multidimensional map element may be understood as being similar to the first multidimensional map element. Determining a second multidimensional element may be understood as being similar to determining a first multidimensional map element as discussed above. For example, as discussed above with respect to the first multidimensional map element, determining for inclusion of a second multidimensional map element may include retrieving or reading, by a processor (e.g., 510, 622, 632), data or information from a data structure (e.g., 532) or memory (e.g., 520) storing values associated with a multidimensional map element. As discussed above, the stored values may define one or more characteristics of the multidimensional map including, for example, one or more of an award, and identity of an award, a number of the awards, or functionality associated with a particular location on the map. One or more of the second multidimensional map elements may be the same as or different from one or more of the first multidimensional map elements.

Some embodiments involve generating the second multidimensional map to conform with the determined at least one second multidimensional map parameter and the at least one second multidimensional map element. Generating the second multidimensional map may be understood to be similar to generating the first multidimensional map as discussed above. As discussed above, processor (e.g., 510, 622, 632) may create or produce the second multidimensional map by creating a set of data that may define the characteristics and location associated with a plurality of pixels, which when displayed on a display screen render a visual representation of the second multidimensional map. The processor may generate the pixel characteristics based on a second multidimensional map parameter and on a second multidimensional map element in the same manner as discussed above with respect to generating pixel characteristics based on a first multidimensional map parameter and on a first multidimensional map element.

Some embodiments involve receiving at least one multidimensional map input, and wherein generating the second multidimensional map is based on the at least one multidimensional map input. Receiving at least one multidimensional map input may be understood as discussed elsewhere in the disclosure. Generating the second multidimensional map based on the at least one multidimensional map input may be understood as being similar to generating the first multidimensional map based on the at least one multidimensional map input as discussed above. As discussed above with respect to the first multi-map input, when the multidimensional map input includes a multidimensional map parameter (e.g., map length, map width, map height, map size, and/or map type), the processor (e.g., 510, 622, 632) may generate the multidimensional map as discussed above based on that parameter or multidimensional map input. Similarly, when the multidimensional map input includes a multidimensional map element (e.g., award, identity of award, number of awards, functionality associated with map location), the processor (e.g., 510, 622, 632) may generate the multidimensional map as discussed above based on that element or multidimensional map input. As another example, when the multidimensional map input is a wager, the processor (e.g., 510, 622, 632) may determine a size of the multidimensional map based on the wager as discussed above.

Some embodiments involve causing a display of the second generated multidimensional map on the computing device for the second session. Causing a display of the second generated multidimensional map on the computing device may be understood as being similar to causing a display of the first generated multidimensional map on the computing device. A second session may be understood as discussed elsewhere in the disclosure. A processor (e.g., 510, 622, 632) may be configured to display the second multidimensional map on a display screen of a computing device, as discussed above, for a second period of time (e.g., second session) during which a user may play a game associated with the second multidimensional map. The second period of time (e.g., second session) may be different than the first period of time (e.g. first session). By way of a non-limiting example, FIG. 14B illustrates second multidimensional map 1400. A processor (e.g., processor 510, 622, or 632) may cause second multidimensional map 1450 to be displayed on a display 540 of computational device 500.

In some embodiments, the second generated multidimension map differs from the first generated multidimensional map in a non-predictable manner. Differs may refer to be dissimilar in nature, quality, amount, form, or characteristic. A second generated multidimensional map that differs from the first generated multidimensional map may refer to a condition in which, one or more properties, characteristics, or functionalities of the second generated multidimensional map may be dissimilar to the first generated multidimensional map. For example, a map size of the second generated multidimensional map may be different from a map size of the first generated multidimensional map. By way of another example, a number of awards or the types of awards (e.g., chests, wheels, coins, rum bottles) in the first generated multidimensional map may be different from the number of awards or the type of awards in the second generated multidimensional map. As another example, the one or more awards may be distributed on the first generated multidimensional map at locations different from the locations on the second generated multidimensional map. For example as discussed above, FIG. 14A illustrates a first generated multidimensional map 1400 and FIG. 14B illustrates a second generated multidimensional map 1450 that has a different size, different awards and different locations of awards compared to the first generated multidimensional map 1400.

Differing in a non-predictable way may refer to differences that are difficult for a user to foretell or foresee or that otherwise are not known to the user in advance. The second generated multidimensional map may differ from the first generated multidimensional map in a non-predictable manner because it may be difficult to foretell, foresee, or know one or more properties, characteristics, and/or behaviors of the second generated multidimensional map before the second multidimensional map has been generated. Thus, for example a second multidimensional map may be different from the first generated multidimensional map if the differences between the two maps could not have been predicted prior to generation of the second multidimensional map. As discussed above, the unpredictability in the generation of the multidimensional maps may be achieved through various means, such as using random number generators that generate a sequence of numbers that appear to be random, even though they may be generated by a deterministic process. In a broadest sense, if a perception is presented to a user that differences between successively generated multidimensional maps are random (even if there may be some non-random underlying mechanism), the successively generated multidimensional maps may be deemed to be non-predictably different within the meaning of this disclosure.

In some embodiments, the non-predictable manner is unique to at least one of the first generated multidimensional map and the second generated multidimensional map. As discussed above, the processor (e.g., 510, 622, or 632) may use one or more randomization techniques such as the use of random number generators to ensure that there is no pattern, scheme, or a way to predict differences between the first multidimensional map and the subsequently generated second multidimensional map. In some embodiments, the processor may use the one or more randomization techniques to generate one or both of the first and/or second multidimensional maps. For example, the processor may use one or more randomization techniques to generate the first multidimensional map such that, the first multidimensional map may include at least some different multidimensional map parameters, multidimensional map elements, properties, and/or behaviors each time the first multidimensional map is generated even though the same first multidimensional map parameter and/or first multidimensional map element and/or wager may be provided as an input. Similarly, the processor may use one or more randomization techniques to generate the second multidimensional map such that, the second multidimensional map may include at least some different multidimensional map parameters, multidimensional map elements, properties, and/or behaviors each time the second multidimensional map is generated even though the same second multidimensional map parameter and/or second multidimensional map element and/or wager may be provided as an input. Thus, the nonpredictable manner of generating multidimensional maps may be unique to at least one of the first multidimensional map or the second multidimensional map.

Some embodiments involve collecting a set of data characterizing the first session. Collecting may refer to seeking, locating, acquiring, organizing, cataloging, displaying, and/or storing. Data characterizing the first session may include one or more parameters of properties associated with interactions of a user with the multidimensional map during a first period of time (e.g., first session). For example, the data characterizing the first session may include receiving or collecting information about, for example, a number of wagers made by the user during a game, the amounts of the wagers made by the user during the game, or number of times the user increased and/or decreased the wager during the game, the number or types of awards received by the user during the game, the total duration of time for which the user played the game, and/or any other information associated with one or more actions taken by the user during the game, and/or associated with a progress of the user during the game. Additionally or alternatively, the data characterizing the first session may include information about moves of characters during first session gameplay and/or properties or characteristics of the board during first session gameplay.

In some embodiments, the collected set of data characterizing the first session includes at least one of game time, game progression, game history, and game difficulty. Game time may refer to a total duration of time for which the user plays a game during a first session or a second session. Game progression may refer to one or more parameters indicating progress of the user towards achieving the objective or goal of the game. Game history may include information such as a number of wagers made by the user during the game, the amounts of the wagers made by the user during the game, number of times the user increased and/or decreased the wager during the game, or the number and/or types of awards received by the user during the game. Game difficulty may refer to an indication of a relative level of ease with which a user may be able to achieve the objective or goal for the game. As discussed elsewhere in this disclosure, an objective or goal for the game may be for a character displayed on the multidimensional map to reach a final row including a set of treasure chests, some or all of which may include one or more awards that may be awarded to the user based on a location of the character on the final row of the multidimensional map. The level of difficulty may represent the ease with which a user may be able to achieve that goal. In some embodiments, the level of difficulty may be determined based on one or more parameters characterizing the first session as discussed above. Such parameters may include, for example, a number of wagers, amounts of wagers, or an amount of time taken by the user to reach the final row of the multidimensional map. For example, a level of difficulty may be high when a number of wagers a user must place to reach the final row of the multidimensional map exceeds a predetermined threshold number. As another example, a level of difficulty may be high when an amount of time required by user to reach the final row of the multidimensional map exceeds a predetermined threshold time. The level of difficulty may be indicated in many ways. For example, in some embodiments the level of difficulty may be indicated by a three-tiered scale (e.g., High, Medium, Low), with each level being defined by a different threshold associated with a particular parameter (e.g., amount of time, number of wagers, size of wagers).

By way of non-limiting example, FIG. 14A illustrates a first multidimensional map 1400. A processor (e.g., 510, 622, 632) may collect and store one or more parameters or properties associated with a game played by the user during a first period of time (e.g., first session) using the first multidimensional map 1400. The processor (e.g., 510, 622, 632) may be configured to store the collected one or more parameters or properties in a memory (e.g., 20) or a data structure (e.g., 532).

In some embodiments, generating the second multidimensional map is based on the collected set of data. As discussed above, a processor (e.g., 510, 622, 632 in FIGS. 5 and 6) may generate a second multidimensional map for use in a game during a second session based on one or more second multidimensional map parameters and/or second multidimensional map elements. In some embodiments, the processor may additionally or alternatively generate the second multidimensional map based on the data characterizing a first session. The processor (e.g., 510, 622, 632) may read or retrieve data characterizing the first session from a memory (e.g., 520) and/or a data structure (e.g., 532) and may generate the second multidimensional map based on the read or retrieved data. As one example, the processor may select a level of difficulty for the second multidimensional map based on the level of difficulty stored for the first multidimensional map. For example, the processor may increase or decrease a level of difficulty for the second multidimensional map relative to the stored level of difficulty for the first multidimensional map. As another example, the processor may increase or decrease a level of difficulty for the second multidimensional map based on the pattern of increase or decrease of the amount of wager made by a user as the game progressed during the first session. For example, when the stored set of data characterizing the first session indicates that the user increased the amount of wager as the character on the map reached closer to the final row of the first multidimensional map, the processor may increase the level of difficulty in the second multidimensional map to make it more difficult for the user to reach the end goal of the game. As another example, the processor may select the number of awards or the locations of the awards on the second multidimensional map based on an amount of time or number of attempts (or moves) required by a user to reach the final row of the multidimensional map while playing a game during the first session. The examples provided above should be understood as being non-limiting. The processor may adjust one or more parameters, elements, properties, or functionalities of the second multidimensional map based on the stored set of data characterizing the first session in many ways similar to or different from those illustrated in the above examples.

Some embodiments involve dynamically updating the second multidimensional map in real time during the second session based on the collected set of data. As discussed above, a processor (e.g., 510, 622, 632) may collect a first set of data (e.g., including one or more parameters or properties associated with the game (e.g., game time, game progression, game history, or game difficulty) characterizing the first session. In a similar manner, the processor (e.g., 510, 622, 632) may collect a second set of data (e.g., including one or more parameters or properties associated with the game, gametime, game progression, game history, or game difficulty) during the second session. The processor may compare one or more items of data in the first set with corresponding items in the second set of data. Based on the comparison, the processor may modify one or more elements associated with the second multidimensional map dynamically (e.g., while the user is playing a game using the second generated multidimensional map) during the second session. By way of example, the processor may determines a rate at which the user is progressing towards the end goal of the game (e.g., a final row of the second multidimensional map) during the second session. Based on the determined rate, the processor may change the locations of one or more awards that may be present on the second multidimensional map to, for example, make it easier or more difficult for the user to reach the final row of the second multidimensional map. By way of another example, when the processor determines that the user is placing higher amounts of wagers while playing a game using the second multidimensional map in the second session, the processor may adjust a level of difficulty (e.g., increase the level of difficulty) for the second multidimensional map. The processor may do so by adding or removing one or more awards at one or more location on the second multidimensional map, changing the type of awards already existing on the second generated map, or by reordering the positions of the one or more awards on the second generated map. The processor may be configured to make these changes while the user is still playing a game using the second generated in the map in the second session thus dynamically updating the second multidimensional map in real time during the second session.

Some embodiments involve comparing the at least one first multidimensional map element to the at least one second multidimensional map element, and when the comparison results in a match, regenerating the second multidimensional map. As discussed above, a processor (e.g., 510, 622, 632) may determine a first generated map element and may generate a first multidimensional map based on the first multidimensional map element. In a similar manner, the processor (e.g., 510, 622, 632) may determine a second generated map element and may generate a second multidimensional map based on the second multidimensional map element. Comparing may refer to examining at least a pair of quantities, data and/or information to determine the similarities or differences between the compared pair of quantities, data, and/or information. A processor may compare a first multidimensional map element associated with a first multidimensional map with a second generated map element associated with a second multidimensional map in many different ways. For example the processor may take a difference between the two map elements, determine a ratio between the two map elements, and/or compute any other quantity (e.g., cosine or vector distance, an absolute value, a product) using an algorithm or mathematical expression. The processor may also be configured to compare the resulting difference, ratio, or computed quantity with a threshold or limit value to determine whether the first multidimensional map element is different from the second multidimensional map element. A match between two quantities or items or data or information may refer to the two quantities or items or data or information being equal to or similar to each other. In some embodiments, the processor may be configured to determine that the first multidimensional map element matches the second multidimensional map element when the first multidimensional map element is equal to the second multidimensional map element. In some embodiments, the processor may be configured to determine that the first multidimensional map element matches the second multidimensional map element when the determined difference, ratio, or computed quantity is less than or equal to a threshold or limit value. When the processor determines that the first multidimensional map element matches the second multidimensional map element, the processor may be configured to regenerate the multidimensional map such that at least some multidimensional map parameters, multidimensional map elements, properties, and/or functionalities of the second multidimensional map may be different from the first multidimensional map. The processor may regenerate the second multidimensional map using, for example, random number generators, as discussed above, such that the second multidimensional map may have different properties, multidimensional map parameters, and/or functionalities as compared to the first multidimensional map even though at least one second multidimensional map element may match with at least one first multidimensional map element.

Some embodiments involve comparing the at least one first multidimensional map parameter to the at least one second multidimensional map parameter, and when the comparison results in a match, regenerating the second multidimensional map. As discussed above, a processor (e.g., 510, 622, 632) may determine a first multidimensional map parameter and may generate a first multidimensional map based on the first multidimensional map parameter. In a similar manner, the processor (e.g., 510, 622, 632) may determine a second multidimensional map parameter and may generate a second multidimensional map based on the second multidimensional map parameter. Comparing and match may be understood as discussed above. A processor may compare a first multidimensional map parameter with a second generated map parameter in many different ways. For example the processor may take a difference between the two map parameters, determine a ratio between the two map parameters, and/or compute any other quantity (e.g., cosine or vector distance, an absolute value, a product) using an algorithm or mathematical expression. The processor may also be configured to compare the resulting difference, ratio, or computed quantity with a threshold or limit value to determine whether the first multidimensional map parameter is different from the second generated map parameter. In some embodiments, the processor may be configured to determine that the first multidimensional map parameter matches the second multidimensional map parameter when the first multidimensional map parameter is equal to the second multidimensional map parameter. In some embodiments the processor may be configured to determine that the first multidimensional map parameter matches the second multidimensional map parameter when the determined difference, ratio, or computed quantity is less than or equal to a threshold or limit value. When the processor determines that the first multidimensional map parameter matches the second multidimensional map parameter, the processor may be configured to regenerate the multidimensional map such that at least some multidimensional map parameters, multidimensional map elements, properties, and/or functionalities of the second multidimensional map may be different from the first multidimensional map. The processor may regenerate the second multidimensional map using, for example, random number generators, as discussed above, such that the second multidimensional map may have at least some different properties, multidimensional map elements, multidimensional map parameters, and/or functionalities as compared to the first multidimensional map even though at least one second multidimensional map parameter may match with at least one first multidimensional map parameter.

Some embodiments involve instituting the second session using the second generated multidimensional map. Instituting may be understood as discussed elsewhere in this disclosure. A processor (e.g., 510, 622, 632) may institute the second session using the second generated multidimensional map in a manner similar to instituting the first session using the first generated multidimensional map as discussed above.

Some embodiments involve storing the first generated multidimensional map and the second generated multidimensional map in a database of multidimensional maps. A database may be understood as discussed elsewhere in this disclosure and may include any type of data structure. Storing may refer to putting, saving, or keeping items (e.g., pieces of data) in a particular or predetermined place for use in the future. Storing data or information in a database may refer to putting, saving, and/or keeping the data and/or information in the database. Storing a generated multidimensional map may refer to saving data or information associated with one or more multidimensional map parameters, one or more multidimensional map elements, and/or the set of data associated with the plurality of pixels, as discussed above, in the database. For example, a processor (e.g., 510, 622, 632) may save the first multidimensional map parameters, the first generated map elements, and/or pixel data and information associated with the first multidimensional map in a data structure (e.g., 532). Similarly, for example, the processor (e.g., 510, 622, 632) may save the second multidimensional map parameters, the second generated map elements, and/or pixel data and information associated with the second multidimensional map in the data structure (e.g., 532). The data and/or information may be stored in the data structure in association with the corresponding first multidimensional map or the second multidimensional map. For example, the data and information may be stored in association with an identifier of the first and/or second multidimensional map using, for example, a lookup table, a linked list, and/or any other method of associating the data and/or information with the corresponding first and/or second multidimensional map.

Some embodiments involve storing the at least one first multidimensional map parameter, the at least one second multidimensional map parameter, the at least one first multidimensional map element, and the at least one second multidimensional map element in a database of multidimensional map parameters and multidimensional map elements. As discussed above, a processor (e.g., 510, 622, 632) may determine one or more first multidimensional map parameters and one or more first multidimensional map elements and may generate a first multidimensional map based on some or all of the first multidimensional map parameters and some or all of the first multidimensional map elements. The processor may also be configured to save the one or more first multidimensional map parameters and one or more first multidimensional map elements in a data structure (e.g., 532). In some embodiments, the processor may additionally or alternatively be configured to save the one or more first multidimensional map parameters and one or more first multidimensional map elements in a memory (e.g., 520). As also discussed above, the processor (e.g., 510, 622, 632) may determine one or more second multidimensional map parameters and one or more second multidimensional map elements and may generate a second multidimensional map based on some or all of the second multidimensional map parameters and some or all of the second multidimensional map elements. The processor may also be configured to save the one or more second multidimensional map parameters and one or more second multidimensional map elements in a data structure (e.g., 532). In some embodiments, the processor may additionally or alternatively be configured to save the one or more second multidimensional map parameters and one or more second multidimensional map elements in a memory (e.g., 520). The processor may be configured to store the one or more first and second multidimensional map parameters and first or second multidimensional map elements in association with an identifier of the associated first and/or second multidimensional map. For example, the data and information may be stored in association with and identifier of the first and/or second multidimensional map using, for example, a lookup table, a linked list, and/or using any other method of associating the multidimensional map parameters and/or multidimensional map elements with the corresponding first and/or second multidimensional map. It is contemplated that the some or all multidimensional maps, multidimensional map parameters, and/or multidimensional map elements may be stored in the same database or in different databases (or other data structures).

Some embodiments involve receiving a third request to initiate a new session in a new environment, wherein receiving the third request includes generating a third multidimensional map. A new environment may be understood to be similar to an environment as discussed above. Receiving third request to initiate a new session in a new environment may be understood to be similar to receiving a first request to initiate a first session in an environment as discussed above. For example, a processor (e.g., 510, 622, 632) may receive a signal generated as a result of a user employing one or more input devices to begin playing a game on an online, digital, and/or a physical gaming machine. In response to the user input, the processor may generate a new multidimensional map (e.g., based on the same or different one or more multidimensional map parameters and on one or more multidimensional map elements). Further, the processor may display the newly generated multidimensional map (e.g., third multidimensional map) on a display associated with the online, digital, and/or a physical gaming machine for a third period of time (e.g., third session) during which the same or a different user may play the game.

Some embodiments involve generating the third multidimensional map based on the database of multidimensional maps. As discussed above, a processor (e.g., 510, 622, 632) may determine at least a first multidimensional map parameter and/or at least a first multidimensional map element, and may generate a first multidimensional map based on the first multidimensional map parameter. In a similar manner, the processor (e.g., 510, 622, 632) may determine at least a second generated map parameter and/or at least a second multidimensional map element, and may generate a second multidimensional map based on the second multidimensional map parameter. In a similar manner, the processor may determine at least a third multidimensional map parameter and/or a third multidimensional map element, and may generate the third multidimensional map using the third multidimensional map parameter and/or the third multidimensional map element. In addition to using the third multidimensional map meter in the third multidimensional map element, the processor may generate the third multidimensional map based on the data and/or information associated with the first multidimensional map and/or the second generated medical map stored in a memory (e.g., 520) and/or, a data structure (e.g., 532). In some embodiments, generating the third multidimensional map based on the database of multidimensional maps includes a comparison of the first generated multidimensional map and the second generated multidimensional map. For example, the processor may compare the data and/or information associated with the first generated multidimensional map and the second multidimensional map stored in the memory (e.g., 520) and/or data structure (e.g., 532). The processor may determine similarities and/or differences between one or more map parameters, one or more map elements, one or more properties, and/or one or more functionalities of the first and second multidimensional maps based on the comparison. Further, the processor may generate the third multidimensional map such that the third multidimensional map may include one or more map parameters, one or more map elements, one or more properties, and/or one or more functionalities that may be different from one or more multidimensional map parameters, multidimensional map elements, properties and/or behaviors of one or both of the first multidimensional map and the second multidimensional map. For example, the processor may generate third multidimensional map that may have a different map size compared to the map sizes of the first generated, a map and/or the second multidimensional map. By way of another example, the processor may generate the third multidimensional map such that a number, identity, and/or a location of one or more awards on the third multidimensional map may be different from the number, identity and/or the location of one or more awards on one or both of the first multidimensional map and the second multidimensional map.

Some embodiments involve generating the third multidimensional map based on the database of multidimensional map parameters and multidimensional map elements. As discussed above, a processor (e.g., 510, 622, 632) may determine at least a first multidimensional map parameter and/or at least a first multidimensional map element, and may generate a first multidimensional map based on the first multidimensional map parameter. In a similar manner, the processor (e.g., 510, 622, 632) may determine at least a second generated map parameter and/or at least a second multidimensional map element, and may generate a second multidimensional map based on the second multidimensional map parameter. In a similar manner of the processor may determine a third multidimensional map parameter and/or third multidimensional map element and may generate the third multidimensional map using the third multidimensional map parameter and/or the third multidimensional map element. In addition to using the third multidimensional map meter in the third multidimensional map element, the processor may generate the third multidimensional map based on the stored one or more multidimensional map parameters and/or multidimensional map elements associated with the first multidimensional map and/or the second multidimensional map. In some embodiments, generating the third multidimensional map based on the database of multidimensional map parameters and multidimensional map elements includes a comparison of either the at least one first multidimensional map parameter and the at least one second multidimensional map parameter or the at least one first multidimensional map element and the at least one second multidimensional map element. For example, the processor may compare one or more of the first multidimensional map parameters associated with first generated multidimensional map and stored in the memory (e.g., 520) and/or data structure (e.g., 532) with the one or more second multidimensional map parameters associated with the second multidimensional map and stored in the memory (e.g., 520) and/or data structure (e.g., 532). The processor may determine similarities and/or differences between one or more first and second multidimensional map parameters. Similarly, the processor may compare one or more of the first multidimensional map elements associated with first generated multidimensional map and stored in the memory (e.g., 520) and/or data structure (e.g., 532) with the one or more second multidimensional map elements associated with the second multidimensional map and stored in the memory (e.g., 520) and/or data structure (e.g., 532). The processor may determine similarities and/or differences between one or more first and second multidimensional map elements. Further, the processor may generate the third multidimensional map such that at least some of the third multidimensional map parameters and/or at least some of the third multidimensional map elements associated with the third multidimensional map may be different from the one or more multidimensional map parameters and/or one or more multidimensional map elements associated with one or both of the first multidimensional map in the second multidimensional map.

Figure 15:
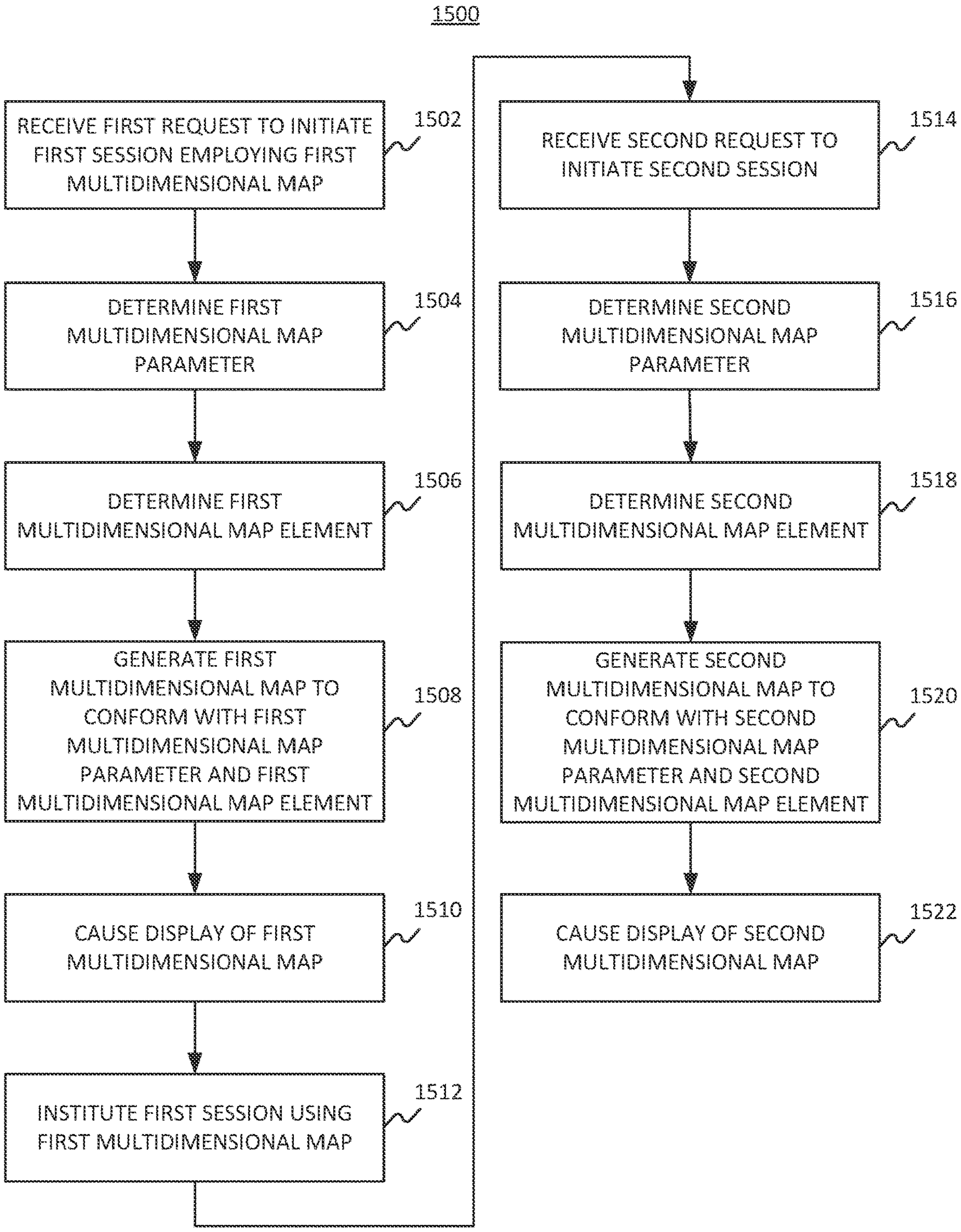
FIG. 15 is a flowchart of an exemplary method for unpredictably generating multidimensional maps, consistent with some disclosed embodiments.

FIG. 15 illustrates a flowchart of example process 1500 for unpredictably generating multidimensional maps, consistent with embodiments of the present disclosure. In some embodiments, process 1500 may be performed by at least one processor (e.g., 510, 622, 632) to perform operations or functions described herein. In some embodiments, some aspects of process 1500 may be implemented as software (e.g., program codes or instructions) that are stored in a memory (e.g., 520) of computing device 500 or a non-transitory computer readable medium 530. In some embodiments, some aspects of process 1500 may be implemented as hardware (e.g., a specific-purpose circuit). In some embodiments, process 1500 may be implemented as a combination of software and hardware.

Referring to FIG. 15, process 1500 may include a step 1502 of receiving a first request to initiate a first session in an environment employing the first multidimensional map. Based on the received first request, process 1500 may include a step 1504 of determining at least one first multidimensional map parameter defining at least one first constraint for the first multidimensional map employed in the first session, wherein the at least one first multidimensional map parameter includes at least one of a map height, a map width, a map length, a map type, a map geography, or a map size. Process 1500 may include a step 1506 of determining, for inclusion in the first multidimensional map for the first session, at least one first multidimensional map element defining at least one feature of the first multidimensional map, wherein the at least one first multidimensional map element includes at least one of a location of at least one award on the multidimensional map, an identity of the at least one award, a number of the at least one award, or a functionality associated with a particular location on the first multidimensional map. Process 1500 may include a step 1508 of generating the first multidimensional map to conform with the determined at least one first multidimensional map parameter and the determined at least one first multidimensional map element. Process 1500 may include a step 1510 of causing a display of the first generated multidimensional map on a computing device. Process 1500 may include a step 1512 of instituting the first session using the first generated multidimensional map. Process 1500 may include a step 1514 of receiving a second request to initiate a second session in the environment following the first session. Based on the received second request, process 1500 may include a step 1516 of determining at least one second multidimensional map parameter defining at least one second constraint for the second multidimensional map in the second session, wherein the at least one second multidimensional map parameter includes the map height, the map width, the map length, the map type, the map geography, or the map size. Process 1500 may include a step 1518 of determining, for inclusion in the second multidimensional map for the second session, at least one second map element defining at least one feature of the second multidimensional map, wherein the at least one second multidimensional map element for the second session includes at least one of the location of at least one award on the multidimensional map, the identity of the at least one award, the number of the at least one award, or the functionality associated with a particular location on the multidimensional map. Process 1500 may include a step 1520 of generating the second multidimensional map to conform with the determined at least one second multidimensional map parameter and the at least one second multidimensional map element. Process 1500 may include a step 1522 of causing a display of the second generated multidimensional map on the computing device for the second session, wherein the second generated multidimension map differs from the first generated multidimensional map in a non-predictable manner.

Some embodiments involve a system for unpredictably generating multidimensional maps, consistent with embodiments of the present disclosure. The system includes at least one processor configured to: receive a first request to initiate a first session in an environment employing the first multidimensional map; based on the received first request, determine at least one first multidimensional map parameter defining at least one first constraint for the first multidimensional map employed in the first session, wherein the at least one first multidimensional map parameter includes at least one of a map height, a map width, a map length, a map type, a map geography, or a map size; determine, for inclusion in the first multidimensional map for the first session, at least one first multidimensional map element defining at least one feature of the first multidimensional map, wherein the at least one first multidimensional map element includes at least one of a location of at least one award on the multidimensional map, an identity of the at least one award, a number of the at least one award, or a functionality associated with a particular location on the first multidimensional map; generate the first multidimensional map to conform with the determined at least one first multidimensional map parameter and the determined at least one first multidimensional map element; cause a display of the first generated multidimensional map on a computing device; institute the first session using the first generated multidimensional map; following the first session, receive a second request to initiate a second session in the environment; based on the received second request, determine at least one second multidimensional map parameter defining at least one second constraint for the second multidimensional map in the second session, wherein the at least one second multidimensional map parameter includes the map height, the map width, the map length, the map type, the map geography, or the map size; determine, for inclusion in the second multidimensional map for the second session, at least one second map element defining at least one feature of the second multidimensional map, wherein the at least one second multidimensional map element for the second session includes at least one of the location of at least one award on the multidimensional map, the identity of the at least one award, the number of the at least one award, or the functionality associated with a particular location on the multidimensional map; generate the second multidimensional map to conform with the determined at least one second multidimensional map parameter and the at least one second multidimensional map element; and cause a display of the second generated multidimensional map on the computing device for the second session, wherein the second generated multidimension map differs from the first generated multidimensional map in a non-predictable manner.

By way of a non-limiting example, FIGS. 5 and 6 taken together illustrate a system 600 including at least one processor (e.g., 510, 622, 632). The processor may receive a first request to initiate a first session in an environment employing the first multidimensional map (e.g., via button 1302 of FIG. 15). Based on the received first request, the processor may determine at least one first multidimensional map parameter defining at least one first constraint for the first multidimensional map employed in the first session, generate the first multidimensional map, cause a display of the first multidimensional map on a computing device, and institute the first session using the first multidimensional map (see e.g., FIG. 14A). Following the first session, the processor may receive a second request to initiate a second session in the environment (e.g., via button 1302 of FIG. 13). Based on the received second request, the processor may determine at least one second multidimensional map parameter defining at least one first constraint for the second multidimensional map employed in the second session, generate the second multidimensional map, cause a display of the second multidimensional map on a computing device (see e.g., FIG. 14B) The processor may use one or more randomization techniques to ensure that, to a user, the features and functionalities of the second multidimensional map may not be determinable before generation of the second multidimensional map, thereby making generation of the second multidimensional map unpredictable.

Some embodiments involve a non-transitory computer readable medium containing instructions that when executed by at least one processor cause the at least one processor to perform operations for providing non-predictable award outcomes. A non-transitory computer-readable medium containing instructions, at least one processor, and causing the at least one processor to perform operations may be understood as described elsewhere in this disclosure. An award and an outcome may be understood as described elsewhere in this disclosure. An award outcome may refer to an end result or consequence that may dictate an amount of a benefit (or award) (e.g., tokens, coins, points, or credits, or money) that a user may receive based on the outcome of gameplay. Non-predictable may refer to different award outcomes having no perceived specific pattern, purpose, or objective relative to a previous award outcome and/or no discernable relationship with a previous award outcome. Successive award outcomes may be non-predictable if a perception is presented to a user that successively generated award outcomes are random (even if there may be some non-random underlying mechanism, the successively generated award outcomes may be deemed non-predictable within the meaning of this disclosure). Providing non-predictable award outcomes may refer to creating, producing, or bringing into existence successive non-predictable award outcomes. The nonpredictable award outcomes may be created produced or generated by, for example, a processor that may use one or more randomization techniques such as random number generators to generate or produce the non-predictable award outcomes. In some embodiments, the non-predictable outcomes may be displayed to a user. In some embodiments, the non-predictable outcomes may be stored in a memory (e.g., 520) and/or a database (e.g., 532).

Some embodiments involve presenting a first phase display including a graphical user interface for activating an intermediate outcome generator. Presenting a display may involves exhibiting (e.g., information) visually in a manner that allows a user to view the information. For example, this may occur by activating one or more pixels of a display of a computing device, activating one or more LEDs, LCDs of the display, and/or activating one or more lasers or other light sources to project information (e.g., on a wall or a screen), and/or performing any other action that allows for information to be visually perceived by a user. Depending on implementation, in some embodiments, presenting the display may also include one or more of selecting a display medium (e.g., a display screen, a wall) for displaying the information, determining a layout, size, and/or style for displaying the information, selecting a region for displaying the information (e.g., in association with a software application, window, frame, or functionality) on a display device associated with a computing device being used by a user to play a game. A graphical user interface may refer to an arrangement or visual representation that allows a user to interact with a computing device by manipulation of one or more icons, symbols, graphical images, widgets, and/or text displayed on a display of the computing device. The user may manipulate the one or more icons, symbols, graphical images, widgets, and/or text using one or more input devices as discussed elsewhere in this disclosure. Phase may refer to an aspect, a portion, a segment, or a part of something. A first phase display may refer to a portion, segment, or a part of a plurality of displays that may be presented to the user. For example, a first phase display may refer to data or information displayed on the display of a computing device during an initial or first period of time during each instance of gameplay. In some embodiments, the first phase display may include a graphical user interface as discussed above.

Intermediate refers to something that occurs between extremes (e.g., sometime between the beginning or end of a process or stage). Thus, an intermediate outcome may include something that is presented or provided prior to a final outcome (e.g., an intermediate outcome occurs between initiation of an instance of an action or gameplay and completion of the action or instance of gameplay) which may result in a subsequent outcome (e.g., movement of a character on a map; and/or an award or no award). Thus, in some embodiments, an intermediate outcome does not directly complete an action or process Instead, an intermediate outcome may require additional actions to be taken or additional steps to occur before an outcome is revealed to a user. An intermediate outcome generator may include a physical device, a digital representation of a physical device, a specially programmed processor, and/or computer-executable code that when executed may create, produce, or generate an intermediate outcome. Activating may refer to cause something to happen or make something start working. Activating an intermediate outcome generator may refer to causing or making the intermediate outcome generator create, produce, or generate an intermediate outcome. The graphical user interface displayed as a first phase display may include one or more buttons, dials, switches, drop-down menus, checkboxes, and/or other widgets that when manipulated by user may generate a signal. A processor (e.g., 510, 622, 632 in FIGS. 3 and 6) may receive the signal and in response may cause the intermediate outcome generator to produce an intermediate outcome. For example, the processor (e.g., 510, 622, 632) may send instructions or commands to a physical intermediate outcome generator to produce an intermediate outcome or may cause a specially programmed processor to execute instructions to produce an intermediate outcome. Alternatively, the processor may execute computer-executable code associated with the intermediate outcome generator to create or produce and intermediate outcome.

By way of a non-limiting example, FIG. 2 illustrates a first phase display 200 including a graphical user interface 201. Graphical user interface 201 may include a widget 230 in the form of a button labeled "SPIN Hold for Spin." The user may be able to manipulate button 230 by clicking on, selecting, or pressing button 230 using one or more input devices as discussed elsewhere in the disclosure. As also illustrated in FIG. 2, graphical user interface 201 may include a representation of an intermediate outcome generator 245 that may include for example representations of one or more reels 240, 242, 244 Manipulation of button 230 may generate a signal that may be received by a processor (e.g., 510, 622, 632). In response, the processor may cause activation of intermediate outcome generator 245 by causing the reels 240, 242, 244 to spin. When the reels stop spinning, after a predetermined period of time, or because of additional interaction with graphical user interface 201 by the user, the faces of the reels 240, 242, 244 may display an intermediate outcome. In this case, the intermediate outcome is an upward movement (expressed by the upward arrow on reel 246), followed by a right movement and a left movement, respectively expressed by corresponding arrows on reels 248 and 250. This outcome is considered "intermediate" because the three movements do not occur on the reels themselves. Rather, they need to be applied to a character on a board which will subsequently be moved according to the intermediate outcome.

By way of another non-limiting example, as illustrated in FIG. 4C, a first phase display 400 may include a graphical user interface 401 that may also include a representation of an intermediate outcome generator 455. Intermediate outcome generator 455 may include a plurality of dice, for example, dice 460, 462, and 464. Further as illustrated in FIG. 4C, graphical user interface 401 may include the widget 230 as discussed above. When the user manipulates the widget 230, the processor (e.g., 510, 622, 632) may receive a signal and in response may cause activation of intermediate outcome generator 455. Activation of intermediate outcome generator 455 may cause one or more of the dice 460, 462, 464 to be shuffled or rolled. When the shuffling or rolling of the dice 460, 462, 464 comes to a stop, the faces of the dice 460, 462, 464 may include text or symbols representing an intermediate outcome. While the intermediate outcome in both of the foregoing examples includes directionality indicators, it is contemplated, depending on design choice, that other types of indicators may be employed, so long as they are "intermediate" in nature, as described earlier.

In some embodiments, the graphical user interface is a virtual slot machine. A virtual slot machine may be a digital representation of a physical slot machine (having physical reels). Such a slot machine may be configured for presentation on a video and/or other digital display, to present or simulate reels that spin and then stop revealing a "payline" (e.g., an outcome defined by representations corresponding to the number of reels). The virtual slot machine may include 3, 4, or 5 reels, or any other number of reels depending on design choice. A graphical user interface (discussed above) may display one or more images representative of the display of physical slot machine (including displays of the one or more reels). Further the graphical user interface may include one or more icons, buttons, or widgets that when manipulated by user may represent an action of pulling a lever or pressing a switch. Manipulation of the one or more icons, buttons, or widgets may also cause an animated display showing spinning of the one or more reels similar to the spinning of the reels in a physical slot machine. When the digital representations of the reels stop spinning (e.g., when the animated display comes to an end), the faces of the virtual representations of the reels may display one or more icons, symbols, text, and/or other graphical images that may indicate an outcome associated with the user's action such as pulling a lever or pressing a switch.

In some embodiments, activating the intermediate outcome generator includes a user input. An input may refer to an action taken by user via one or more of the input devices discussed above to provide data or information to a computing device. As discussed above, a graphical user interface may be displayed on a display of a computing device. The graphical user interface may include a graphical representation of an intermediate outcome generator and further may include representations of one or more buttons, dials, levers, switches, and/or widgets that may be manipulated by user to provide data or information to the computing device. For example, a user may activate the intermediate outcome generator displayed on the display of the computing device by manipulating (e.g., providing a user input) one or more buttons, dials, levers, switches, and/or widgets displayed on the graphical user interface. By way of a non-limiting example, FIG. 2 illustrates a first phase display 200 including a graphical user interface 201, which also includes a virtual representation of intermediate outcome generator 245. A user may provide a user input by manipulating a button 230, which may generate a signal received by a processor (e.g., 510, 622, 632). In response, the processor may cause activation of intermediate outcome generator 245 (as discussed above) by causing the reels 240, 242, 244 to spin. By way of another non-limiting example, FIG. 4C illustrates a first phase display 400 including a graphical user interface 401, which also includes a virtual representation of intermediate outcome generator 455. A user may provide a user input by manipulating a button 230, which may generate a signal received by a processor (e.g., 510, 622, 632). In response, the processor may cause activation of intermediate outcome generator 455 (as discussed above) by causing dice 462, 464, and/or 464 to be shuffled or rolled.

Some embodiments involve receiving a request, via the graphical user interface, to provide an intermediate outcome, wherein the intermediate outcome includes a plurality of variables from which an award is non-predictable. Receiving a request, via the graphical user interface to provide an outcome may refer to receiving, by a processor, a signal generated as a result of a user employing one or more input devices to manipulate one or more buttons, dials, levers, switches, and/or widgets on the graphical user interface. Further, as discussed above, in response to receiving the signal, the processor may cause displays of one or more objects (e.g., reels, dice) on the graphical rendering of an intermediate outcome generator to move (e.g., reels may spin, dice may be shuffled). Variables may refer to data, information, quantity, or a graphical representation that may be subject to changes or variations. A plurality of variables provided by an intermediate outcome generator may refer to one or more icons, symbols, graphical images, and/or textual material that may be subject to change or variation as a result of activation of the intermediate outcome generator. For example, when an intermediate outcome generator is activated, the graphical representations of the icons, symbols, graphical images, nor text on the intermediate outcome generator may be caused to change or move. When the movement of the icons, symbols, graphical images, or text on the intermediate outcome generator ceases, one or more icons, symbols, graphical images, or text may be displayed on the intermediate outcome indicator. The plurality of variables generated by the intermediate outcome generator may include the one or more icons, symbols, graphical images, or text displayed on the intermediate outcome indicator. The combination of icons, symbols, graphical images, or text displayed on the intermediate outcome generator may represent an intermediate outcome, as discussed above.

In some embodiments, the intermediate outcome generator includes a random number generator. A random number generator may be understood as discussed elsewhere in this disclosure. For example, the intermediate outcome generator may include a random number generator such that the plurality of variable generated by the intermediate outcome generator may be non-predictable or perceived as random. For example, the combination of icons, symbols, graphical images, or text displayed on the intermediate outcome generator may be unpredictable. The processor (e.g., 510, 622, 632) may use one or more random number generators or other randomization techniques to generate a random or pseudo-random combination of the icons, symbols, images, and/or text that may be displayed on the intermediate outcome generator each time the intermediate outcome generator is activated. As discussed above, the combination of icons, symbols, graphical images, or text displayed on the intermediate outcome generator may be deemed to be unpredictably generated within the meaning of this disclosure if a perception is presented to a user that successively generated combinations are random (even if there may be some non-random underlying mechanism).

In some embodiments, receiving the request includes at least one of an assurance and a user input. An assurance and a user input may be understood as discussed elsewhere in this disclosure. As discussed above, receiving a request, via the graphical user interface to provide an outcome may refer to receiving, by a processor, a signal generated as a result of a user employing one or more input devices to manipulate one or more buttons, dials, levers, switches, and/or widgets on the graphical user interface. As also discussed above, a user may activate the intermediate outcome generator displayed on the display of the computing device by providing an input. Providing the input may include manipulating (e.g., providing a user input) one or more buttons, dials, levers, switches, and/or widgets displayed on the graphical user interface. Thus, receiving the request to provide an intermediate outcome may include a user input.

By way of a non-limiting example, FIG. 2 illustrates a first phase display 200 including a graphical user interface 201, which also includes a virtual representation of intermediate outcome generator 245. A user may provide a user input by manipulating a button 230, which may generate a signal received by a processor (e.g., 510, 622, 632). In response the processor may cause activation of intermediate outcome generator 245 by causing the reels 240, 242, 244 to spin. When the reels 240, 242, 244 stop spinning, the faces of reels 240, 242, 244 may disclose one or more icons, symbols, graphical images, and/or text that may represent an intermediate outcome. By way of another non-limiting example, FIG. 4C illustrates a first phase display 400 including a graphical user interface 401, which also includes a virtual representation of intermediate outcome generator 455. A user may provide a user input by manipulating a button 230, which may generate a signal received by a processor (e.g., 510, 622, 632). In response, the processor may cause activation of intermediate outcome generator 455 by causing dice 462, 464, and/or 466 to be shuffled or rolled. When the dice 462, 464, and/or 466 stop shuffling and/or rolling, the faces of dice 462, 464, and/or 466 may disclose one or more icons, symbols, graphical images, and/or text that may represent an intermediate outcome.

In some embodiments, receiving a request, via the graphical user interface to provide an outcome may additionally or alternatively include receiving signal representative of an assurance by the processor. Receiving an assurance may be understood as discussed elsewhere in this disclosure. For example, a user may select an assurance on a display by selecting an assurance amount or quantity. After selecting the assurance, the user may manipulate one or more buttons, dials, switches, and/or widgets to request for activating an intermediate outcome generator, which in turn may generate one or more signals. A processor (e.g., 510, 622, 632) may receive the one or more signals that may include a signal or signals indicative of the selected assurance. Thus, the request to generate an intermediate outcome may include an input representative of an assurance or wager provided by the user. By way of example, as illustrated in FIG. 2, one or more buttons or widgets 212, 214 may be displayed to allow a player to increase or decrease an amount of a wager. Thus, for example, a button or widget 214 with a "+" sign may allow a player to increase the amount of the wager, and a button or widget 212 with a "−" sign may allow the player to decrease the amount of the wager. As also illustrated in FIG. 2, a button or widget 216 labeled "MAX BET" may allow the player to wager all of the tokens, coins, points, credits, or other monetary equivalent that the player has currently applied in the game. Activation of one or more of widgets 212, 214, 216 may generate a signal that may be transmitted to a processor (e.g., 510, 622, 632) that may receive the signal and interpret the signal as being representative of a value (a monetary value) of the assurance or wager placed by the user. In some embodiments, the one or more signals representative of an assurance may be transmitted to the processor together with one or more signals generated when a user manipulates button 230 to activate the intermediate outcome generator 245.

Some embodiments involve presenting a second phase display associated with an engine for implementing the intermediate outcome. Presenting a display may be understood as discussed elsewhere in this disclosure. A second phase display may refer to data or information displayed on the display of a computing device during a second or subsequent portion of an instance of gameplay (e.g., after the initial or first portion or first phase display). Implementing may refer to the act of carrying out or giving practical effect. Implementing the intermediate outcome may refer to carrying out or performing actions related to the intermediate outcome. An engine may refer to a specially programmed processor or circuitry, and/or computer-executable code that when executed by a processor may perform certain actions. An engine for implementing the intermediate outcome may refer a specially programmed processor or circuitry that may carry out or perform actions related to the intermediate outcome. In some embodiments, the engine for implementing the intermediate outcome may refer to computer-executable code that when executed by a processor (e.g., 510, 622, 632) may perform actions related to the intermediate outcome. For example, the processor (e.g., 510, 622, 632) may be configured to perform certain actions based on the one or more icons, symbols, graphical images, and/or text displayed on the intermediate outcome indicator. The actions performed by the processor may be presented on the display of a computing device to enable a user to visually perceive the actions or results of the actions.

In some embodiments, the second phase display includes a multidimensional map. A multidimensional map may be understood as discussed elsewhere in this disclosure. As discussed, a processor (e.g., 510, 622, 632) may generate and display a multidimensional map in the graphical user interface during the second phase of the display after the intermediate outcome indicator has been activated. It is also contemplated that in some embodiments, the processor may be configured to display both the intermediate outcome indicator and the multidimensional map on the display of a computing device even before the intermediate outcome indicator is activated by an action of the user. As discussed elsewhere in this disclosure, the multidimensional map may be divided into a number of regions that may be equally or unequally sized. In some embodiments, the multidimensional map may be divided into a plurality of rectangular or square equally sized regions by a plurality of rows disposed along the x-axis and a plurality of columns disposed along the y-axis. The intersection of the plurality of rows and columns may define a plurality of spaces or tiles. The plurality of spaces or tiles may be displayed to the user on a display of a computing device. One or more characters may be caused to move on a multidimensional map, as described in succeeding paragraphs. A character may include any icon, representation, token, figurine, game piece, or digital representation.

In some embodiments, the multidimensional map is constrained by a multidimensional map parameter and a multidimensional map element. A multidimensional map parameter and a multidimensional map element may be understood as discussed elsewhere in the disclosure. The processor (e.g., 510, 622, 632) may be configured to generate the multidimensional map for display on a display of the computing device based on the restrictions/limits specified in the one or more multidimensional map parameters. Further, the processor (e.g., 510, 622, 632) may be configured to generate the multidimensional map for display on a display of the computing device based on the restrictions/limits specified by the one or more multidimensional map elements. By way of non-limiting examples, the processor may be configured to present a second phase display in the form of a multidimensional map 1400 (FIG. 14A), 1450 (FIG. 14B), 1460 (FIG. 14C).

In some embodiments, the intermediate outcome is a random directionality outcome. A random directionality outcome may be understood as discussed elsewhere in this disclosure. In some embodiments, the plurality of variables generated by the intermediate outcome are directionality indicators. In some embodiments, each of the directionality indicators represent a cardinal direction. Directionality indicators and cardinal direction may be understood as discussed elsewhere in this disclosure. In some embodiments, a combination of the directionality indicators indicates both direction and distance. As discussed elsewhere in this disclosure the directionality indicators may represent a combination of direction and distance.

In some embodiments, each of the directionality indicators is presented on a differing icon. In some embodiments, each of the directionality indicators is presented on a same icon. In some embodiments, the intermediate outcome in the first phase is a function of a character location on a multidimensional map in the second phase.

In some embodiments, the intermediate outcome generated by the intermediate outcome generator displayed on the first phase display may depend on the location of the character on the multidimensional map displayed in the second phase display. For example, one or more weights may be applied to the one or more of the plurality of variables included in the intermediate outcome generator. The weight applied to any of the plurality of variables may be applied based on a rule or set of rules. As discussed above, in some embodiments, the plurality of variables are directionality indicators. Examples of weighting rules may include rules that may weight certain directionality indicators more heavily if a character's current location is close or far (e.g., within a predetermined distance) from: a boundary, a hazard, an award, a preferred pathway toward a goal, a goal, or any other feature associated with a map. As another example, a weighting rule may be associated with an elapsed time of game play, a number of game sessions played, or any other game-related feature, event, or set of events. For example, if the elapsed time of gameplay is greater than a threshold time, directionality indicators that may cause the character to move towards the end goal of the game (e.g., final row of the multidimensional map) may be weighted more than directionality indicators that may cause the character to move away from the final row of the multidimensional map. As another example, when the number of game sessions played by a particular user is greater than a threshold, directionality indicators that may cause the character to move towards the final row of the multidimensional map may be weighted more than other directionality indicators to keep the user engaged in interested in playing the game. It is to be understood that the rules discussed above are exemplary and that the one or more variables of the intermediate outcome generator may be weighted in many different ways based on the character's current location.

Some embodiments involve feeding the plurality of variables of the intermediate outcome into the engine to generate a subsequent outcome. The plurality of variables, the intermediate outcome, the engine, and an outcome may be understood as discussed elsewhere in this disclosure. Subsequent may refer to following in time or order, or coming or being after something else. A subsequent outcome may refer to an outcome that may follow or come after a prior outcome such as an intermediate outcome. Feeding may refer to providing, transferring, transmitting, entering, or inputting. Feeding the plurality of variables into the engine may refer to providing, transferring, transmitting, entering or inputting the plurality of variables into the engine configured to generate the subsequent outcome. For example, one or more of the plurality of variables generated by the intermediate outcome generator may be provided as inputs to the engine configured to generate the subsequent outcome. As discussed above the engine may refer to a specially programmed processor or circuitry, and/or computer-executable code that when executed may perform certain actions. For example, the specially programmed processor circuitry may perform actions, and/or a processor (e.g., 510, 622, 632) may execute the computer-executable code associated with the engine to generate a subsequent outcome when the plurality of variables included in the intermediate outcome are provided as an input. With reference to the example of FIG. 2, the outcome of intermediate outcome generator 240 may be fed (e.g., automatically) into code for moving character 204 on map 100 (which may also be referred to as a virtual gameboard) or on portion 200 (illustrated in FIG. 2) of map 100.

In some embodiments, the subsequent outcome is the award. An award may be understood as discussed elsewhere in this disclosure. In some embodiments, the engine may receive one or more of the plurality of variables of the intermediate outcome generator as input and may generate a subsequent outcome, which may be an award. For example, a processor (e.g., 510, 622, 632) may receive the one or more variables included in the intermediate outcome as an input, and may execute computer-executable code to output the value of an award (e.g., number of tokens or credits, number of free spins, or number of rum bottles).

Figure 16:
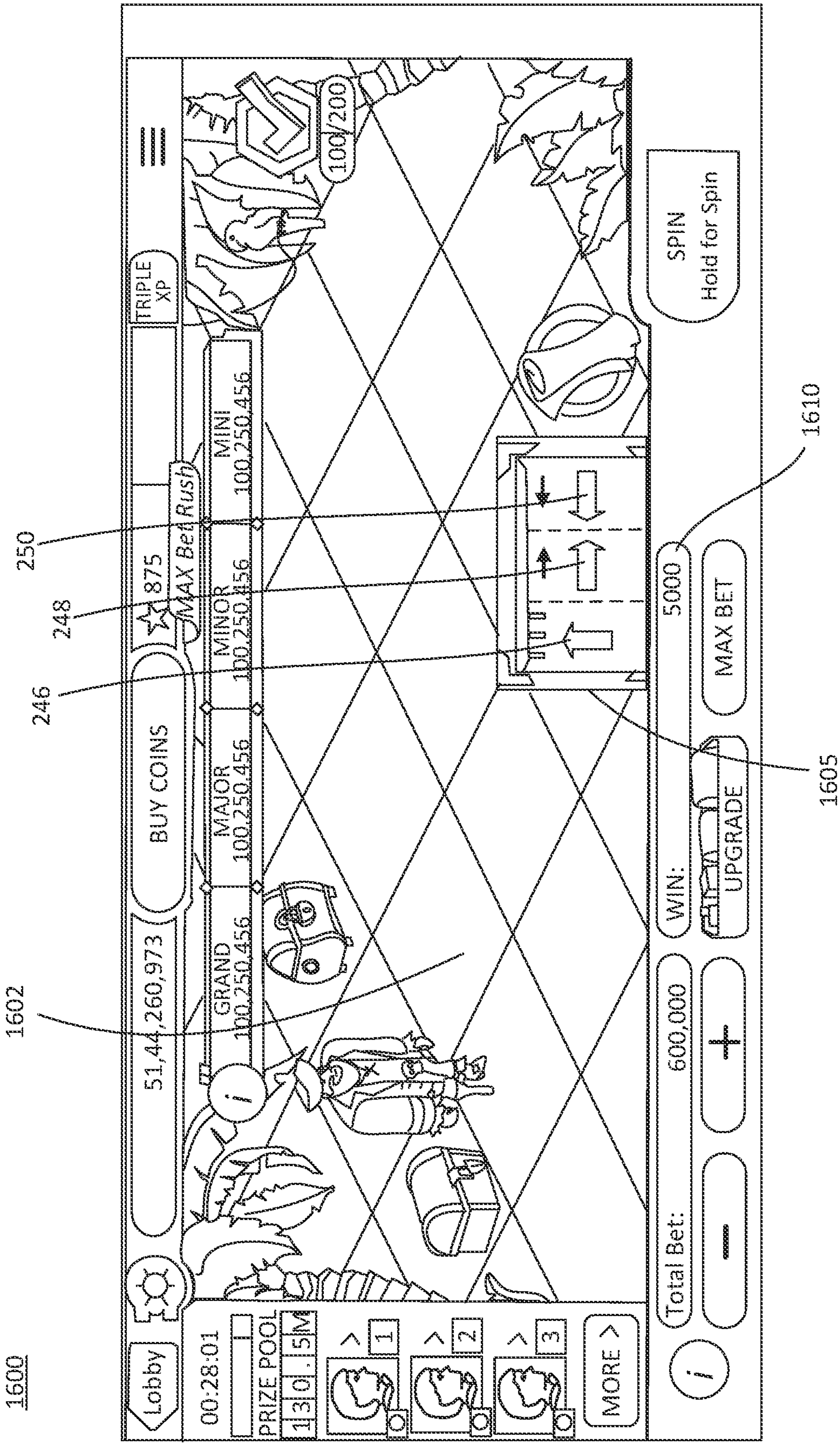
FIG. 16 illustrates an exemplary graphical user interface showing a multidimensional map, consistent with some disclosed embodiments.

By way of a non-limiting example, FIG. 16 illustrates a graphical user interface 1601 showing a multidimensional map 1602. As also illustrated in FIG. 16, intermediate outcome generator 1605 may display an intermediate outcome including a plurality of variables 246, 248, 250. The processor (e.g., 510, 622, 632) may receive the plurality of variables as an input and may generate an outcome in the form of an award 1610, which may be displayed on multidimensional map 1602.

Some embodiments involve presenting the subsequent outcome in the second phase display. Presenting an outcome may be understood as discussed elsewhere in this disclosure. Presenting the subsequent outcome in the second phase display may occur in a manner similar to presenting the intermediate outcome in the first phase display. For example, presenting the subsequent outcome in the second phase display may include displaying the subsequent outcome visually in a manner that allows a user to view the information, e.g., by activating one or more pixels of a display of a computing device, activating one or more LEDs, LCDs of the display, and/or activating one or more lasers or other light sources to project information (e.g., on a wall or a screen), and/or performing any other action that allows for information (e.g., subsequent outcome) to be visually perceived by a user. For example, as discussed above, when the subsequent outcome is an award, the award (e.g., 1610) may be displayed on the second phase display (e.g., multidimensional map 1602). In some embodiments, during the feeding, the directionality indicators are applied to the multidimensional map to cause a character to move on the multidimensional map in accordance with the directionality indicators. As discussed above, in some embodiments, the plurality of variables generated by the intermediate outcome generator may be directionality indicators. Applying may refer to putting into practice or to a particular use. Providing the directionality indicators as an input to the engine configured to generate a subsequent outcome may produce an output associated with movement of the character from a first location to a second location on the multidimensional map. As discussed elsewhere in this disclosure a processor (e.g. 510, 622, 632) put the directionality indicators (e.g., plurality of variable) into practice by translating the combination of directionality indicators to determine a target or destination location relative to a current location of the character on the multidimensional map. As also discussed elsewhere in this disclosure, the processor may sequentially update the one or more pixels of the display device to display movement of the character from a current location of the character to the target or destination location. Alternatively, the processor may render the character in a relatively constant location while updating a location of the map to visually show movement of the character from a current location to a destination location on the multidimensional map according to the directions and distances specified by the plurality of directionality indicators. With reference to the non-limiting example of FIG. 10, rendering the display of the multidimensional map 100 may involve repeatedly and sequentially updating the one or more pixels on the display 540 of computational device 500 to show how character 204 moves from its current location (e.g., tile 1010) to the new character location (e.g., target or destination location, tile 1040) based on a combination of directionality indicators 1050, 1052, 1054. Thus, for example, the processor (e.g., 510, 622, 632) may update one or more pixels of display 540 to show character 204 being sequentially located at tiles 1010, 1020, 1030, and 1040 to show movement of character 204 from its current location (e.g., tile 1010) to the new character location (e.g., 1040).

Some embodiments involve revealing, in the second phase display, an award corresponding to the subsequent outcome. Revealing may refer to making something visible or exposing something that was previously hidden. In some embodiments, the subsequent outcome is used to reveal an award. In some embodiments, the multidimensional map includes at least one space associated with the award, and wherein the award is revealed when the character lands on the at least one space. As discussed above, the subsequent outcome generated by the engine may include movement of a character from a current location to a destination location. That destination location may itself be associated with an award so that when a character arrives at the location, the player (user) receives the reward associated with the location. For example, as also discussed elsewhere in this disclosure, the multidimensional map may include a plurality of rectangular or square equally sized regions (e.g., tiles). One or more awards (e.g., coins, chests, wheels, rum bottles) may be positioned on one or more of the spaces of the multidimensional map. In some embodiments, the one or more awards may be displayed on the multidimensional map. In some embodiments, some or all of the awards may be initially hidden (e.g., not displayed) on the multidimensional map. When a character reaches the destination location, an award located in the space corresponding to the destination location may be revealed (e.g., made visible or exposed). By way of a non-limiting example, FIG. 9 illustrates multidimensional map 900 having a plurality of spaces or tiles 910. As also illustrated in FIG. 9, at least some of the spaces (e.g., 982) may include an award (e.g., chest 906). Chest 906 may not be displayed on the graphical user interface when multidimensional map 900 is displayed to the user. When character 204 moves to space 982 from another space on multidimensional map 900, however, the processor (e.g., 510, 622, 632) may be configured to display chest 906 in space 982 on the graphical user interface. Thus, the subsequent outcome, namely movement of the character from its current location to the destination location (e.g., space 962) may cause the award (e.g., chest 906) to be revealed (e.g., exposed or made visible) when character 204 reaches space 962.

Figure 17:
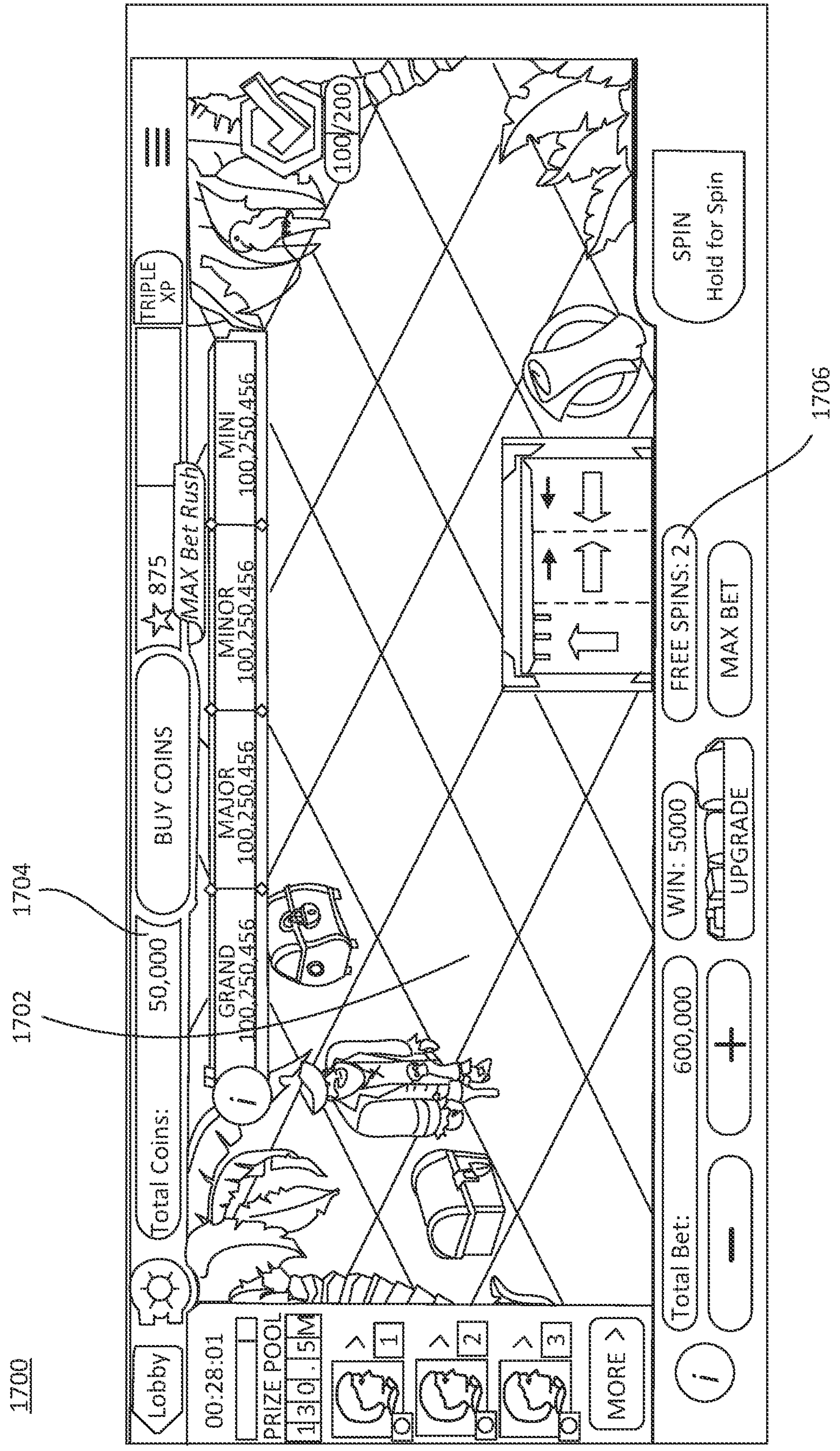
FIG. 17 illustrates another exemplary graphical user interface showing a multidimensional map, consistent with some disclosed embodiments.

Some embodiments involve presenting the award corresponding to the subsequent outcome. Presenting may refer to giving, bestowing, providing, or making available. Presenting the award may include, for example, giving or making available the award to the user. As discussed above, a subsequent outcome generated by a processor (e.g., 510, 622, 632) may include or reveal an award (e.g., chests, coins, spin wheels, rum bottles). Presenting the award may include making the one or more awards available for use by the user (e.g., in an account, wallet, or other record associated with the user). For example, an award of coins may be presented to the user by updating a number, value, or amount of coins available to the user during a game or in the user's account. As another example, an award of a spin wheel may be presented to the user by updating a number of free spins (e.g., instances of gameplay without the need to place a wager) available to the user. By way of example, FIG. 17 illustrates a graphical user interface 1700 illustrating a multidimensional map 1702. As illustrated in FIG. 17, graphical user interface may include widget 1704 displaying a total number of coins (e.g., 50,000) available to the user and a widget 1706 displaying the total number of free spins available to the user. Referring to FIG. 17, for example, when the award includes coins (e.g., 500 coins) the processor (e.g., 510, 622, 632) may update widget 1704 by adding the number of coins associated with the award such that widget 1704 may display 50,500 coins being available to the user. As another example, when the award includes free spins (e.g., 2 spins), the processor may update widget 1720 to display the number 2, indicating that the user has 2 free spins available.

Figure 18:
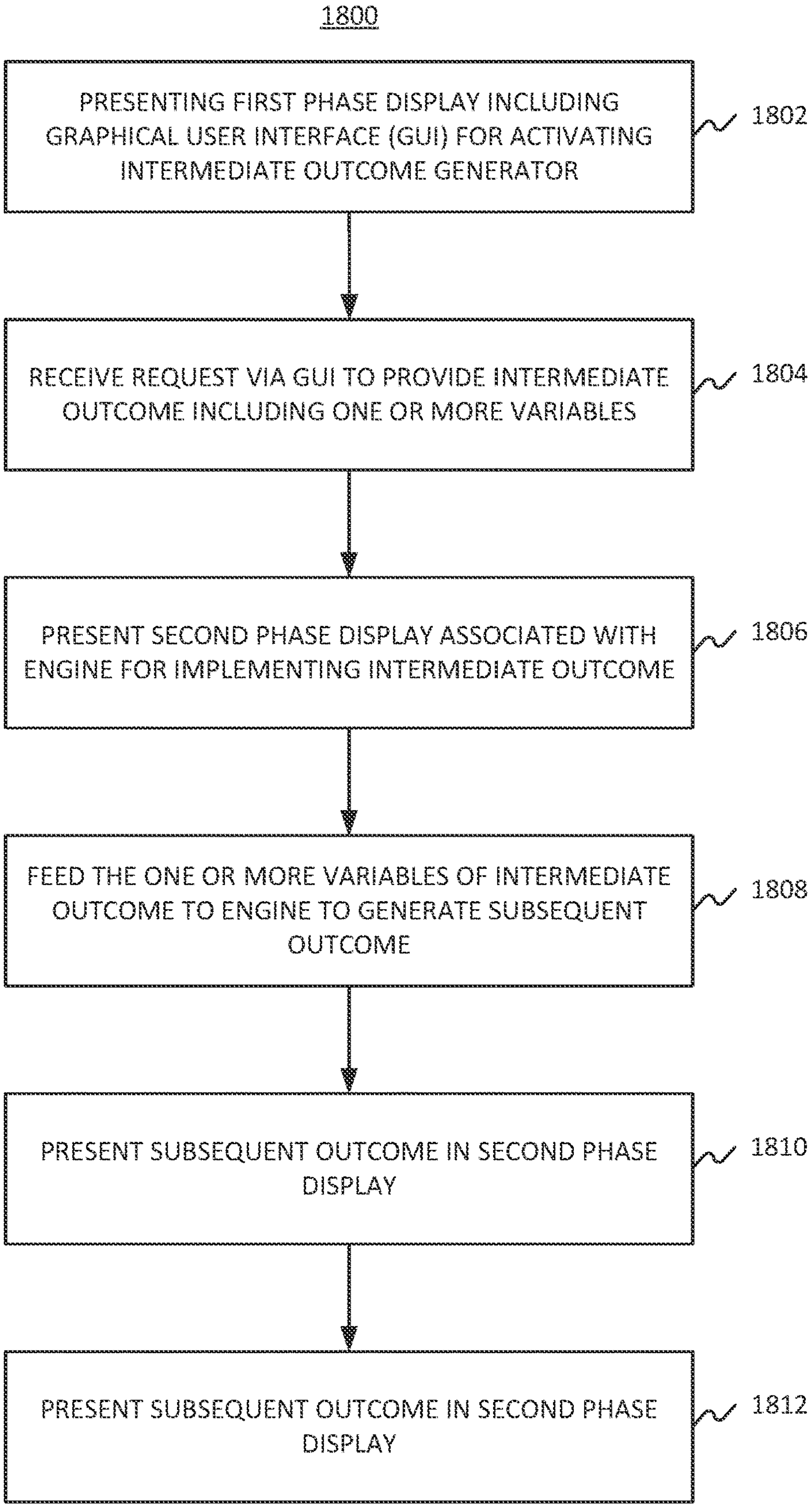
FIG. 18 is a flowchart of an exemplary method for providing non-predictable award outcomes, consistent with some disclosed embodiments.

FIG. 18 illustrates a flowchart of example process 1800 for providing non-predictable award outcomes, consistent with embodiments of the present disclosure. In some embodiments, process 1800 may be performed by at least one processor (e.g., 510, 622, 632 in FIGS. 5 and 6) to perform operations or functions described herein. In some embodiments, some aspects of process 1800 may be implemented as software (e.g., program codes or instructions) that are stored in a memory (e.g., 520) of computing device 500 or a non-transitory computer readable medium 530. In some embodiments, some aspects of process 1800 may be implemented as hardware (e.g., a specific-purpose circuit). In some embodiments, process 1800 may be implemented as a combination of software and hardware.

Referring to FIG. 18, process 1800 may include a step 1802 of presenting a first phase display including a graphical user interface for activating an intermediate outcome generator. Process 1800 may include a step 1804 of receiving a request, via the graphical user interface, to provide an intermediate outcome, wherein the intermediate outcome includes a plurality of variables from which an award is non-predictable. Process 1800 may include a step 1806 of presenting a second phase display associated with an engine for implementing the intermediate outcome. Process 1800 may include a step 1808 of feeding the plurality of variables of the intermediate outcome into the engine to generate a subsequent outcome. Process 1800 may include a step 1810 of presenting the subsequent outcome in the second phase display. Process 1800 may also include a step 1812 of revealing, in the second phase display, an award corresponding to the subsequent outcome.

Some embodiments involve a system for unpredictably generating multidimensional maps, consistent with embodiments of the present disclosure. The system includes at least one processor configured to: present a first phase display including a graphical user interface for activating an intermediate outcome generator; receive a request, via the graphical user interface, to provide an intermediate outcome, wherein the intermediate outcome includes a plurality of variables from which an award is non-predictable; present a second phase display associated with an engine for implementing the intermediate outcome; feed the plurality of variables of the intermediate outcome into the engine to generate a subsequent outcome; present the subsequent outcome in the second phase display; and reveal, in the second phase display, an award corresponding to the subsequent outcome.

By way of a non-limiting example, FIGS. 5 and 6 taken together illustrate a system 600 including at least one processor (e.g., 510, 622, 632). The at least one processor may present a first phase display including a graphical user interface for activating an intermediate outcome generator (e.g., graphical user interface 201, button 230 for activating intermediate outcome generator 245). The at least one processor may also receive a request, via the graphical user interface, to provide an intermediate outcome, wherein the intermediate outcome includes a plurality of variables from which an award is non-predictable (see e.g., FIG. 2, pressing of button 230). Further, the at least one processor may present a second phase display associated with an engine for implementing the intermediate outcome (e.g., multidimensional maps 1400 of FIG. 14A, 1450 of FIG. 14B, 1460 of FIG. 14C). The at least one processor may be configured to feed the plurality of variables of the intermediate outcome into the engine to generate a subsequent outcome (see e.g., movement of character 204 from tile 910 to 930 in FIG. 9). The at least one processor may present the subsequent outcome in the second phase display (see e.g., movement of character 204 from tile 910 to 930 in FIG. 9). The at least one processor may also reveal, in the second phase display, an award (e.g., chest 906 in FIG. 9) corresponding to the subsequent outcome.

Examples of inventive concepts are contained in the following clauses which are an integral part of this disclosure.

Clause 1: A non-transitory computer readable medium containing instructions that when executed by at least one processor cause the at least one processor to perform operations for implementing character movement relative to a multidimensional map, the operations comprising:

- causing a display of the multidimensional map, the display containing a plurality of distributed spaces;
- receiving a request to generate a random directionality outcome;
- based on the received request, generating the random directionality outcome, wherein the random directionality outcome includes a combination of directionality indicators;
- identifying a current character location on the multidimensional map; and
- using the identified current character location and the generated random directionality outcome, translating the combination of directionality indicators to the multidimensional map to thereby render the display of the multidimensional map in a manner reflecting movement of the character across some of the plurality of distributed spaces from the current character location to a new character location.

Clause 2: The non-transitory computer readable medium of clause 1, further comprising receiving a second request to generate a second random directionality outcome and generating the second random directionality outcome.

Clause 3: The non-transitory computer readable medium of any of clauses 1 and 2, wherein each of the directionality indicators are presented on a differing icon.

Clause 4: The non-transitory computer readable medium of any of clauses 1 to 3, wherein a plurality of directionality indicators are presented on a common icon.

Clause 5: The non-transitory computer readable medium of any of clauses 1 to 4, wherein each of the directionality indicators represent a cardinal direction.

Clause 6: The non-transitory computer readable medium of any of clauses 1 to 5, wherein each of the directionality indicators represents at least one of a forward direction, a reverse direction, a right direction, and a left direction.

Clause 7: The non-transitory computer readable medium of any of clauses 1 to 6, wherein at least one of the directionality indicators includes an indicator of non-movement.

Clause 8: The non-transitory computer readable medium of any of clauses 1 to 7, wherein each of the directionality indicators are presented on a dice face.

Clause 9: The non-transitory computer readable medium of any of clauses 1 to 8, wherein the combination of directionality indicators indicates both direction and distance.

Clause 10: The non-transitory computer readable medium of any of clauses 1 to 9, wherein the multidimensional map is defined by a cartesian coordinate system.

Clause 11: The non-transitory computer readable medium of any of clauses 1 to 10, wherein the cartesian coordinate system includes an x-axis and a y-axis.

Clause 12: The non-transitory computer readable medium of any of clauses 1 to 10, wherein the cartesian coordinate system includes an x-axis, a y-axis, and a z-axis.

Clause 13: The non-transitory computer readable medium of any of clauses 1 to 10, wherein the multidimensional map changes over time.

Clause 14: The non-transitory computer readable medium of any of clauses 1 to 13, wherein the operations further comprise:

- identifying a subset of spaces of the plurality of distributed spaces; and
- using the identified current character location, the generated random directionality outcome, and the identified subset of spaces, translating the combination of directionality indicators to the multidimensional map to thereby render the display of the multidimensional map in a manner reflecting movement of the character across some of the plurality of distributed spaces from the current character location to the new character location Clause 15: The non-transitory computer readable medium of any of clauses 1 to 6, wherein each of the directionality indicators is associated with a multiplier.

Clause 16: The non-transitory computer readable medium of any of clauses 1 to 15, wherein the operations further comprise:

- when the new character location is on a triggering space associated with sub-session triggering functionality, initiating a sub-session.

Clause 17: The non-transitory computer readable medium of any of clauses 1 to 16, wherein the operations further comprise:

- receiving an assurance;
- using the identified current character location, the generated random directionality outcome, and the assurance, translating the combination of directionality indicators to the multidimensional map to thereby render the display of the multidimensional map in a manner reflecting movement of the character across some of the plurality of distributed spaces from the current character location to the new character location.

Clause 18: The non-transitory computer readable medium of any of clauses 1 to 17, wherein translating the combination of directionality indicators affects a character's status in the multidimensional map.

Clause 19: A method for implementing character movement relative to a multidimensional map, the method comprising:

causing a display of the multidimensional map, the display containing a plurality of distributed spaces;

receiving a request to generate a random directionality outcome;

based on the received request, generating the random directionality outcome, wherein the random directionality outcome includes a combination of directionality indicators;

identifying a current character location on the multidimensional map; and using the identified current character location and the generated random directionality outcome, translating the combination of directionality indicators to the multidimensional map to thereby render the display of the multidimensional map in a manner reflecting movement of the character across some of the plurality of distributed spaces from the current character location to a new character location.

Clause 20: A system for implementing character movement relative to a multidimensional map, the system comprising:

at least one processor configured to:

cause a display of the multidimensional map, the display containing a plurality of distributed spaces;

receive a request to generate a random directionality outcome;

based on the received request, generate the random directionality outcome, wherein the random directionality outcome includes a combination of directionality indicators;

identify a current character location on the multidimensional map; and using the identified current character location and the generated random directionality outcome, translate the combination of directionality indicators to the multidimensional map to thereby render the display of the multidimensional map in a manner reflecting movement of the character across some of the plurality of distributed spaces from the current character location to a new character location.

Clause 21: A non-transitory computer readable medium containing instructions that when executed by at least one processor cause the at least one processor to perform operations for unpredictably generating a first multidimensional map and a second multidimensional map differing from the first multidimensional map, the operations comprising:

receiving a first request to initiate a first session in an environment employing the first multidimensional map;

based on the received first request, determining at least one first multidimensional map parameter defining at least one first constraint for the first multidimensional map employed in the first session, wherein the at least one first multidimensional map parameter includes at least one of a map height, a map width, a map length, a map type, a map geography, or a map size;

determining, for inclusion in the first multidimensional map for the first session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map;

generating the first multidimensional map to conform with the determined at least one first multidimensional map parameter and the determined at least one first multidimensional map element;

causing a display of the first generated multidimensional map on a computing device;

instituting the first session using the first generated multidimensional map;

following the first session, receiving a second request to initiate a second session in the environment;

based on the received second request, determining at least one second multidimensional map parameter defining at least one second constraint for the second multidimensional map in the second session, wherein the at least one second multidimensional map parameter includes the map height, the map width, the map length, the map type, the map geography, or the map size;

determining, for inclusion in the second multidimensional map for the second session, at least one second multidimensional map element defining at least one feature of the second multidimensional map, wherein the at least one second multidimensional map element for the second session includes at least one of the location of at least one award on the second multidimensional map, the identity of the at least one award, the number of the at least one award, or the functionality associated with the particular location on the multidimensional map;

generating the second multidimensional map to conform with the determined at least one second multidimensional map parameter and the at least one second multidimensional map element; and causing a display of the second generated multidimensional map on the computing device for the second session, wherein the second generated multidimension map differs from the first generated multidimensional map in a non-predictable manner.

Clause 22: The non-transitory computer readable medium of any of clauses 1 to 21, further comprising receiving at least one multidimensional map input, and wherein generating the first multidimensional map is at least partially based on the at least one multidimensional map input.

Clause 23: The non-transitory computer readable medium of any of clauses 1 to 22, further comprising collecting a set of data characterizing the first session, and dynamically updating the second multidimensional map in real time during the second session based on the collected set of data.

Clause 24: The non-transitory computer readable medium of any of clauses 1 to 23, further comprising collecting a set of data characterizing the first session, and wherein generating the second multidimensional map is based on the collected set of data.

Clause 25: The non-transitory computer readable medium of any of clauses 1 to 24, wherein the first multidimensional map or the second multidimensional map is two dimensional, three dimensional, or four dimensional.

Clause 26: The non-transitory computer readable medium of any of clauses 1 to 25, further comprising receiving a first assurance, and dynamically altering the first multidimensional map when the received first assurance exceeds a predetermined assurance threshold.

Clause 27: The non-transitory computer readable medium of any of clauses 1 to 26, further comprising receiving a first assurance, and dynamically altering the first multidimensional map when the received first assurance fails to exceed a predetermined assurance threshold.

Clause 28: The non-transitory computer readable medium of any of clauses 1 to 27, further comprising comparing the at least one first multidimensional map element to the at least one second multidimensional map element, and when the comparison results in a match, regenerating the second multidimensional map.

Clause 29: The non-transitory computer readable medium of any of clauses 1 to 28, further comprising comparing the at least one first multidimensional map parameter to the at least one second multidimensional map parameter, and when the comparison results in a match, regenerating the second multidimensional map.

Clause 30: The non-transitory computer readable medium of any of clauses 1 to 29, further comprising instituting the second session using the second generated multidimensional map.

Clause 31: The non-transitory computer readable medium of any of clauses 1 to 30, further comprising:

- storing the first generated multidimensional map and the second generated multidimensional map in a database of multidimensional maps;
- receiving a third request to initiate a new session in a new environment, wherein receiving the third request includes generating a third multidimensional map; and
- generating the third multidimensional map based on the database of multidimensional maps.

Clause 32: The non-transitory computer readable medium of any of clauses 1 to 31, wherein generating the third multidimensional map based on the database of multidimensional maps includes a comparison of the first generated multidimensional map and the second generated multidimensional map.

Clause 33: The non-transitory computer readable medium of any of clauses 1 to 32, further comprising:

- storing the at least one first multidimensional map parameter, the at least one second multidimensional map parameter, the at least one first multidimensional map element, and the at least one second multidimensional map element in a database of multidimensional map parameters and multidimensional map elements;
- receiving a third request to initiate a new session in a new environment, wherein receiving the third request includes generating a third multidimensional map; and
- generating the third multidimensional map based on the database of multidimensional map parameters and multidimensional map elements.

Clause 34: The non-transitory computer readable medium of any of clauses 1 to 33, wherein generating the third multidimensional map based on the database of multidimensional map parameters and multidimensional map elements includes a comparison of either the at least one first multidimensional map parameter and the at least one second multidimensional map parameter or the at least one first multidimensional map element and the at least one second multidimensional map element.

Clause 35: The non-transitory computer readable medium of any of clauses 1 to 34, further comprising receiving at least one multidimensional map input, and wherein generating the second multidimensional map is based on the at least one multidimensional map input.

Clause 36: The non-transitory computer readable medium of any of clauses 1 to 35, wherein the collected set of data characterizing the first session includes at least one of game time, game progression, game history, and game difficulty.

Clause 37: The non-transitory computer readable medium of any of clauses 1 to 36, wherein the first assurance includes a wager, and the predetermined assurance threshold includes a wager indicator.

Clause 38: The non-transitory computer readable medium of any of clauses 1 to 37, wherein the non-predictable manner is unique to at least one of the first generated multidimensional map and the second generated multidimensional map.

Clause 39: A method for unpredictably generating a first multidimensional map and a second multidimensional map differing from the first multidimensional map, the method comprising:

- receiving a first request to initiate a first session in an environment employing the first multidimensional map;
- based on the received first request, determining at least one first multidimensional map parameter defining at least one first constraint for the first multidimensional map employed in the first session, wherein the at least one first multidimensional map parameter includes at least one of a map height, a map width, a map length, a map type, a map geography, or a map size;
- determining, for inclusion in the first multidimensional map for the first session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map;
- generating the first multidimensional map to conform with the determined at least one first multidimensional map parameter and the determined at least one first multidimensional map element;
- causing a display of the first generated multidimensional map on a computing device;
- instituting the first session using the first generated multidimensional map;
- following the first session, receiving a second request to initiate a second session in the environment;
- based on the received second request, determining at least one second multidimensional map parameter defining at least one second constraint for the second multidimensional map in the second session, wherein the at least one second multidimensional map parameter includes the map height, the map width, the map length, the map type, the map geography, or the map size;
- determining, for inclusion in the second multidimensional map for the second session, at least one second multidimensional map element defining at least one feature of the second multidimensional map, wherein the at least one second multidimensional map element for the second session includes at least one of the location of at least one award on the second multidimensional map, the identity of the at least one award, the number of the at least one award, or the functionality associated with a particular location on the multidimensional map;

generating the second multidimensional map to conform with the determined at least one second multidimensional map parameter and the at least one second multidimensional map element; and causing a display of the second generated multidimensional map on the computing device for the second session, wherein the second generated multidimension map differs from the first generated multidimensional map in a non-predictable manner.

Clause 40: A system for unpredictably generating a first multidimensional map and a second multidimensional map differing from the first multidimensional map, the system comprising:

at least one processor configured to:

receive a first request to initiate a first session in an environment employing the first multidimensional map;

based on the received first request, determine at least one first multidimensional map parameter defining at least one first constraint for the first multidimensional map employed in the first session, wherein the at least one first multidimensional map parameter includes at least one of a map height, a map width, a map length, a map type, a map geography, or a map size;

determine, for inclusion in the first multidimensional map for the first session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map;

generate the first multidimensional map to conform with the determined at least one first multidimensional map parameter and the determined at least one first multidimensional map element;

cause a display of the first generated multidimensional map on a computing device;

institute the first session using the first generated multidimensional map;

following the first session, receive a second request to initiate a second session in the environment;

based on the received second request, determine at least one second multidimensional map parameter defining at least one second constraint for the second multidimensional map in the second session, wherein the at least one second multidimensional map parameter includes the map height, the map width, the map length, the map type, the map geography, or the map size;

determine, for inclusion in the second multidimensional map for the second session, at least one second multidimensional map element defining at least one feature of the second multidimensional map, wherein the at least one second multidimensional map element for the second session includes at least one of the location of at least one award on the second multidimensional map, the identity of the at least one award, the number of the at least one award, or the functionality associated with a particular location on the multidimensional map;

generate the second multidimensional map to conform with the determined at least one second multidimensional map parameter and the at least one second multidimensional map element; and cause a display of the second generated multidimensional map on the computing device for the second session, wherein the second generated multidimension map differs from the first generated multidimensional map in a non-predictable manner.

Clause 41: A non-transitory computer readable medium containing instructions that when executed by at least one processor cause the at least one processor to perform operations for providing non-predictable award outcomes, the operations comprising:

presenting a first phase display including a graphical user interface for activating an intermediate outcome generator;

receiving a request, via the graphical user interface, to provide an intermediate outcome, wherein the intermediate outcome includes a plurality of variables from which an award is non-predictable;

presenting a second phase display associated with an engine for implementing the intermediate outcome;

feeding the plurality of variables of the intermediate outcome into the engine to generate a subsequent outcome;

presenting the subsequent outcome in the second phase display; and revealing, in the second phase display, an award corresponding to the subsequent outcome.

Clause 42: The non-transitory computer readable medium of any of clauses 1 to 41, wherein the subsequent outcome is the award.

Clause 43: The non-transitory computer readable medium of any of clauses 1 to 42, wherein the subsequent outcome is used to reveal the award.

Clause 44: The non-transitory computer readable medium of any of clauses 1 to 43, wherein the second phase display includes a multidimensional map, wherein the plurality of variables generated by the intermediate outcome are directionality indicators, and wherein during feeding, the directionality indicators are applied to the multidimensional map to cause a character to move on the multidimensional map in accordance with the directionality indicators.

Clause 45: The non-transitory computer readable medium of any of clauses 1 to 44, wherein the multidimensional map includes at least one space associated with the award, and wherein the award is revealed when the character lands on the at least one space.

Clause 46: The non-transitory computer readable medium of any of clauses 1 to 45, wherein a combination of the directionality indicators indicates both direction and distance.

Clause 47: The non-transitory computer readable medium of any of clauses 1 to 46, wherein each of the directionality indicators is presented on a differing icon.

Clause 48: The non-transitory computer readable medium of any of clauses 1 to 47, wherein each of the directionality indicators is presented on a same icon.

Clause 49: The non-transitory computer readable medium of any of clauses 1 to 48, wherein each of the directionality indicators represents a cardinal direction.

Clause 50: The non-transitory computer readable medium of any of clauses 1 to 49, wherein each of the directionality indicators represents at least one of a forward direction, a reverse direction, a right direction, and a left direction.

Clause 51: The non-transitory computer readable medium of any of clauses 1 to 50, wherein the multidimensional map is constrained by a multidimensional map parameter and a multidimensional map element.

Clause 52: The non-transitory computer readable medium of any of clauses 1 to 52, wherein the graphical user interface is a virtual slot machine.

Clause 53: The non-transitory computer readable medium of any of clauses 1 to 52, wherein the intermediate outcome generator includes a random number generator.

Clause 54: The non-transitory computer readable medium of any of clauses 1 to 53, wherein the intermediate outcome in the first phase is a function of a character location on a multidimensional map in the second phase.

Clause 55: The non-transitory computer readable medium of any of clauses 1 to 54, wherein the intermediate outcome is a random directionality outcome.

Clause 56: The non-transitory computer readable medium of any of clauses 1 to 55, wherein receiving the request includes at least one of an assurance and a user input.

Clause 57: The non-transitory computer readable medium of any of clauses 1 to 56, further comprising presenting the award corresponding to the subsequent outcome.

Clause 58: The non-transitory computer readable medium of any of clauses 1 to 57, wherein activating the intermediate outcome generator includes a user input.

Clause 59: A method for providing non-predictable award outcomes comprising:

- presenting a first phase display including a graphical user interface for activating an intermediate outcome generator;
- receiving a request, via the graphical user interface, to provide an intermediate outcome, wherein the intermediate outcome includes a plurality of variables from which an award is non-predictable;
- presenting a second phase display associated with an engine for implementing the intermediate outcome;
- feeding the plurality of variables of the intermediate outcome into the engine to generate a subsequent outcome;
- presenting the subsequent outcome in the second phase display; and
- revealing, in the second phase display, an award corresponding to the subsequent outcome.

Clause 60: A system for providing non-predictable award outcomes comprising:

- at least one processor configured to:
- present a first phase display including a graphical user interface for activating an intermediate outcome generator;
- receive a request, via the graphical user interface, to provide an intermediate outcome, wherein the intermediate outcome includes a plurality of variables from which an award is non-predictable;
- present a second phase display associated with an engine for implementing the intermediate outcome;
- feed the plurality of variables of the intermediate outcome into the engine to generate a subsequent outcome;
- present the subsequent outcome in the second phase display; and
- reveal, in the second phase display, an award corresponding to the subsequent outcome.

Disclosed embodiments may include any one of the following bullet-pointed features alone or in combination with one or more other bullet-pointed features, whether implemented as a system and/or method, by at least one processor or circuitry, and/or stored as executable instructions on non-transitory computer readable media or computer readable media.

- a non-transitory computer readable medium containing instructions that when executed by at least one processor cause the at least one processor to perform operations for implementing character movement relative to a multidimensional map;
- causing a display of the multidimensional map, the display containing a plurality of distributed spaces;
- receiving a request to generate a random directionality outcome;
- based on the received request, generating the random directionality outcome, wherein the random directionality outcome includes a combination of directionality indicators;
- identifying a current character location on the multidimensional map;
- using the identified current character location and the generated random directionality outcome, translating the combination of directionality indicators to the multidimensional map to thereby render the display of the multidimensional map in a manner reflecting movement of the character across some of the plurality of distributed spaces from the current character location to a new character location;
- receiving a second request to generate a second random directionality outcome and generating the second random directionality outcome;
- each of the directionality indicators are presented on a differing icon;
- a plurality of directionality indicators are presented on a common icon;
- each of the directionality indicators represent a cardinal direction;
- each of the directionality indicators represents at least one of a forward direction, a reverse direction, a right direction, and a left direction;
- at least one of the directionality indicators includes an indicator of non-movement;
- each of the directionality indicators are presented on a dice face;
- the combination of directionality indicators indicates both direction and distance;
- the multidimensional map is defined by a cartesian coordinate system;
- the cartesian coordinate system includes an x-axis and a y-axis;
- the cartesian coordinate system includes an x-axis, a y-axis, and a z-axis;
- the multidimensional map changes over time;
- identifying a subset of spaces of the plurality of distributed spaces;
- using the identified current character location, the generated random directionality outcome, and the identified subset of spaces, translating the combination of directionality indicators to the multidimensional map to thereby render the display of the multidimensional map in a manner reflecting movement of the character across some of the plurality of distributed spaces from the current character location to the new character location;
- each of the directionality indicators is associated with a multiplier;
- when the new character location is on a triggering space associated with sub-session triggering functionality, initiating a sub-session;
- receiving an assurance;
- using the identified current character location, the generated random directionality outcome, and the assurance, translating the combination of directionality indicators to the multidimensional map to thereby render the display of the multidimensional map in a manner reflecting movement of the character across some of the plurality of distributed spaces from the current character location to the new character location;

translating the combination of directionality indicators affects a character's status in the multidimensional map;

a method for implementing character movement relative to a multidimensional map;

a system for implementing character movement relative to a multidimensional map;

a non-transitory computer readable medium containing instructions that when executed by at least one processor cause the at least one processor to perform operations for unpredictably generating a first multidimensional map and a second multidimensional map differing from the first multidimensional map;

receiving a first request to initiate a first session in an environment employing the first multidimensional map;

based on the received first request, determining at least one first multidimensional map parameter defining at least one first constraint for the first multidimensional map employed in the first session, wherein the at least one first multidimensional map parameter includes at least one of a map height, a map width, a map length, a map type, a map geography, or a map size;

determining, for inclusion in the first multidimensional map for the first session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map;

generating the first multidimensional map to conform with the determined at least one first multidimensional map parameter and the determined at least one first multidimensional map element;

causing a display of the first generated multidimensional map on a computing device;

instituting the first session using the first generated multidimensional map;

following the first session, receiving a second request to initiate a second session in the environment;

based on the received second request, determining at least one second multidimensional map parameter defining at least one second constraint for the second multidimensional map in the second session, wherein the at least one second multidimensional map parameter includes the map height, the map width, the map length, the map type, the map geography, or the map size;

determining, for inclusion in the second multidimensional map for the second session, at least one second multidimensional map element defining at least one feature of the second multidimensional map, wherein the at least one second multidimensional map element for the second session includes at least one of the location of at least one award on the second multidimensional map, the identity of the at least one award, the number of the at least one award, or the functionality associated with the particular location on the multidimensional map;

generating the second multidimensional map to conform with the determined at least one second multidimensional map parameter and the at least one second multidimensional map element;

causing a display of the second generated multidimensional map on the computing device for the second session, wherein the second generated multidimension map differs from the first generated multidimensional map in a non-predictable manner;

receiving at least one multidimensional map input, and wherein generating the first multidimensional map is at least partially based on the at least one multidimensional map input;

collecting a set of data characterizing the first session, and dynamically updating the second multidimensional map in real time during the second session based on the collected set of data;

collecting a set of data characterizing the first session, and wherein generating the second multidimensional map is based on the collected set of data;

the first multidimensional map or the second multidimensional map is two dimensional, three dimensional, or four dimensional;

receiving a first assurance, and dynamically altering the first multidimensional map when the received first assurance exceeds a predetermined assurance threshold;

receiving a first assurance, and dynamically altering the first multidimensional map when the received first assurance fails to exceed a predetermined assurance threshold;

comparing the at least one first multidimensional map element to the at least one second multidimensional map element, and when the comparison results in a match, regenerating the second multidimensional map;

comparing the at least one first multidimensional map parameter to the at least one second multidimensional map parameter, and when the comparison results in a match, regenerating the second multidimensional map;

instituting the second session using the second generated multidimensional map;

storing the first generated multidimensional map and the second generated multidimensional map in a database of multidimensional maps;

receiving a third request to initiate a new session in a new environment, wherein receiving the third request includes generating a third multidimensional map;

generating the third multidimensional map based on the database of multidimensional maps;

generating the third multidimensional map based on the database of multidimensional maps includes a comparison of the first generated multidimensional map and the second generated multidimensional map;

storing the at least one first multidimensional map parameter, the at least one second multidimensional map parameter, the at least one first multidimensional map element, and the at least one second multidimensional map element in a database of multidimensional map parameters and multidimensional map elements;

receiving a third request to initiate a new session in a new environment, wherein receiving the third request includes generating a third multidimensional map;

generating the third multidimensional map based on the database of multidimensional map parameters and multidimensional map elements;

generating the third multidimensional map based on the database of multidimensional map parameters and multidimensional map elements includes a comparison of either the at least one first multidimensional map parameter and the at least one second multidimensional map parameter or the at least one first multidimensional map element and the at least one second multidimensional map element;

receiving at least one multidimensional map input, and wherein generating the second multidimensional map is based on the at least one multidimensional map input;

the collected set of data characterizing the first session includes at least one of game time, game progression, game history, and game difficulty;

the first assurance includes a wager, and the predetermined assurance threshold includes a wager indicator;

the non-predictable manner is unique to at least one of the first generated multidimensional map and the second generated multidimensional map;

a method for unpredictably generating a first multidimensional map and a second multidimensional map differing from the first multidimensional map a system for unpredictably generating a first multidimensional map and a second multidimensional map differing from the first multidimensional map;

a non-transitory computer readable medium containing instructions that when executed by at least one processor cause the at least one processor to perform operations for providing non-predictable award outcomes;

presenting a first phase display including a graphical user interface for activating an intermediate outcome generator;

receiving a request, via the graphical user interface, to provide an intermediate outcome, wherein the intermediate outcome includes a plurality of variables from which an award is non-predictable;

presenting a second phase display associated with an engine for implementing the intermediate outcome;

feeding the plurality of variables of the intermediate outcome into the engine to generate a subsequent outcome;

presenting the subsequent outcome in the second phase display;

revealing, in the second phase display, an award corresponding to the subsequent outcome;

the subsequent outcome is the award;

the subsequent outcome is used to reveal the award;

the second phase display includes a multidimensional map, wherein the plurality of variables generated by the intermediate outcome are directionality indicators, and wherein during feeding, the directionality indicators are applied to the multidimensional map to cause a character to move on the multidimensional map in accordance with the directionality indicators;

the multidimensional map includes at least one space associated with the award, and wherein the award is revealed when the character lands on the at least one space;

a combination of the directionality indicators indicates both direction and distance;

each of the directionality indicators is presented on a differing icon;

each of the directionality indicators is presented on a same icon;

each of the directionality indicators represents a cardinal direction;

each of the directionality indicators represents at least one of a forward direction, a reverse direction, a right direction, and a left direction;

the multidimensional map is constrained by a multidimensional map parameter and a multidimensional map element;

the graphical user interface is a virtual slot machine;

the intermediate outcome generator includes a random number generator;

the intermediate outcome in the first phase is a function of a character location on a multidimensional map in the second phase;

the intermediate outcome is a random directionality outcome;

receiving the request includes at least one of an assurance and a user input;

presenting the award corresponding to the subsequent outcome;

activating the intermediate outcome generator includes a user input;

a method for providing non-predictable award outcomes; and a system for providing non-predictable award outcomes.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer readable media, or existing communications software. The programs, modules, or code may also be implemented or replicated as firmware or circuit logic.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer readable medium containing instructions that when executed by at least one processor cause the at least one processor to perform operations for unpredictably generating a first multidimensional map and a second multidimensional map differing from the first multidimensional map, the operations comprising:

receiving, via at least one input device, a first signal indicative of a first request to initiate a first interactive session in an environment employing the first multidimensional map for interacting with a user via the at least one input device;

based on the received first request, determining at least one first multidimensional map parameter defining at least one first constraint for the first multidimensional map employed in the first interactive session, wherein the at least one first multidimensional map parameter includes at least one of a map height, a map width, a map length, a map type, a map geography, or a map size;

determining, for inclusion in the first multidimensional map for the first interactive session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map;

generating the first multidimensional map to conform with the determined at least one first multidimensional map parameter and the determined at least one first multidimensional map element;

causing a display of the first generated multidimensional map on a computing device;

instituting the first interactive session via the display and the at least one input device using the first generated multidimensional map;

following the first interactive session, receiving, via the at least one input device, a second signal indicative of a second request to initiate a second interactive session for interacting with the at least one user via the at least one input device in the environment;

based on the received second request, determining at least one second multidimensional map parameter defining at least one second constraint for the second multidimensional map in the second interactive session, wherein the at least one second multidimensional map parameter includes the map height, the map width, the map length, the map type, the map geography, or the map size;

determining, for inclusion in the second multidimensional map for the second interactive session, at least one second multidimensional map element defining at least one feature of the second multidimensional map, wherein the at least one second multidimensional map element for the second interactive session includes at least one of the location of at least one award on the second multidimensional map, the identity of the at least one award, the number of the at least one award, or the functionality associated with the particular location on the multidimensional map;

generating the second multidimensional map to conform with the determined at least one second multidimensional map parameter and the at least one second multidimensional map element;

causing a display of the second generated multidimensional map on the computing device for the second interactive session, wherein the second generated multidimension map differs from the first generated multidimensional map in a non-predictable manner; and collecting a set of data characterizing the first interactive session, and dynamically updating the second multidimensional map in real time during the second interactive session based on the collected set of data.

2. The non-transitory computer readable medium of claim 1, further comprising receiving at least one multidimensional map input, and wherein generating the first multidimensional map is at least partially based on the at least one multidimensional map input.

3. The non-transitory computer readable medium of claim 1, wherein the first multidimensional map or the second multidimensional map is two-dimensional, three-dimensional, or four-dimensional.

4. The non-transitory computer readable medium of claim 1, further comprising receiving a first assurance, and dynamically altering the first multidimensional map when the received first assurance exceeds a predetermined assurance threshold.

5. The non-transitory computer readable medium of claim 1, further comprising receiving a first assurance, and dynamically altering the first multidimensional map when the received first assurance fails to exceed a predetermined assurance threshold.

6. The non-transitory computer readable medium of claim 1, further comprising comparing the at least one first multidimensional map parameter to the at least one second multidimensional map parameter, and when the comparison results in a match, regenerating the second multidimensional map.

7. The non-transitory computer readable medium of claim 1, further comprising instituting the second interactive session using the second generated multidimensional map.

8. The non-transitory computer readable medium of claim 1, further comprising:

storing the first generated multidimensional map and the second generated multidimensional map in a database of multidimensional maps;

receiving a third request to initiate a new interactive session in a new environment, wherein receiving the third request includes generating a third multidimensional map; and generating the third multidimensional map based on the database of multidimensional maps.

9. The non-transitory computer readable medium of claim 8, wherein generating the third multidimensional map based on the database of multidimensional maps includes a comparison of the first generated multidimensional map and the second generated multidimensional map.

10. The non-transitory computer readable medium of claim 1, further comprising:

storing the at least one first multidimensional map parameter, the at least one second multidimensional map parameter, the at least one first multidimensional map element, and the at least one second multidimensional map element in a database of multidimensional map parameters and multidimensional map elements;

receiving a third request to initiate a new interactive session in a new environment, wherein receiving the third request includes generating a third multidimensional map; and generating the third multidimensional map based on the database of multidimensional map parameters and multidimensional map elements.

11. The non-transitory computer readable medium of claim 10, wherein generating the third multidimensional map based on the database of multidimensional map parameters and multidimensional map elements includes a comparison of either the at least one first multidimensional map parameter and the at least one second multidimensional map parameter or the at least one first multidimensional map element and the at least one second multidimensional map element.

12. The non-transitory computer readable medium of claim 1, further comprising receiving at least one multidimensional map input, and wherein generating the second multidimensional map is based on the at least one multidimensional map input.

13. The non-transitory computer readable medium of claim 1, wherein the collected set of data characterizing the first interactive session includes at least one of game time, game progression, game history, and game difficulty.

14. The non-transitory computer readable medium of claim 4, wherein the first assurance includes a wager, and the predetermined assurance threshold includes a wager indicator.

15. The non-transitory computer readable medium of claim 1, wherein the non-predictable manner is unique to at least one of the first generated multidimensional map and the second generated multidimensional map.

16. A method for unpredictably generating a first multidimensional map and a second multidimensional map differing from the first multidimensional map, the method comprising:

receiving, via at least one input device, a first signal indicative of a first request to initiate a first interactive session in an environment employing the first multidimensional map for interacting with a user via the at least one input device;

based on the received first request, determining at least one first multidimensional map parameter defining at least one first constraint for the first multidimensional map employed in the first interactive session, wherein the at least one first multidimensional map parameter includes at least one of a map height, a map width, a map length, a map type, a map geography, or a map size;

determining, for inclusion in the first multidimensional map for the first interactive session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map;

generating the first multidimensional map to conform with the determined at least one first multidimensional map parameter and the determined at least one first multidimensional map element;

causing a display of the first generated multidimensional map on a computing device;

instituting the first interactive session via the display and the at least one input device using the first generated multidimensional map;

following the first interactive session, receiving, via the at least one input device, a second signal indicative of a second request to initiate a second interactive session for interacting with the at least one user via the at least one input device in the environment;

based on the received second request, determining at least one second multidimensional map parameter defining at least one second constraint for the second multidimensional map in the second interactive session, wherein the at least one second multidimensional map parameter includes the map height, the map width, the map length, the map type, the map geography, or the map size;

determining, for inclusion in the second multidimensional map for the second interactive session, at least one second multidimensional map element defining at least one feature of the second multidimensional map, wherein the at least one second multidimensional map element for the second interactive session includes at least one of the location of at least one award on the second multidimensional map, the identity of the at least one award, the number of the at least one award, or the functionality associated with a particular location on the multidimensional map;

generating the second multidimensional map to conform with the determined at least one second multidimensional map parameter and the at least one second multidimensional map element;

causing a display of the second generated multidimensional map on the computing device for the second interactive session, wherein the second generated multidimension map differs from the first generated multidimensional map in a non-predictable manner; and collecting a set of data characterizing the first interactive session, wherein generating the second multidimensional map is based on the collected set of data.

17. A system for unpredictably generating a first multidimensional map and a second multidimensional map differing from the first multidimensional map, the system comprising:

at least one processor configured to:

receive, via at least one input device, a first signal indicative of a first request to initiate a first interactive session in an environment employing the first multidimensional map for interacting with a user via the at least one input device;

based on the received first request, determine at least one first multidimensional map parameter defining at least one first constraint for the first multidimensional map employed in the first interactive session, wherein the at least one first multidimensional map parameter includes at least one of a map height, a map width, a map length, a map type, a map geography, or a map size;

determine, for inclusion in the first multidimensional map for the first interactive session, at least one first multidimensional map element defining at least one feature of the first multidimensional map, wherein the at least one first multidimensional map element includes at least one of a location of at least one award on the first multidimensional map, an identity of the at least one award, a number of the at least one award, or a functionality associated with a particular location on the first multidimensional map;

generate the first multidimensional map to conform with the determined at least one first multidimensional map parameter and the determined at least one first multidimensional map element;

cause a display of the first generated multidimensional map on a computing device;

institute the first interactive session via the display and the at least one input device using the first generated multidimensional map;

following the first interactive session, receive, via the at least one input device, a second signal indicative of a second request to initiate a second interactive session for interacting with the at least one user via the at least one input device in the environment;

based on the received second request, determine at least one second multidimensional map parameter defining at least one second constraint for the second multidimensional map in the second interactive session, wherein the at least one second multidimensional map parameter includes the map height, the map width, the map length, the map type, the map geography, or the map size;

determine, for inclusion in the second multidimensional map for the second interactive session, at least one second multidimensional map element defining at least one feature of the second multidimensional map, wherein the at least one second multidimensional map element for the second interactive session includes at least one of the location of at least one award on the second multidimensional map, the identity of the at least one award, the number of the at least one award, or the functionality associated with a particular location on the multidimensional map;

generate the second multidimensional map to conform with the determined at least one second multidimensional map parameter and the at least one second multidimensional map element;

cause a display of the second generated multidimensional map on the computing device for the second interactive session, wherein the second generated multidimension map differs from the first generated multidimensional map in a non-predictable manner; and compare the at least one first multidimensional map element to the at least one second multidimensional map element, and when the comparison results in a match, regenerating the second multidimensional map.

* * * * *